(12) United States Patent
Fukuda et al.

(10) Patent No.: US 8,675,255 B2
(45) Date of Patent: Mar. 18, 2014

(54) PROFILE CREATION METHOD FOR CREATING A PROFILE DEFINING AN INK AMOUNT, PROFILE CREATION PROGRAM FOR CREATING A PROFILE DEFINING AN INK AMOUNT, AND PRINTING APPARATUS FOR PRINTING WITH REFERENCE TO A PROFILE DEFINING AN INK AMOUNT

(75) Inventors: Masami Fukuda, Shiojiri (JP); Nao Kaneko, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 56 days.

(21) Appl. No.: 13/427,294

(22) Filed: Mar. 22, 2012

(65) Prior Publication Data

US 2012/0243011 A1   Sep. 27, 2012

(30) Foreign Application Priority Data

Mar. 22, 2011   (JP) ................... 2011-063343

(51) Int. Cl.
*G06F 15/00* (2006.01)
(52) U.S. Cl.
USPC ............................................. 358/1.9
(58) Field of Classification Search
None
See application file for complete search history.

(56) References Cited

U.S. PATENT DOCUMENTS

| | | | |
|---|---|---|---|
| 7,180,633 B2 * | 2/2007 | Okamoto | 358/1.9 |
| 7,466,448 B2 * | 12/2008 | Yamamoto et al. | 358/1.9 |
| 7,542,167 B2 | 6/2009 | Ito et al. | |
| 7,599,096 B2 * | 10/2009 | Yoshida | 358/3.01 |
| 2006/0176529 A1 | 8/2006 | Ito et al. | |
| 2010/0265527 A1 * | 10/2010 | Tsuchiya | 358/1.9 |

FOREIGN PATENT DOCUMENTS

| | | |
|---|---|---|
| JP | 2006-103640 A | 4/2006 |
| JP | 2006-197080 A | 7/2006 |
| JP | 2006-217150 A | 8/2006 |
| JP | 2007-511175 A | 4/2007 |
| JP | 2009-220356 A | 10/2009 |
| WO | 2005-043889 A | 5/2005 |

OTHER PUBLICATIONS

Billmeyer and Saltzman's Principles of Color Technology, 3rd Edition, John Wiley & Sons, Inc., 2000, p. 129, pp. 213-215.

* cited by examiner

*Primary Examiner* — Jeremiah Bryar
(74) *Attorney, Agent, or Firm* — Nutter McClennen & Fish LLP; John J. Penny, Jr.; Christina M. Sperry

(57) ABSTRACT

A second chromaticity feature is corrected and approximated to a first chromaticity feature, a new limit value for an ink amount is determined based on the second chromaticity feature after the approximation, optimization is performed by designating an ink amount which is equal to or less than the newly determined limit value when an ink amount reproducing a hue value represented by a lattice point is determined by the optimization of the ink amount with the use of an object function for evaluating image quality when the designated amount of ink is made to adhere to a first print medium, the ink amount determined by the optimization is converted with a conversion relationship based on the first chromaticity feature and the second chromaticity feature, and a profile for a second print medium, for which the converted ink amount has been defined, is created.

18 Claims, 30 Drawing Sheets

FIG. 3

WEIGHT DESIGNATION UI

GRAININESS
IGNORED 0% —————[]————— 100% VALUED

COLOR CONSTANCY
IGNORED 0% ———[]————————— 100% VALUED

RUNNING COST
IGNORED 0% ———[]————————— 100% VALUED

GAMUT
IGNORED 0% —————[]——————— 100% VALUED

GRADATION FEATURE
IGNORED 0% —————[]——————— 100% VALUED

DESIGNATED MEDIUM
GLOSS PAPER GROUP
USER MEDIUM

ENTER

FIG. 7A
STEP S100
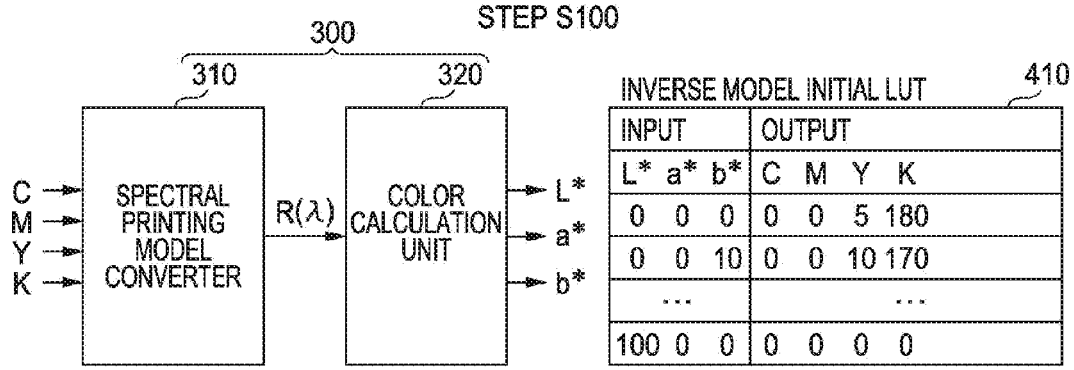
FIG. 7B
STEP S200
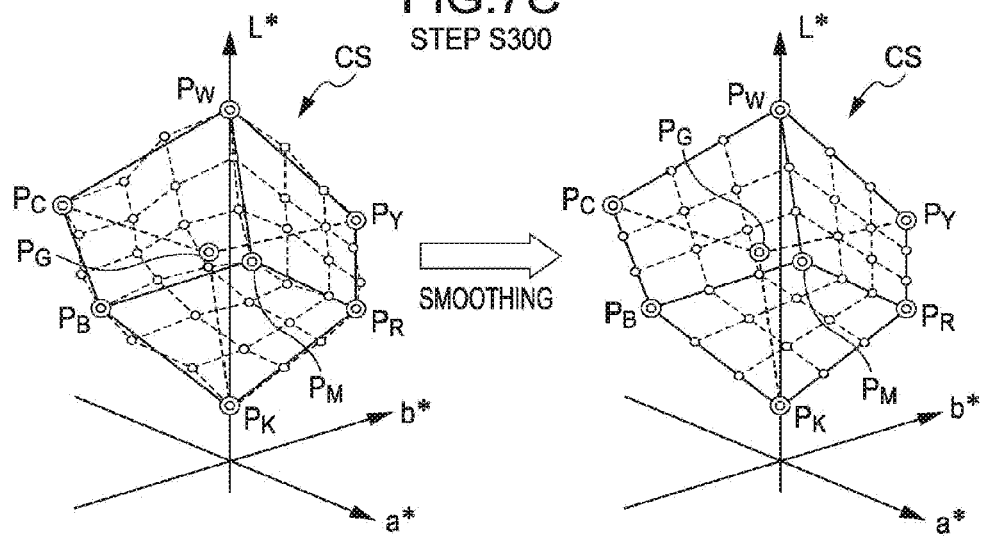
FIG. 7C
STEP S300

FIG. 8A
COLOR POINT OF INPUT COLOR SYSTEM
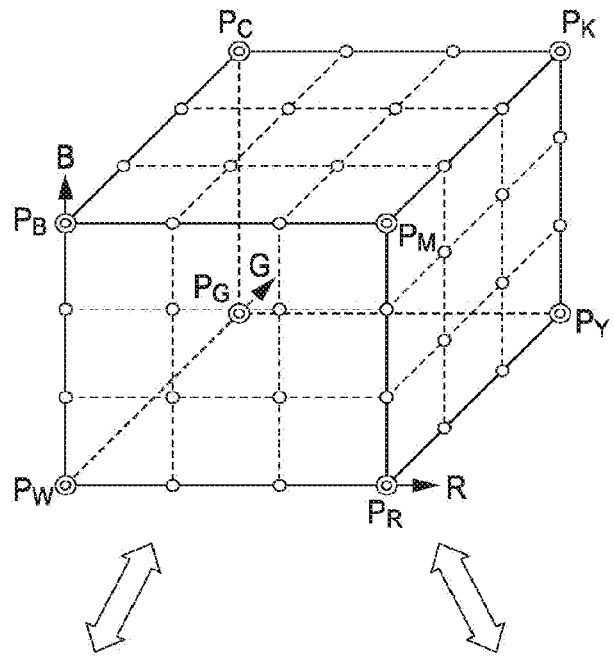
FIG. 8B
COLOR POINT OF L*a*b* COLOR SYSTEM (BEFORE SMOOTHING)
FIG. 8C
COLOR POINT OF L*a*b* COLOR SYSTEM (AFTER SMOOTHING)
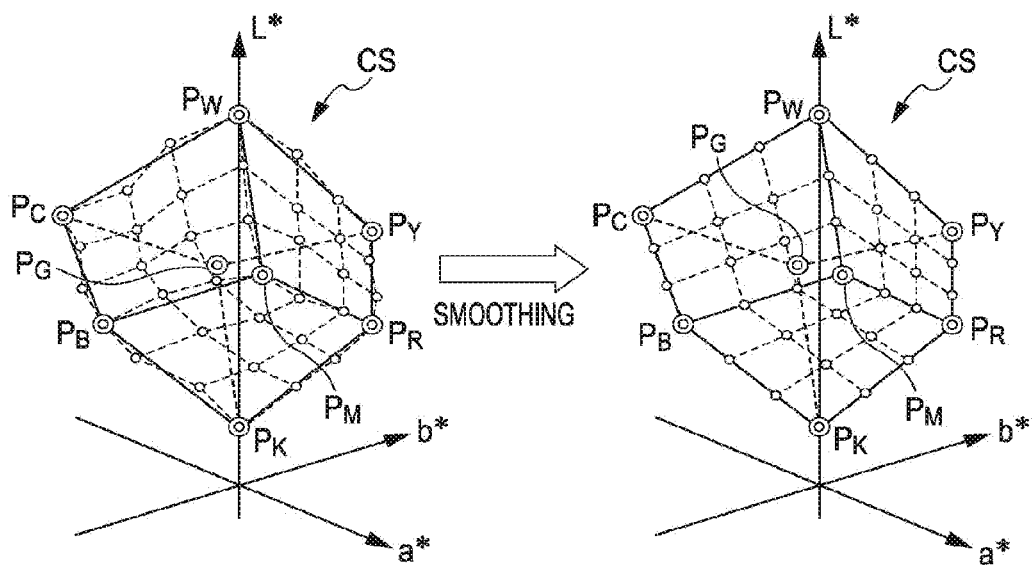
SMOOTHING

FIG. 9A
STEP S100
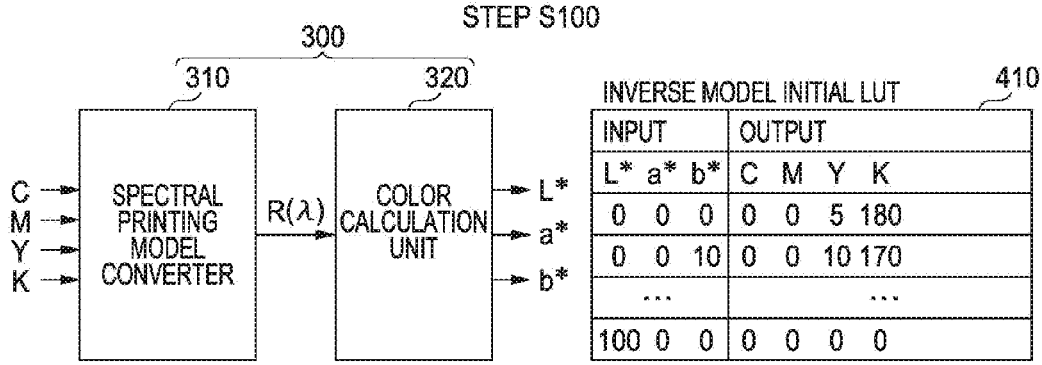
FIG. 9B
STEP S200
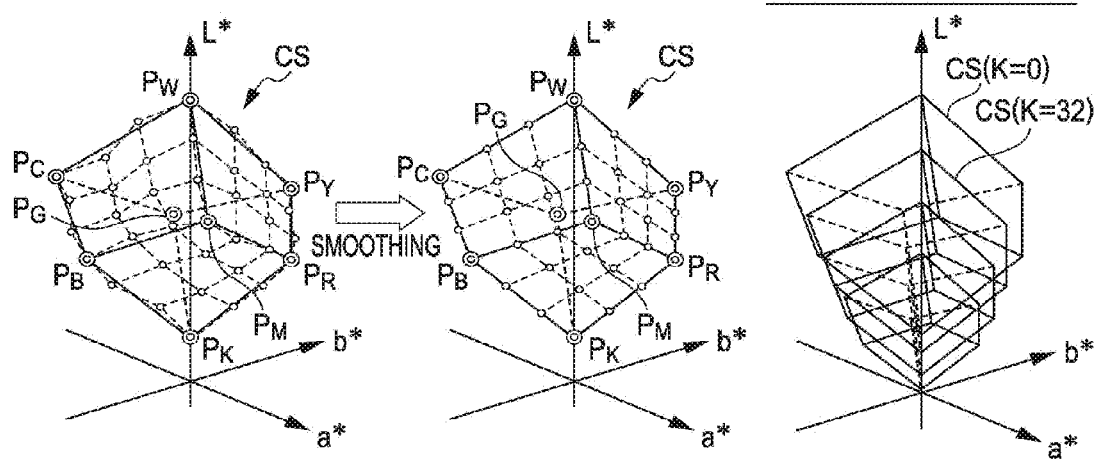
FIG. 9C
STEP S300

CREATION OF COLOR CORRECTION LUT
WITH THE USE OF BASE 3D-LUT

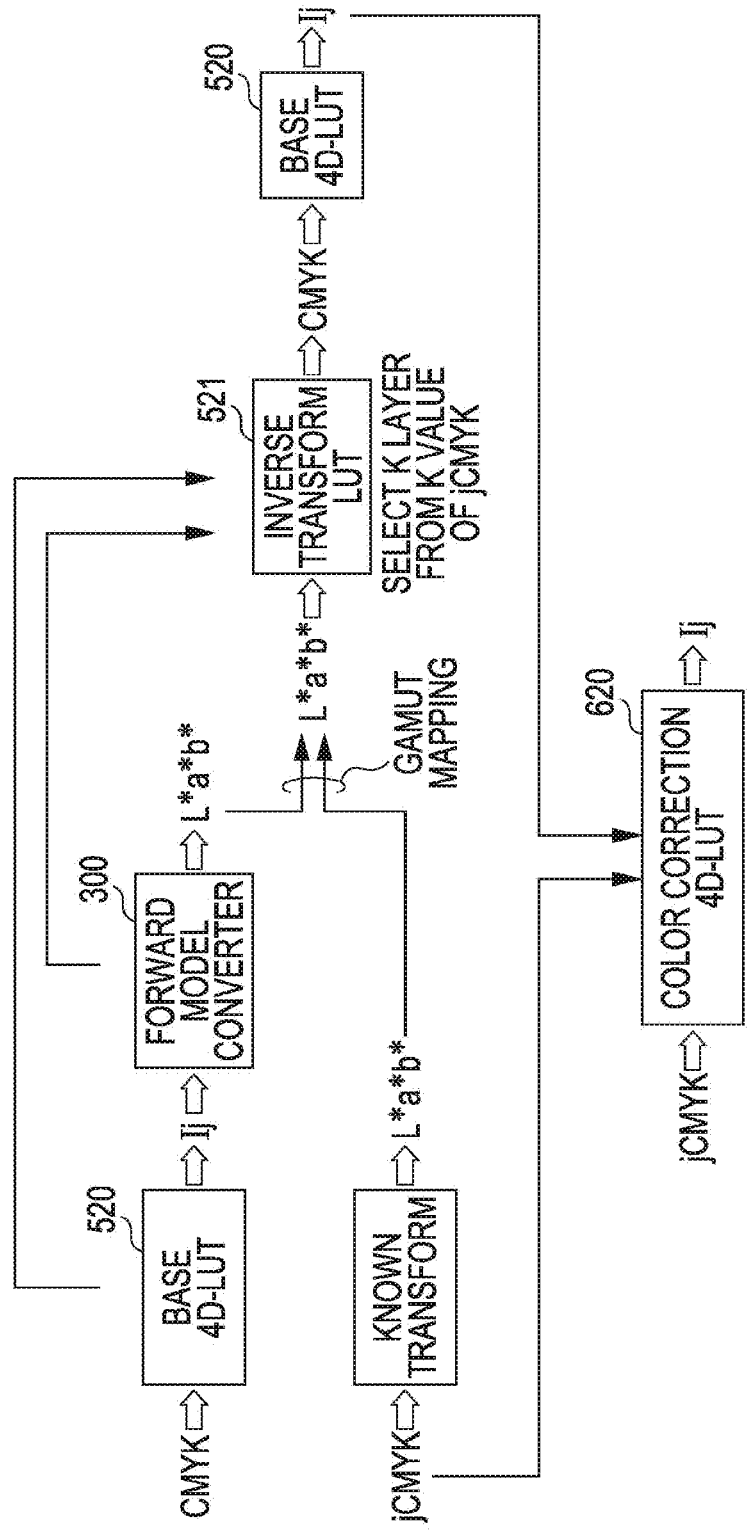

FIG. 11

DYNAMIC MODEL

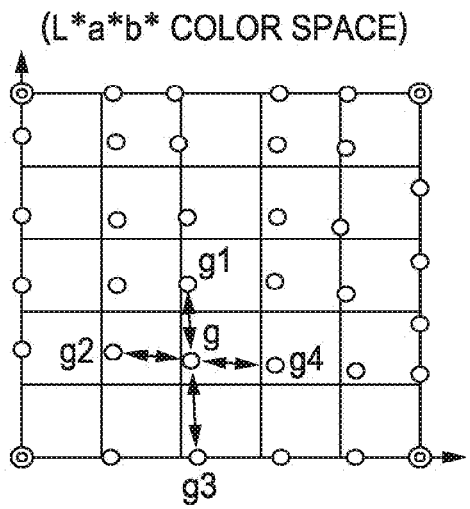

(L*a*b* COLOR SPACE)

VIRTUAL TOTAL FORCE RELATING TO FOCUSED COLOR POINT g FOR NON-UNIFORM COLOR POINTS $$\vec{F}_{pg} = \vec{F}_g - k_v \vec{V}_g$$

$$= k_p \sum_{n=1}^{N} (\vec{X}_{gn} - \vec{X}_g) - k_v \vec{V}_g$$

$\vec{F}_{pg}$ : VIRTUAL TOTAL FORCE
(ATTRACTION FORCE + RESISTANCE FORCE)

$\vec{F}_g$ : TOTAL ATTRACTION FORCE WHICH FOCUSED COLOR POINT g RECEIVES FROM ADJACENT COLOR POINT gn $-k_v \vec{V}_g$ : RESISTANCE IN ACCORDANCE WITH SPEED $\vec{V}_g$ : SPEED VECTOR OF FOCUSED COLOR POINT g $\vec{X}_g$ : POSITION VECTOR OF FOCUSED COLOR POINT g $\vec{X}_{gn}$ : POSITION VECTOR OF ADJACENT COLOR POINT gn $k_p, k_v$ : COEFFICIENT

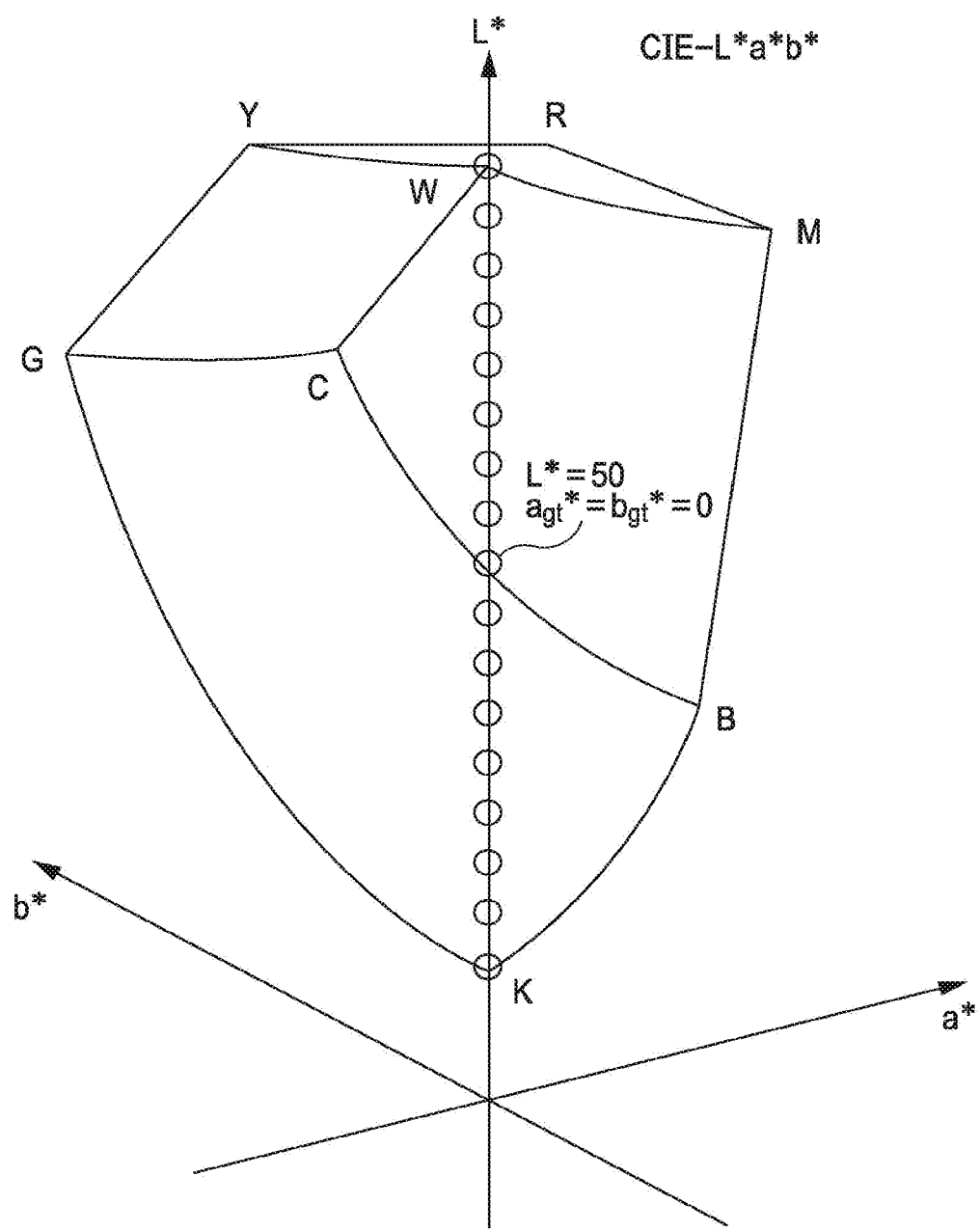

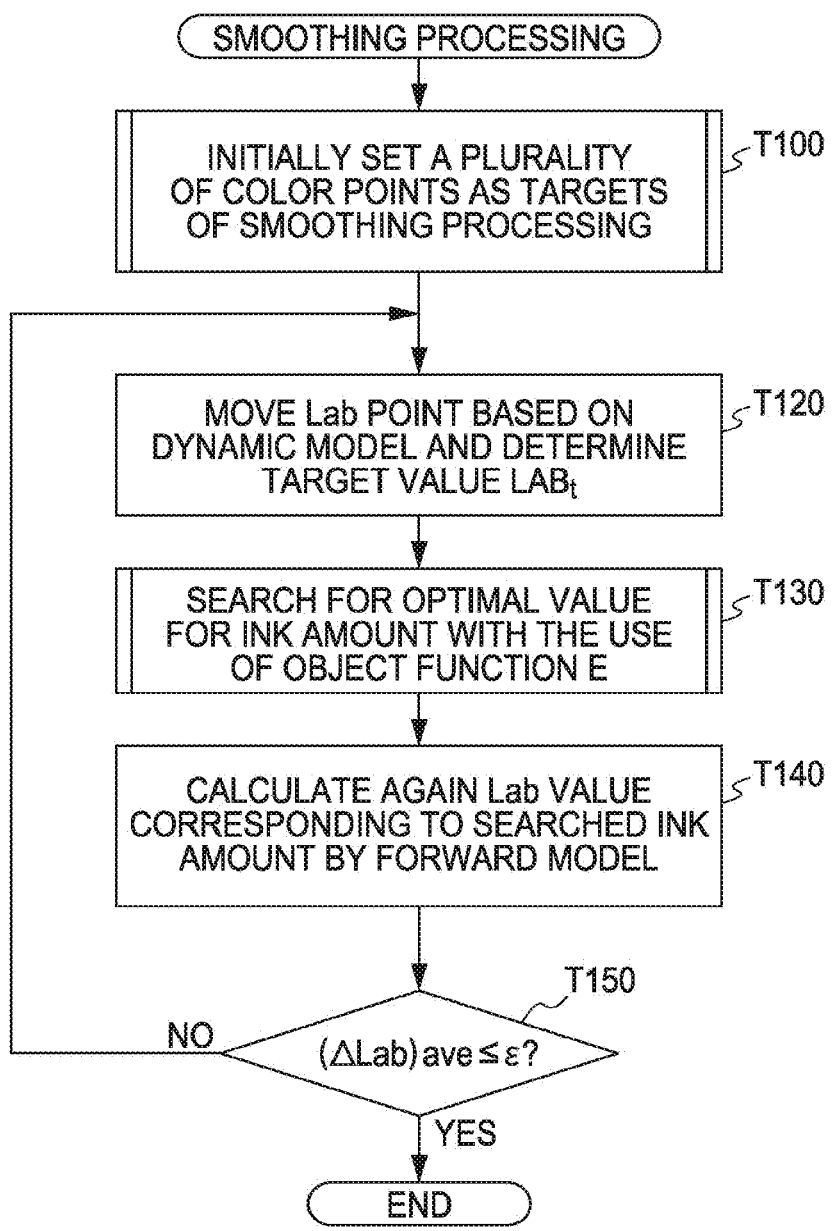

FIG. 15A
COLOR POINT AS SMOOTHING PROCESSING TARGET
(L*a*b* COLOR SPACE)

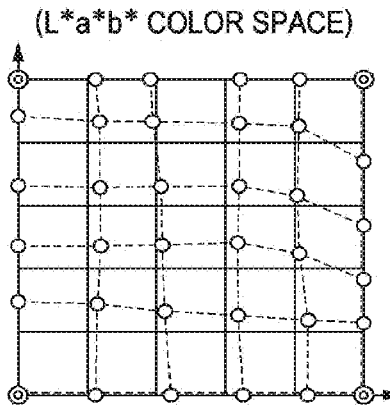

FIG. 15B
AFTER FINE DISPLACEMENT BY DYNAMIC MODE
(L*a*b* COLOR SPACE)

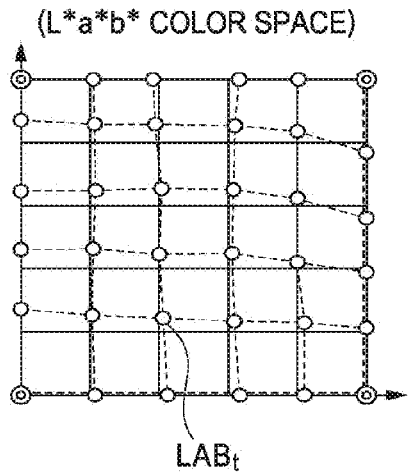

SMOOTHING PROCESSING $LAB_t$

FIG. 15C
INK AMOUNT SEARCH
(OPTIMIZATION PROCESSING BY QUADRATIC PROGRAMMING METHOD)

SEARCH FOR INK AMOUNT FOR MINIMIZING OBJECT FUNCTION E $$E = w_{L*}(\Delta L^* - \Delta L^*_t)^2 + w_{a*}(\Delta a^* - \Delta a^*_t)^2 + w_{b*}(\Delta b^* - \Delta b^*_t)^2$$
$$+ w_{GI}(\Delta GI - \Delta GI_t)^2$$
$$+ w_{CII(A)}(\Delta CII_A - \Delta CII_{At})^2 + \cdots + w_{CII(F12)}(\Delta CII_{F12} - \Delta CII_{F12t})^2$$
$$+ w_{GMI}(\Delta GMI - \Delta GMI_t)^2$$
$$+ w_{TI}(\Delta TI - \Delta TI_t)^2 \qquad \cdots (EQ1)$$

$$E = \frac{1}{2} I^T A I - gI \quad \cdots (EQ2)$$

FIG. 15D
CALCULATE AGAIN Lab VALUE FROM INK AMOUNT

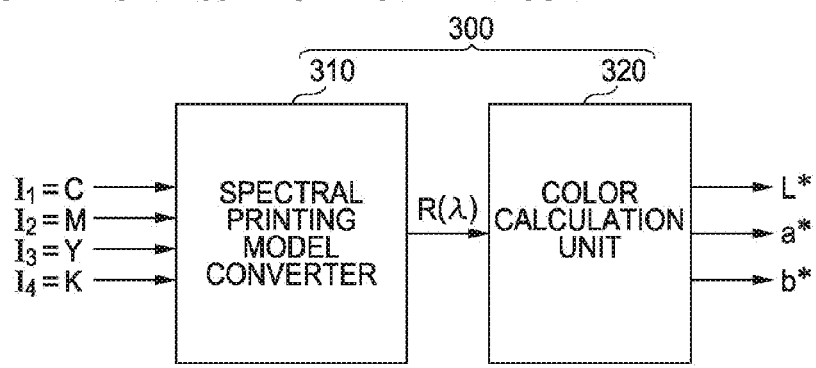

BEFORE NORMALIZATION

AFTER NORMALIZATION

BEFORE NORMALIZATION

AFTER NORMALIZATION

BEFORE APPROXIMATION

AFTER APPROXIMATION

BEFORE APPROXIMATION

AFTER APPROXIMATION

BEFORE NORMALIZATION $D_{max}$  
DUTY LIMIT VALUE $D_{SI4}$ (DIVERTED MEDIUM)

AFTER NORMALIZATION

PROFILE CREATION METHOD FOR CREATING A PROFILE DEFINING AN INK AMOUNT, PROFILE CREATION PROGRAM FOR CREATING A PROFILE DEFINING AN INK AMOUNT, AND PRINTING APPARATUS FOR PRINTING WITH REFERENCE TO A PROFILE DEFINING AN INK AMOUNT

BACKGROUND

1. Technical Field

The present invention relates to a profile creation method, a profile creation program, and a printing apparatus.

2. Related Art

A color conversion profile is information representing a correspondence relationship between an input color system and an output color system, which is used in the form of a color conversion look-up table, a color conversion function, or the like. A coordinate value of an input color system in a color conversion look-up table indicates a position of a point in a color space of the input color system, and a coordinate value of an output color system indicates a position of a point in a color space of the output color system. In this specification, a point in an arbitrary color space will also be referred to as a "color point" or a "lattice point". In addition, a color point represented by an input value and a color point represented by an output value registered in the color conversion look-up table will also be referred to as an "input lattice point" and an "output lattice point", respectively.

As a technique for smoothing an arrangement of input lattice points and output lattice points in the color conversion look-up table, a technique described in JP-A-2006-197080 which has been disclosed by the present applicant can be exemplified. According to such smoothing, an optimal ink amount for reproducing L*a*b* lattice points after movement is determined by optimization processing with the use of an object function after the movement of the lattice point in a Lab color system. The optimal ink amount is determined as an ink amount for minimizing the object function.

However, since a color forming feature (hue value feature) with respect to the same ink amount is different for each kind of printing medium, and an ink amount (duty limit value) which can adhere to a unit area is also different, there is a problem in that it is necessary to prepare an object function for each kind of printing medium in order to create a color conversion look-up table for a plurality of printing media.

Moreover, since an object function includes a term for evaluating an image quality based on a hue value of a color reproduced when each amount of ink adheres to a printing medium, there is a problem in that it is necessary to prepare a color prediction model, which is for predicting a hue value based on an ink amount, for each kind of printing medium. Preparation of a color prediction model and the like for every kind of printing media requires great effort and resources. Therefore, it can be considered that color prediction models for some kinds of printing media (basic media; diverted media) are prepared in advance and hue value prediction based on an ink amount is performed with the use of the color prediction models prepared for the basic media when a color conversion look-up table is created for every kind of printing media (creating media; diverting media) for which color prediction models have not been prepared. That is, prediction of a hue value based on an ink amount is executed with the use of the color prediction models prepared for the basic media, an ink amount is optimized by an object function based on the predicted hue value, and a color conversion look-up table for diverting media is created based on the ink amount determined through the optimization.

However, a color forming feature with respect to an ink amount is different for each printing medium as described above. Therefore, there is a concern in that in a color conversion look-up table for diverting media, which is finally obtained by executing hue value prediction with the use of the color prediction models prepared for the basic media and optimization of the ink amount by the object function, a defined ink amount (output lattice points) is eccentrically located in a certain color region (for example, an ink amount which realizes a relatively dark color formation is prescribed as many output lattice points on the diverting media), for example. Such eccentric location of the lattice points in the color conversion look-up table adversely affects later color management or further profile creation with the use of the color conversion look-up table.

SUMMARY

An advantage of some aspects of the invention is to provide a technique for creating an optimal profile for various printing media without preparing an object function and a color prediction model for each printing medium.

According to an aspect of the invention, there is provided a profile creation method according to which a profile of defining an ink amount is created by determining an ink amount for reproducing a hue value indicated by a lattice point in a device-independent color system, the method including: firstly obtaining for each chromatic ink a first chromaticity feature representing a variation in a chromaticity on a first print medium corresponding to a variation in an ink amount up to a limit value of an ink amount which can adhere to the first print medium; secondly obtaining for each chromatic ink a second chromaticity feature representing a variation in a chromaticity on a second print medium, which is different from the first print medium, corresponding to a variation in an ink amount up to a limit value of an ink amount which can adhere to the second print medium; determining a new limit value of the ink amount based on the second chromaticity feature after approximation for each kind of chromatic ink by correcting and approximating the second chromaticity feature to the first hue value feature for each kind of chromatic ink; determining an ink amount which is equal to or less than the newly determined limit value to execute the optimization when the ink amount for reproducing the chromaticity indicated by the lattice point is determined by the ink amount optimization with the use of an object function for evaluating image quality when a designated amount of ink is made to adhere to the first print medium; and creating a profile for the second print medium, for which the converted ink amount has been defined, by converting the ink amount determined by the optimization with a conversion relationship based on the first chromaticity feature and the second chromaticity feature for each chromatic ink.

With such a configuration, a new limit value for the ink amount is determined based on the chromaticity feature of the second print medium (second chromaticity feature) after approximation to the chromaticity feature of the first print medium (first chromaticity feature), and an ink amount is determined among the ink amounts which is equal to or less than the new limit value when the ink amount is determined by the ink amount optimization with the use of the object function for evaluating image quality when the ink is made to adhere to the first print medium. Therefore, each ink amount after converting the thus determined ink amount based on the conversion relationship of the first chromaticity feature and the second chromaticity feature (each ink amount defined by the profile for the second print medium) is an optimal ink amount for reproducing each hue value on the second print medium, and each hue value (the lattice point in the device-independent color system) reproduced by each ink amount is less one-sided in the color space. That is, it is possible to create an optimal profile for the second print medium. In addition, the first print medium corresponds to a basic medium while the second print medium corresponds to a diverting medium.

It is preferable that in determining the limit value, the new limit value be determined based on a maximum value of the ink amount in the second hue value feature after the approximation.

With such a configuration, it is possible to determine an optimal limit value in consideration of creating a profile for the second print medium with the use of the optimization result as a limit value of the ink amount for optimizing the ink amount on the assumption of the first print medium.

It is preferable that in determining the restriction value, curves be generated based on each reference point after displacement, by displacing a plurality of reference points in the second chromaticity feature in an ink amount direction, degrees of approximation between the generated curves and the first color chromaticity feature be evaluated, and a curve with the highest degree of approximation be regarded as the second chromaticity feature after the approximation.

With such a configuration, it is possible to easily obtain the second chromaticity feature after the correction which approximates to the first chromaticity feature.

It is preferable that in determining the ink amount, a lattice point to be restricted to an achromatic color be restricted to a hue value deviated from the achromatic color in a color phase direction based on a tone difference between the first print medium and the second print medium.

With such a configuration, it is possible to restrict an actual hue value of a lattice point to an achromatic color in consideration of a tone difference between the first print medium and the second print medium.

It is preferable that in determining the limit value, whether the new limit value of the ink amount obtained based on the second chromaticity feature after the approximation for each chromatic ink is determined or whether an average value of new limit values obtained based on the second chromaticity feature after the approximation for chromatic ink with adjacent color phases be selected based on a color phase angle between the chromatic ink with adjacent color phases and maximum chromaticity which can be expressed by the chromatic ink with adjacent color phases.

With such a configuration, a new limit value determination method is selected based on an adjacent degree of color phases between the chromatic ink with adjacent color phases and maximum chromaticity of each kind of chromatic ink. That is, by determining a new limit value in consideration of an adjacent degree of color phases and a chromaticity range of each kind of ink, a gradation feature of a hue value reproduced by an ink amount (each ink amount defined in the profile for the second print medium) determined in determining the ink amount becomes satisfactory without deterioration in color phases between the chromatic ink with adjacent color phases.

It is preferable that in determining the limit value, whether the new limit value of the ink amount obtained based on the second chromaticity feature after the approximation for each chromatic ink is determined or whether the new limit value obtained for chromatic ink with maximum expressible chromaticity among kinds of chromatic ink is determined to be a new limit value for all the kinds of chromatic ink when a color phase angle between chromatic ink with adjacent color phases is equal to or less than a predetermined value be selected based on the color phase angle between the chromatic ink with adjacent color phases and maximum expressible chromaticity of the chromatic ink with adjacent color phases.

With such a configuration, a new limit value determination method is selected based on an adjacent degree of color phases between the chromatic ink with adjacent color phases and the maximum chromaticity of each kind of chromatic ink. That is, by determining a new limit value in consideration of an adjacent degree of color phases and a chromaticity range of each kind of ink, the gradation feature of a hue value reproduced by an ink amount (each ink amount defined in the profile for the second print medium) determined in determining the ink amount becomes satisfactory without deterioration in the color phases between chromatic ink with adjacent color phases.

The technical spirit of the invention can be realized as modes other than the profile creating method. For example, it is possible to cover the invention of a profile creation apparatus provided with a unit of realizing the steps included in the profile creation method and the invention of a profile creation program which causes a computer to realize the steps included in the profile creation method. In addition, the technical spirit of the invention includes a configuration corresponding to the aforementioned profile creation apparatus and can cover the invention of a print control apparatus which controls a printer as a printing apparatus by using the profile for color conversion processing of image data and the inventions of the method and program corresponding to the print control apparatus. Furthermore, it is also possible to cover a printing apparatus in which the profile created as described above is embedded to be used for color conversion processing of image data (a printing apparatus causes an amount, which is obtained by performing color conversion with reference to the profile, of ink to adhere to a printing medium), a method and a program corresponding to such a printing apparatus, and the invention of a manufacturing method for such a printing apparatus.

BRIEF DESCRIPTION OF THE DRAWINGS

The invention will be described with reference to the accompanying drawings, wherein like numbers reference like elements.

FIG. 3 is a diagram showing a weight designation UI image.

FIGS. 7A to 7C are explanatory diagrams showing processing contents when a base 3D-LUT is created by Steps S100 to S300 in FIG. 6.

FIGS. 8A to 8C are explanatory diagrams showing correspondence relationships between hue values in an RGB color system as an input color system and hue values in a Lab color system.

FIGS. 9A to 9C are explanatory diagrams showing processing contents when a base 4D-LUT is created by Steps S100 to S300 in FIG. 6.

FIGS. 10A and 10B are explanatory diagram showing a creation method of a color correction LUT with the use of a base LUT.

FIG. 11 is an explanatory diagram showing a dynamic model used in smoothing processing according to an embodiment.

FIG. 12 is a diagram showing a state in which lattice points corresponding to gray axis lattice points are restricted by a gray target.

FIG. 13 is a flowchart showing typical processing procedure for smoothing processing.

FIGS. 15A to 15D are explanatory diagram showing processing contents of Steps T120 to T150 in FIG. 13.

DESCRIPTION OF EXEMPLARY EMBODIMENTS

Figure 1:
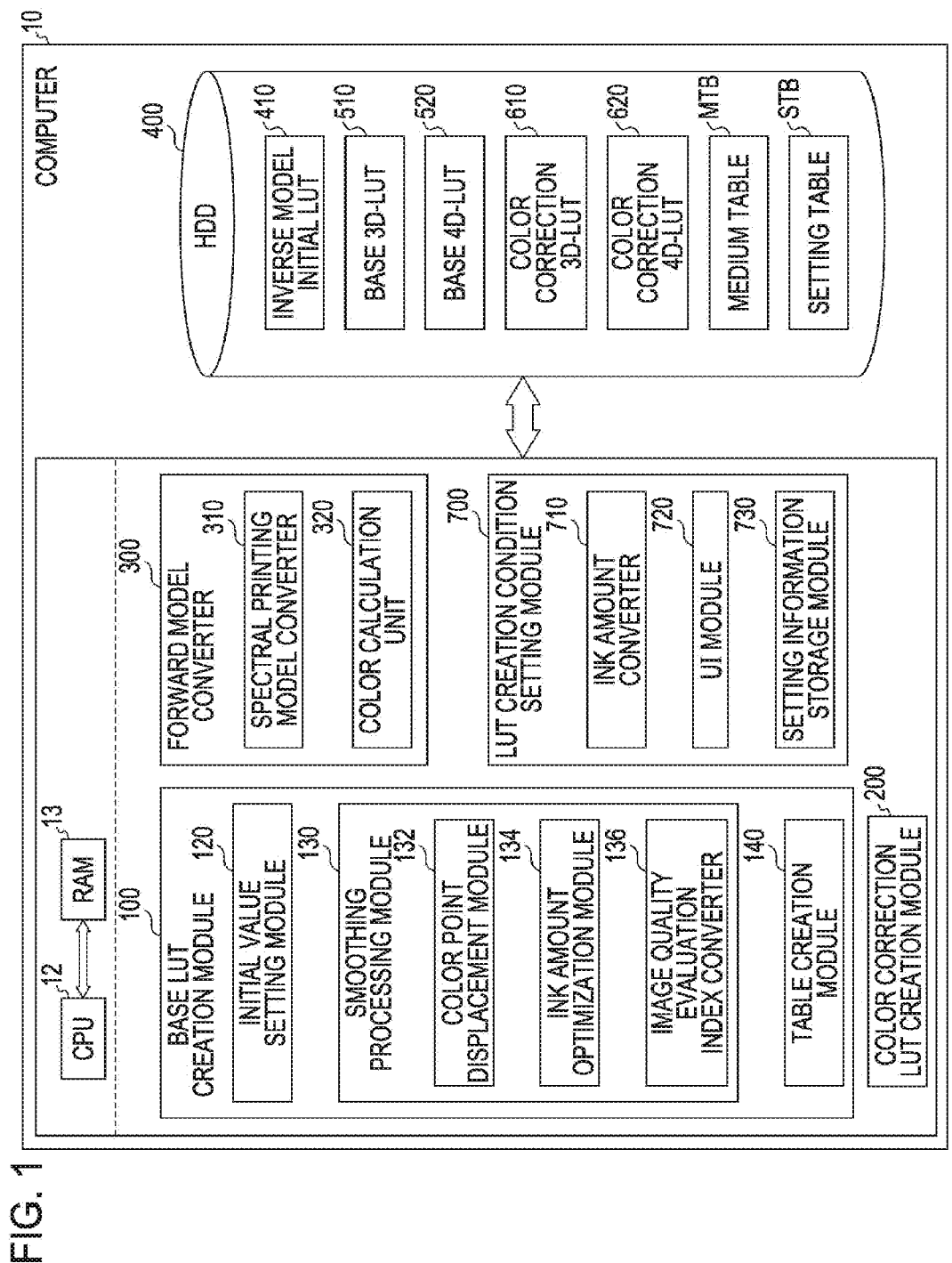
FIG. 1 is a block diagram showing a configuration of a profile creation apparatus according to an embodiment.

Next, description will be given of an embodiment of the invention in the following order.
A. Apparatus configuration and overall processing procedure
B. Basic medium LUT creation procedure
  B-1. Overall procedure
  B-2. Dynamic model
  B-3. Processing procedure for smoothing processing (smoothing and optimization processing)
  B-4. Content of optimization processing
C. Configuration of printing apparatus
D. Diverting media LUT creation procedure
E. Modified Example A. Apparatus Configuration and Overall Processing Procedure FIG. 1 is a block diagram showing a configuration of a profile creation apparatus according to an embodiment of the invention. The profile creation apparatus is a subject which executes a profile creation method. Main parts of the apparatus are substantially realized by a computer 10.

Specifically, a CPU 12 provided in the computer 10 realizes each of the functions such as a base LUT creation module 100, a color correction LUT creation module 200, an LUT creation condition setting module 700, and the like by a reading a program (a profile creation program or the like) stored on a hard disk drive (HDD) 400 or the like and executing computation based on the program while developing the program on a RAM 13.

A display apparatus (a liquid crystal display, for example) which is not shown in the drawing is connected to the computer 10 and performs UI (user interface) display necessary for each processing. Moreover, an input apparatus (a keyboard and a mouse, for example) which is not shown in the drawing is connected to the computer 10, and information necessary for each processing is input via the input apparatus. In addition, a printer 20 (FIG. 17) and a colorimeter which is not shown in the drawing are connected to the computer 10.

Moreover, the computer 10 is provided with a forward model converter 300. The forward model converter 300 is further provided with a spectral printing model converter 310 and a color calculation unit 320. The forward model converter 300 corresponds to a color prediction model. Functions of each part will be described later. The term "LUT" is an abbreviation of look-up table as a kind of profile.

The base LUT creation module 100 includes an initial value setting module 120, a smoothing processing module 130, and a table creation module 140. The smoothing processing module 130 includes a color point displacement module 132, an ink amount optimization module 134, and an image quality evaluation index converter 136.

The LUT creation condition setting module 700 is provided with an ink amount converter 710, a UI module 720, and a setting information storage module 730.

The setting information storage module 730 manages a medium table MTB and a setting table STB stored on the HDD 400.

The functions of each part will be described later.

The HDD 400 is a storage apparatus for storing an inverse model initial LUT 410, a base 3D-LUT 510, a base 4D-LUT 520, a color correction 3D-LUT 610, a color correction 4D-LUT 620, and the like. However, LUTs other than the inverse model initial LUT 410 are created by the base LUT creation module 100 or the color correction LUT creation module 200. The base 3D-LUT 510 is a color conversion look-up table in which an RGB color system is an input and an ink amount is an output. The base 4D-LUT 520 is a color conversion look-up table in which a CMYK color system is an input and an ink amount is an output. In addition, "3D" and "4D" represent the number of input values.

The RGB color system and the CMYK color system as input color systems of the base LUTs 510 and 520 are not so-called device-dependent color systems but virtual color systems (or abstract color systems) not set in relation to a specific device. The base LUTs 510 and 520 are used for creating color correction LUTs 610 and 620, for example. The "base LUT" is named because the look-up table is used as a base for creating a color correction LUT. In addition, the "base LUT" corresponds to a "profile" created by the profile creation method according to an embodiment of the invention.

The color correction LUTs 610 and 620 are look-up tables for converting standard device-dependent color systems (an sRGB color system, a JAPAN COLOR 2001 color system, for example) into an ink amount of a specific printer.

Description will be given later of the inverse model initial LUT 410.

In this embodiment, an LUT for a printer capable of using four kinds of ink including cyan (C), magenta (M), yellow (Y), and black (K) is created. Although the four kinds of ink are assumed in this embodiment for simplicity of explanation, it is also possible to apply an embodiment of the invention to a case in which an LUT for other kinds of ink is created.

Figure 2:
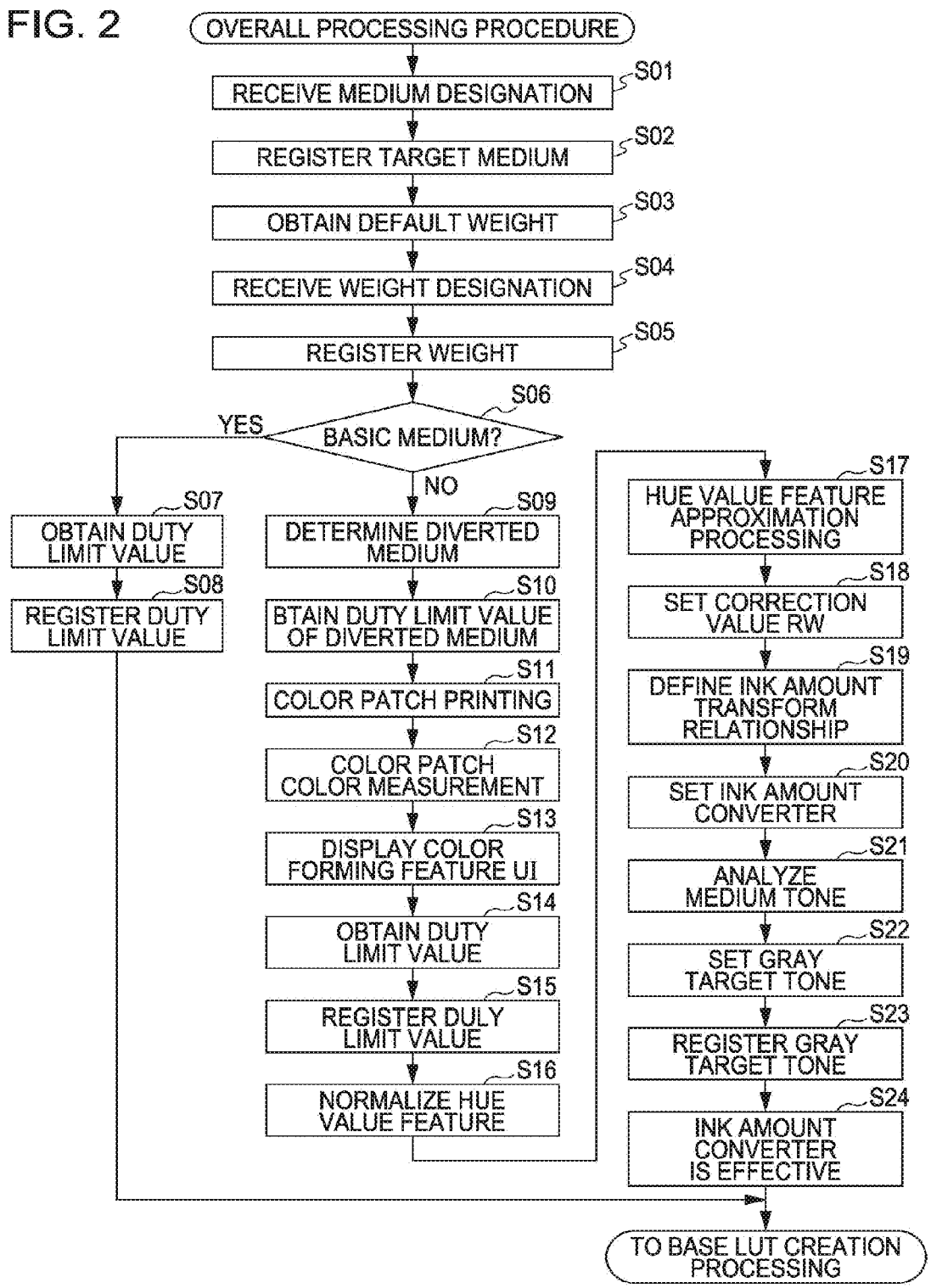
FIG. 2 is a flowchart showing an overall processing procedure according to an embodiment.

FIG. 2 is a flowchart showing an overall processing procedure according to this embodiment, which is executed by the computer 10. In Step S01, UI module 720 of the LUT creation condition setting module 700 receives designation of a medium, for which it is desired to create an LUT, via the display apparatus and the input apparatus. The UI module 720 displays a list of each medium and causes the display apparatus to display a medium selection UI image from which a user is allowed to select a desired medium. For example, the user can select a basic gloss paper, a basic matte paper, a basic normal paper, a basic proof paper, or the like as a basic medium. The term "basic medium" means a printing medium provided by a printer manufacturer, for example, and particularly printing media for which the forward model converter 300 (spectral printing model converter 310) and the image quality evaluation index converter 136 are prepared in advance in the embodiment of the invention. Features of the basic medium are known, and data specifying a color forming feature and a duty limit value when ink is made to adhere to each basic medium is stored in advance on the medium table MTB. The basic gloss paper, the basic matte paper, the basic normal paper, and the basic proof paper respectively belongs to a gloss paper group, a matte paper group, a normal paper group, and a proof group.

On the other hand, in the medium selection UI image, it is possible to select a gloss paper group sheet, a matte paper group sheet, a normal paper group sheet, a proof group sheet, a non-classified sheet, or the like as a diverting medium according to an embodiment of the invention as well as a basic medium. The "diverting media" means printing media which is not the same as any of the basic media and particularly printing media for which the forward model converter 300 (spectral printing model converter 310) and the image quality evaluation index converter 136 are not prepared in advance in the embodiment of the invention. When the user recognizes a group of a medium for which an LUT is created, it is possible to select a medium of the group. When the user does not recognizes the group of the medium, or it is difficult to classify the medium, it is possible to select a non-classified sheet. In addition, another configuration is also applicable in which the user does not designate a medium and a group of a medium is automatically determined based on a color phase obtained by performing color measurement on the medium. If the medium as a target of LUT creation is designated, information specifying the medium is registered in the setting table STB (Step S02).

In Step S03, the LUT creation condition setting module 700 obtains a default weight $w_{L*}, w_{a*} \ldots$ corresponding to the designated medium with reference to the medium table MTB stored on the HDD 400. The medium groups include a gloss paper group, a matte paper group, a normal paper group, a proof group, and a non-classified group, and the default weight $w_{L*}, w_{a*} \ldots$ for each group is stored on the medium table MTB. In Step S04, the UI module 720 causes the display apparatus to display a weight designation UI image and causes the input apparatus to receive designation of weight $w_{L*}, w_{a*} \ldots$.

Figure 4:
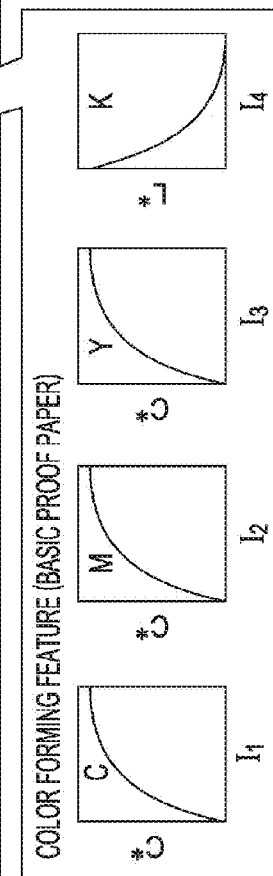
FIG. 4 is a diagram showing an example of a medium table MTB.

FIG. 3 shows the weight designation UI image, and FIG. 4 shows an example of the medium table MTB. In the weight designation UI image, designation of weight $w_{L*}, w_{a*} \ldots$ (0 to 100%) for each term constituting an object function E which will be described later is received. As shown in the drawing, a slider bar is provided for each of the setting items including a feature of granularity, color constancy, running cost, gamut, and a gradation feature, and increased weight is set for individual items if individual pointers are made to slide to the right side. In addition, a center position of the slider bar corresponds to a center value (50%) of the weight $w_{L*}, w_{a*} \ldots$. A relationship between a position of the pointer in the slider bar and each value of weight $w_{L*}, w_{a*} \ldots$ may be a relationship of monotonic increase and can be defined by various functions such as a linear function, quadratic function, and the like.

Specifically, if a pointer for the feature of granularity in the weight designation UI image is made to slide to the further right side, an increased value of weight $w_{GI}$ is set. If a pointer for the color constancy is made to slide to the further right side, an increased value of weight $w_{CII(A)} \ldots w_{CII(F12)}$ is set. In this embodiment, the value of weight $w_{CII(A)} \ldots w_{CII(F12)}$ is equally set. It is a matter of course that the value of weight $w_{CII(A)} \ldots w_{CII(F12)}$ may be differentiated depending on the importance of the light source. If a pointer for the running cost is made to slide to the further right side, an increased value of weight $w_{TI}$ is set. If a pointer for the gamut is made to slide to the further right side, an increased value of weight $w_{GMI}$ is set. If a pointer for the gradation feature is made to slide to the further right side, an increased value of $w_{L*}, w_{a*}, w_{b*}$ is set. In this embodiment, the value of weight $w_{L*}, w_{a*}, w_{b*}$ is equally set. In addition, another configuration is also applicable in which it is possible to set a different weight $w_{L*}, w_{a*}, w_{b*}$ for each of luminosity L* and chromaticity a*, b*. A position of a pointer and a value of weight $w_{L*}, w_{a*} \ldots$ may be in a relationship of monotonic increase and can be defined as various functions such as a linear function, quadratic function, and the like.

In Step S04, an initial position of each pointer when the slider bars are firstly displayed is a position corresponding to the default weight $w_{L*}, w_{a*} \ldots$ obtained from the medium table MTB in Step S03. As the default weight $w_{L*}, w_{a*} \ldots$, a preferable value is set in advance for each group of the media in the medium table MTB. If an enter button in the weight designation UI image is clicked without changing the initial positions of the pointers by the user, the default weight $w_{L*}, w_{a*} \ldots$ obtained in Step S03 is set as it is.

Specifically, as shown in FIG. 4, for the normal paper group, the default weight $w_{TI}$ for the running cost is set to be greater than the center value, the default weight $w_{GMI}$ for the gamut is set to be smaller than the center value, and the others are set to the center values. For the matte paper group and the non-classified group, the default weight $w_{L*}, w_{a*} \ldots$ for all items are set to the center values. For the gloss paper group, the weight $w_{GI}$, the weight $w_{L*}, w_{a*}, w_{b*}$, and the weight $w_{GMI}$ for the feature of granularity, the gradation feature, and the gamut are set to be greater than the center values, and the others are set to the center values. For the proof paper group, only the weight $w_{GMI}$ for gamut is set to be greater than the center value, and the others are set to the center values.

Since the default weight $w_{L*}, w_{a*} \ldots$ is set to a preferable value in consideration of a use purpose of the medium of each group, it is not basically necessary to change. When the user particularly intends to change the weight, it is possible to set desired weight $w_{L*}$, $w_{a*}$ ... by sliding the pointers from initial positions to desired positions. In addition, as for each weight $w_{L*}$, $w_{a*}$ ..., a relative size difference has meaning, and uniform increase or decrease as a whole does not have much meaning. Accordingly, a configuration is also applicable in which when a pointer for a certain item is displaced, pointers for the other items are uniformly displaced in the opposite direction.

In Step S05, the setting information storage module 730 registers in the setting table STB the weight $w_{L*}$, $w_{a*}$ ... corresponding to the position of each pointer when the enter button in the weight designation UI image is clicked.

In Step S06, it is determined whether or not the medium designated in Step S01 is a basic medium, and a duty limit value for the basic medium is obtained with reference to the medium table MTB in the case of the basic medium (Step S07). In this embodiment, the four kinds of CMYK ink are discriminated by subscript j (j=1 to 4) of a natural number, and individual ink amounts $I_1$ to $I_4$ to adhere to the medium are represented by vectors $I=(I_1, I_2, I_3, I_4)$. The ink amount $I_j$ (including $I_{j(R, G, B)}$, $\Delta I_j$, $I_{jr}$, and $h_j$ which will be described later) represented with no subscript j means a matrix (vector) including ink amount $I_j$ of each ink as each. Moreover, the subscript j (j=5 to 7) represents an ink amount of a secondary color when two kinds among three kinds of CMY ink are mixed. That is, it is assumed that $I_5=I_1+I_2$, $I_6=I_1+I_3$, $I_7=I_2+I_3$. The ink amounts $I_5$ to $I_7$ respectively reproduces colors corresponding to color phases of blue (B), red (R), and green (G) on the medium. Furthermore, the subscript j (j=8) represents an ink amount when all the four kinds of CMYK ink are mixed. That is, it is assumed that $I_8=I_2+I_2+I_3+I_4$.

In this embodiment, the ink amount $I_j$ of each ink is expressed by 8 bits. As shown in FIG. 4, the duty limit value $D_{Ij}$ is stored for each individual ink (primary color), the total of the ink as a secondary color, and the total of all the ink. The duty limit value $D_{Ij}$ means a maximum ink amount which can adhere to a unit area with respect to each basic medium, and a lower limitation value at which ink bleeding occurs, for example, is set. Physical properties of ink droplets on the medium are different depending on the combinations of the ink and the media, and duty limit values $D_{Ij}$ which are different depending on the combinations are set. In addition, since a physical property which is different from that in an individual ink is exhibited even in a case in which a plurality of kinds of ink are mixed, the duty limit values $D_{Ij}$ (j=1 to 8) are set not only for the primary color but also for the secondary color (mixed color of two kinds of ink) and the total of all the ink. If the duty limit value $D_{Ij}$ can be obtained for the basic medium, the setting information storage module 730 causes the setting table STB to store the obtained duty limit value $D_{Ij}$ in Step S08. Moreover, in Step S08, the setting table STB is made to store an invalid flag indicating that the ink amount converter 710 is invalid. In this specification, it is assumed that a range of the subscript j in the case of a simple description of an ink amount $I_j$ is from 1 to 4 and a range of the subscript j in the case of a description of the duty limit value $D_{Ij}$ is from 1 to 8.

Figure 5:
FIG. 5 is a diagram showing an example of a setting table STB.

FIG. 5 shows an example of the setting table STB. When a basic medium is designated, a kind of aforementioned designated medium, weight $w_{L*}$, $w_{a*}$ ..., a duty limit value $D_{Ij}$, an invalid flag, and a tone of a gray target ($a_{gt}*$, $b_{gt}*$) are stored in the setting table STB. In the case of a basic medium, the tone of the gray target ($a_{gt}*$, $b_{gt}*$) is set to (0, 0). On the other hand, when a diverting medium is designated, processing (from Step S09) which is different from that described above is executed. However, description will be firstly completed of the processing for creating an LUT when the basic medium is designated.

Figure 6:
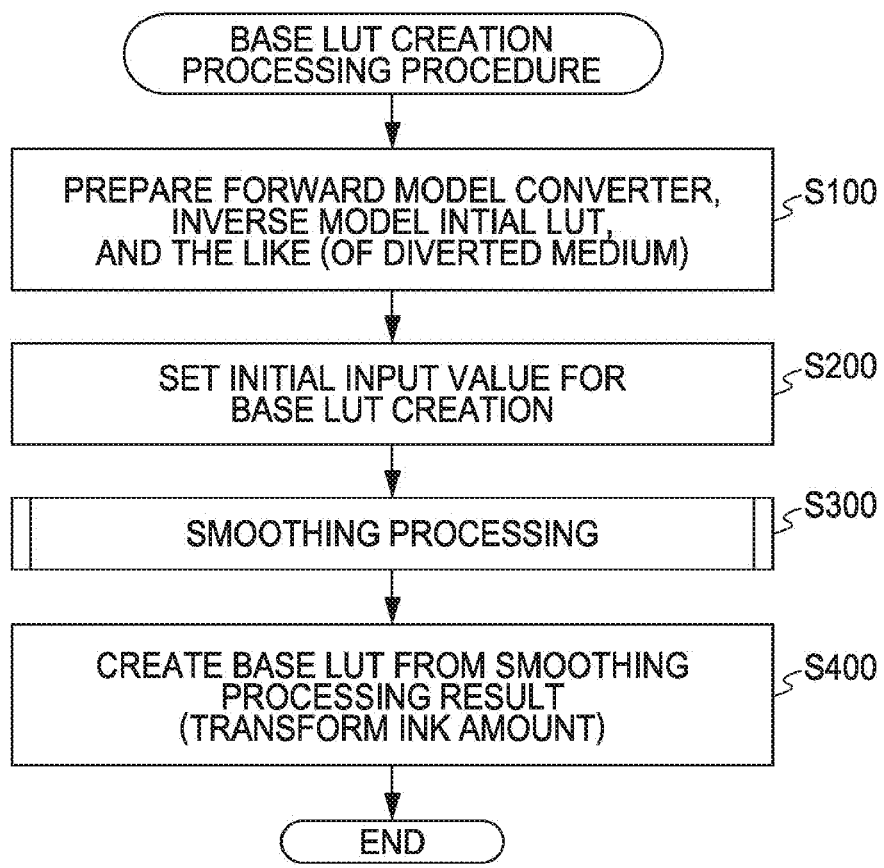
FIG. 6 is a flowchart showing a base LUT creation processing procedure according to an embodiment.

B. Basic Medium LUT Creation Procedure
  B-1. Overall Procedure
  FIG. 6 is a flowchart showing a procedure for creating a basic medium base LUT by the computer 10 according to the embodiment. FIGS. 7A to 7C are explanatory diagrams showing processing contents when a base 3D-LUT is created by Steps S100 to S300 in FIG. 6. In Step S100, the forward model converter 300, the inverse model initial LUT 410, and the image quality evaluation index converter 136 are prepared (activated) based on information stored on the setting table STB. As described above, since the spectral printing model converter 310 and the image quality evaluation index converter 136 for the basic medium are prepared in advance for the basic media, the spectral printing model converter 310 and the image quality evaluation index converter 136 are activated and brought into available states. In addition, since the invalid flag is added to the setting table STB, the ink amount converter 710 is not activated.

Here, the "forward model" means a conversion model which predicts a color measurement value from an ink amount. That is, the forward model converter converts an ink amount $I_j$ into a hue value of a device-independent color system. On the other hand, the "inverse model" means a conversion model which predicts an ink amount from a color measurement value. That is, the inverse model converter converts a hue value of a device-independent color system into an ink amount. In this embodiment, a CIE-Lab color system will be employed and described as a device-independent color system. Hereinafter, a hue value of the CIE-Lab color system will be simply referred to as an "L*a*b* value" or an "Lab value".

As shown in FIG. 7A, the spectral printing model converter 310 constituting a former stage of the forward model converter 300 converts ink amounts $I_j$ of a plurality of kinds of ink into spectral reflectivity $R(\lambda)$ of color patches to be formed when printing is performed on a corresponding basic media. In this embodiment, the spectral printing model converter 310 set the ink amounts $I_j$ of the above-described four kinds of ink as input. In addition, the term "color patch" means a chromatic patch when narrowly used while the "color patch" in this specification is widely used to indicate a color patch including an achromatic patch as well. In addition, "print" indicates that ink is made to adhere to a medium in accordance with ink amounts.

The color calculation unit 320 calculates the hue values of the Lab color system from the spectral reflectivity $R(\lambda)$ calculated by the spectral printing model converter 310. In the calculation of the hue values, a light source (for example, a standard light D50) selected in advance is used as an observation condition of the color patch. In addition, as a method of creating the spectral printing model converter 310, it is possible to employ known various techniques, and a method described in JP-T-2007-511175 can be employed, for example.

The inverse model initial LUT 410 is a look-up table in which the L*a*b* value is an input and the ink amount $I_j$ is output. The L*a*b* value as an input value of the inverse model initial LUT 410 is a representative value of each small cell. The ink amount $I_j$ as an output value reproduces one L*a*b* value in a cell.

A representative value of each small cell is determined as follows, for example. In the initial LUT 410, an L*a*b* space is firstly divided into a plurality of small cells, and an optimal ink amount $I_j$ is selected and registered for each small cell.

The selection of the optimal ink amount $I_j$ is made in consideration of an image quality of the color patch printed on the basic medium with the ink amount $I_j$, for example. In general, there are multiple combinations of ink amounts $I_j$ for reproducing a certain L*a*b* value. However, selection of an optimal ink amount from a desired viewpoint such as an image quality or the like is registered in the initial LUT 410 from among the multiple combinations of the ink amounts $I_j$ for reproducing substantially the same L*a*b* values.

As a method of creating an initial LUT 410 by selecting an optimal ink amount for each small cell, it is possible to employ various known techniques, and a method described in JP-T-2007-511175 can be employed, for example. According to JP-T-2007-511175, the spectral printing model converter 310 and the inverse model initial LUT 410 are created by forming a color patch on a target print medium. That is, when the basic medium base LUT is created, the spectral printing model converter 310 and the inverse model initial LUT 410 created by forming a color patch on a basic medium are prepared.

In the initial LUT 410 prepared as described above, the L*a*b* value as an input value and the ink amount as an output value are not exactly in a correspondence relationship, and a value which is slightly different from the input value of the initial LUT 410 is obtained when the ink amount as an output value is converted into an L*a*b* value with the forward model converter 300. However, an initial LUT 410 in which an input value and an output value are completely in a correspondence relationship may be used.

In addition, it is also possible to create a base LUT without using the initial LUT 410. That is, it is possible to create the base LUT even if an LUT in which all ink amounts as output values are set to the same value is used instead of the initial LUT in which optimal ink amounts are set as described above, for example.

In Step S200 in FIG. 6, the initial input value for creating the base LUT is set by the user. FIG. 7B shows an example of a configuration of the base 3D-LUT 510 and the initial input value setting thereof. As input values of the base 3D-LUT 510, values determined in advance as values of RGB at substantially equal intervals are set. Since it is considered that one group of RGB values represents a point in the RGB color space, one group of RGB values will also be referred to as an "input lattice point". In Step S200, initial values of the ink amounts $I_j$ for a few of input lattice points selected in advance from among the plurality of input lattice points are input by the user. In this embodiment, all ($17^3$) input lattice points which satisfy (R, G, B)=($16n_1-1$, $16n_2-1$, $16n_3-1$) when each value of RGB is expressed by 8 bits are selected. Here, it is assumed that $n_1$ to $n_3$ are integers from 0 to 16, and R, G, B=0 when R, G, B=−1. The input lattice points for which initial input values are set include input lattice points corresponding to vertexes of a three-dimensional color solid in the RGB color space. At the vertexes of the three-dimensional color solid, each value of RGB becomes a minimum value or a maximum value in the defined ranges. Specifically, for eight input lattice points including (R, G, B)=(0, 0, 0), (0, 0, 255), (0, 255, 0), (255, 0, 0), (0, 255, 255), (255, 0, 255), (255, 255, 0), and (255, 255, 255), initial input values of the ink amounts $I_j$ are set. In addition, seventeen input lattice points satisfying $n_1=n_2=n_3$ (hereinafter, described as gray lattice points) are present on a gray axis on the RGB color space. Moreover, all ink amounts with respect to the input lattice points satisfying (R, G, B)=(255, 255, 255) are set to zero. The ink amounts $I_j$ with respect to the other input lattice points are arbitrary and set to zero, for example. In the example of FIG. 7B, an ink amount with respect to an input lattice point (R, G, B)=(0, 0, 32) is a value other than zero, which is a value when this LUT 510 is completed.

In Step S300 in FIG. 6, the smoothing processing module 130 (FIG. 1) executes smoothing processing (smoothing and optimization processing) based on the initial input values set in Step S200. The smoothing processing is processing for displacing a plurality of lattice points in the L*a*b* space and changing a distribution of the lattice points to be a smooth distribution of substantially equal intervals.

FIG. 7C shows a processing content in Step S300. On the left side in FIG. 7C, a distribution of a plurality of hue values in a state before the smoothing processing is shown by double circles and white circles. On the right side in FIG. 7C, a distribution of lattice points (hue values) after the smoothing processing is shown. The L*a*b* coordinate values of the hue values are values obtained by converting ink amounts $I_j$ with respect to a plurality of input lattice points in the base 3D-LUT 510 into the L*a*b* values with the use of the forward model converter 300 (FIG. 7A). As described above, initial input values for the ink amounts $I_j$ are set only for a few of partial input lattice points in Step S200. Thus, initial values for the ink amounts with respect to the other input lattice points are set based on the initial input values by the initial value setting module 120 (FIG. 1). The initial value setting method will be described later.

Specifically, the hue values shown in FIGS. 7A to 7C constitute the three-dimensional color solid CS in the L*a*b* space, and the three-dimensional color solid CS has the following eight vertexes (double circles in FIG. 7C):

a paper black point corresponding to a point $P_K$: (R, G, B)=(0, 0, 0);

a paper white point corresponding to a point $P_W$: (R, G, B)=(255, 255, 255);

a cyan point corresponding to a point $P_C$: (R, G, B)=(0, 255, 255);

a magenta point corresponding to a point $P_M$: (R, G, B)=(255, 0, 255);

a yellow point corresponding to a point $P_Y$: (R, G, B)=(255, 255, 0);

a red point corresponding to a point $P_R$: (R, G, B)=(255, 0, 0);

a green point corresponding to a point $P_G$: (R, G, B)=(0, 255, 0); and a blue point corresponding to a point $P_B$: (R, G, B)=(0, 0, 255).

In the smoothing processing, an optimal ink amount $I_j$ for reproducing an L*a*b* value of each lattice point after the displacement is further determined by the optimization of the object function. If the optimal ink amount is registered as an output value of the base LUT 510, the base LUT 510 is completed.

Next, description will be given of a correspondence relationship between the three-dimensional color solid CS shown in FIG. 7C and a color point of an input color system (input lattice point) with reference to FIGS. 8A to 8C. As shown in the drawings, the input color system of the base LUT 510 has meaning as a color system representing an entire color region which can be reproduced by the output color system of the base LUT 510, before and after the smoothing.

This is because the vertexes of the three-dimensional color solid CS for the Lab color system have one-to-one correspondence relationships with the vertex of the three-dimensional color solid for the input color system in the base LUT 510 as shown in FIGS. 8A to 8C. In addition, it is possible to consider that sides (ridge lines) connecting each vertex also mutually have correspondence relationships between both color solids. The hue value of each lattice point in the Lab color system before the smoothing processing is respectively associated with the input lattice point in the base LUT 510, and therefore, the hue value of each lattice point in the Lab color system after the smoothing processing is also respectively associated with the input lattice point in the base LUT 510. In addition, it is a matter of course that the input lattice points in the base LUT 510 are not changed through the smoothing processing.

Accordingly, it is possible to say that the three-dimensional color solid CS for the Lab color system after the smoothing processing corresponds to an entirety of a color region (gamut) which can be reproduced by an ink set constituting the output color system in the base LUT 510.

The smoothing processing for creating the base LUT 510 is performed on the L*a*b* space when the base LUT 510 is created for the following reason. In order to meet a request for setting an ink amount $I_j$ of the output color system so as to reproduce a color region, which is as large as possible, in the base LUT 510, it is appropriate to perform the smoothing processing in the L*a*b* space. In addition, if the smoothing processing is performed in a color region which can be reproduced on a medium with a specific ink set, the ink set depends on a duty limit value $D_{Ij}$ unique to the medium. That is, it is possible to determine a maximum color region which can be reproduced with a specific ink set if a range available for the hue values in the L*a*b* space is determined in consideration of restriction conditions such as the duty limit value $D_{Ij}$ during the smoothing processing while the smoothing processing is performed in the L*a*b* space.

In addition, as an algorithm for the displacement of the lattice points in the smoothing processing, it is possible to use various known methods, and a dynamic model which will be described later in the embodiment can be used, for example.

In Step S400 in FIG. 6, the base LUT 510 is created.

Specifically, the table creation module 140 registers the optimal ink amounts $I_j$ for reproducing the hue values of the lattice points in the Lab color system respectively associated with the input lattice points, as an output value of the base LUT 510 with the use of the smoothing processing result.

In addition, it is also possible to select as processing targets only hue values of the lattice points corresponding to a part of the input lattice points in the base LUT 510 in the smoothing processing in order to reduce the calculation burden. For example, when an interval of the RGB values at the input lattice points in the base LUT 510 is 16, it is possible to reduce burden of the smoothing processing to the half if the interval of the RGB values at the input lattice points as the targets of the smoothing target is set to 32. In such a case, the table creation module 140 determines and registers ink amounts $I_j$ with respect to all input lattice points in the base LUT 510 by interpolating the result of the smoothing processing.

FIGS. 9A to 9C are explanatory diagrams showing processing contents when a base 4D-LUT 520 is created by Steps S100 to S300 in FIG. 6. FIG. 9A is the same as FIG. 7A. The base 4D-LUT 520 shown in FIG. 9B is different from the base 3D-LUT 510 shown in FIG. 7B in that an input is the CMYK color system. As initial input values of the base 4D-LUT 520, ink amount initial values are set for sixteen input lattice points including (C, M, Y, K)=(0, 0, 0, 0), (0, 0, 255, 0), (0, 255, 0, 0), (0, 255, 255, 0), (255, 0, 0, 0), (255, 0, 255, 0), (255, 255, 0, 0), (255, 255, 255, 0), (0, 0, 0, 255), (0, 0, 255, 255), (0, 255, 0, 255), (0, 255, 255, 255), (255, 0, 0, 255), (255, 0, 255, 255), (255, 255, 0, 255), and (255, 255, 255, 255). The initial input values of the ink amounts with respect to the other input lattice points are arbitrary and set to zero, for example. In this embodiment, it is assumed that seventeen gray lattice points on the gray axis where C=M=Y is satisfied are included as input lattice points even when the base 4D-LUT 520 is created.

FIG. 9C shows a state of the smoothing processing. As a color solid corresponding to the base 4D-LUT 520 in the L*a*b* space, one three-dimensional color solid CS is present with respect to each of the K values among the input values as shown in the right end of FIG. 9C. In this example, a plurality of color solids CS including a color solid of K=0 and a color solid of K=32 are shown. In this specification, such individual color solids CS will also be referred to as "K layers". This is because it is possible to consider that each color solid corresponds to an input layer in which a K value is constant while C, M, and Y values are variable among the CMYK values. The plurality of color solids CS expresses darker color regions as the K values become greater. The plurality of color solids CS can be realized by determining the ink amounts of the black ink K such that the ink amounts $I_4$ become larger as the K values in the input color systems are greater. As described above, the reproducible color region is restricted by the duty limit value $D_{Ij}$ and the like. The duty limit value $D_{Ij}$ depends on a type of a designated medium. On the other hand, as a method for reproducing dark colors, a method with the use of an achromatic ink such as black ink K or the like and a method with the use of composite black can be exemplified. However, in the case of the composite black, there is a higher possibility of conflicting with the duty limit value as compared with the black ink K due to a larger total ink amount, which is disadvantageous in reproducing dark colors. Accordingly, a color solid in which the K value in the input color system is larger and the ink amount $I_4$ of the black ink K is larger can reproduce further dark colors than a color solid in which the K value in the input color system is smaller and the ink amount $I_4$ of the dark black ink K is smaller.

Figure 10A:
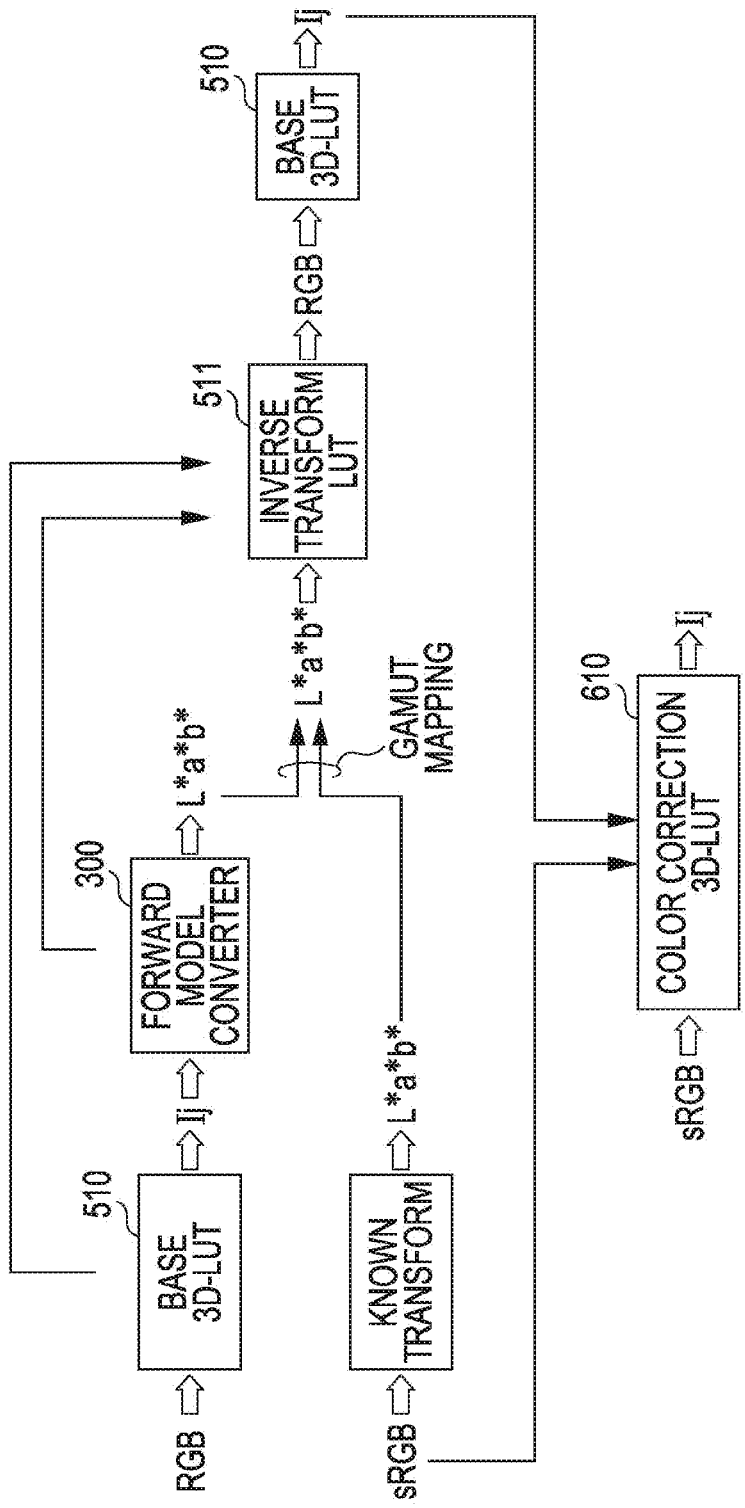

FIGS. 10A and 10B are explanatory diagrams showing a creation method of a color correction LUT which is executed by the color correction LUT creation module 200 with the use of the base LUT. As shown in FIG. 10A, the base 3D-LUT 510 converts the RGB values into the ink amounts $I_j$. The ink amounts $I_j$ after the conversion is converted by the forward model converter 300 into L*a*b* values. On the other hand sRGB values are converted into L*a*b* values based on a known conversion equation. The L*a*b* values after the conversion are subjected to gamut mapping such that the color region thereof coincides with the color region of the L*a*b* values converted by the forward model converter 300. On the other hand, an inverse conversion LUT 511 is created while the L*a*b* values converted from the RGB values via the base 3D-LUT 510 and the forward model converter 300 are regarded as an opposite direction look-up table. The L*a*b* values which have been subjected to the gamut mapping are converted into RGB values by the inverse conversion LUT 511. The RGB values are further converted again into ink amounts $I_j$ by the base 3D-LUT 510. It is possible to create the color correction 3D-LUT 610 by registering the correspondence relationships between the ink amounts $I_j$ converted again and the initial sRGB values. The color correction 3D-LUT 610 is a color conversion table which converts an sRGB color system into an ink color system.

FIG. 10B shows a creation method of the color correction 4D-LUT 620, which is executed by the color correction LUT creation module 200. FIG. 10B is different from FIG. 10A in that a base 4D-LUT 520 and an inverse conversion LUT 521 thereof are used instead of the base 3D-LUT 510 and the inverse conversion LUT 511 and in that a known conversion equation for converting a JAPAN COLOR system (described as "jCMYK" in the drawing) into L*a*b* value is used instead of the known conversion equation for converting the sRGB color system into L*a*b* values. As is well known, JAPAN COLOR is a color system configured by the four colors CMYK. According to the method shown in FIG. 10B, when the L*a*b* values are converted into CMYK values in the inverse conversion LUT 521, a K layer (a part in which the K value becomes constant) of the inverse conversion LUT 521 is selected from the K value of the initial jCMYK values before the known conversion. Accordingly, it is possible to create the color correction 4D-LUT 620 which reflects a feature in the K layer in the base 4D-LUT 520. In addition, the setting information storage module 730 adds the setting table STB to the created base LUTs 510 and 520 and the color correction LUTs 610 and 620. In so doing, it is possible to identify for what kind of medium the base LUTs 510 and 520 and the color correction LUTs 610 and 620 have been created and with what weight $w_{L*}, w_{a*} \ldots$ the base LUTs 510 and 520 and the color correction LUTs 610 and 620 have been created.

Generally, the base LUTs 510 and 520 are mounted on a printer driver and used for processing other than the color correction LUT creation processing, and other application example will be omitted here.

Hereinafter, a dynamic model used in the smoothing processing (smoothing and optimization processing) in the embodiment will briefly be described, and smoothing processing procedure and a content of the optimization processing will then be described in this order.

B-2. Dynamic Model

FIG. 11 is an explanatory diagram showing a dynamic model used in the smoothing processing (smoothing and optimization processing) according to the embodiment. Here, a state in which lattice points (white circles and double circles) corresponding to the aforementioned input lattice points are arranged in the L*a*b* color space is shown. However, the arrangement of the lattice points is depicted in a two-dimensional manner for convenience of explanation. In this dynamic model, it is assumed that virtual force $F_{pg}$ of the following equation is applied to a focused lattice point g.

$$\overrightarrow{FP_g} = \overrightarrow{F_g} - k_v \overrightarrow{V_g} \qquad (1)$$
$$= k_p \sum_{n=1}^{N} \left( \overrightarrow{X_{gn}} - \overrightarrow{X_g} \right) - k_v \overrightarrow{V_g}$$

Here, $F_g$ represents a sum of attraction force obtained from an adjacent lattice point gn (n is 1 to N), $V_g$ represents a speed vector of the focused lattice point g, $-k_v V_g$ represents resistance force in accordance with a speed, $X_g$ is a position vector of the focused lattice point g, $X_{gn}$ represents a position vector of the adjacent lattice point gn, and $k_p$, $k_v$ represent coefficients. The coefficients $k_p$ and $k_v$ are set in advance to predetermined values. In the description, arrows representing vectors will be omitted.

This model is a damped oscillation model of mass points connected with each other by a spring. That is, the virtual total force $F_{pg}$ applied to the focused lattice point g is a sum of spring force $F_g$ which becomes greater when a distance between the focused lattice point g and the adjacent lattice point gn is longer and resistance force $-k_v V_g$ which becomes greater when a speed of the focused lattice point g is higher. According to the dynamic mode, a speed vector $V_g$ and a position vector $X_g$ after the elapse of a short time dt are sequentially calculated after setting initial values of the position vector $X_g$ and the speed vector $V_g$ for each color point. In addition, the initial values of speed vectors $V_g$ for a plurality of color point are set to zero, for example. If calculation (simulation) using such a dynamic model is used, it is possible to obtain a smooth color point distribution by gradually displacing each color point in the L*a*b* color space.

As force applied to each hue value, it is also possible to use force other than the spring force $F_g$ and the resistance force $-k_v V_g$. For example, various kinds of force described in JP-A-2006-197080 disclosed by the present applicant can be used in this dynamic model. In addition, it is also possible to handle specific hue values as restricted points which are not displaced by a dynamic model when each hue value is displaced by applying the dynamic model. In this embodiment, hue values of the lattice points corresponding to the aforementioned seventeen gray axis lattice points are restricted so as to be deviated in a color phase direction represented by gray target tone $(a_{gt}*, b_{gt}*)$. Since the gray target tone $(a_{gt}*, b_{gt}*)=(0, 0)$ is designated in the case of a basic medium, the values of the lattice points corresponding to the gray axis lattice points are restricted so as to show the positions on the L* axis in the L*a*b* color space.

FIG. 12 shows a state in which the positions (hue values) of the lattice points corresponding to the gray axis lattice points are restricted by a gray target. As shown in the drawing, the lattice points (white circles) corresponding to the gray axis lattice points are restricted so as to show the positions at which a line segment (gray target) connecting the paper black point and the paper white point on the L* axis in the L*a*b* color space is equally divided into sixteen parts. In addition, it is possible to restrict specific lattice points to specific positions in the L*a*b* color space by a method disclosed in JP-A-2006-217150. By uniformly restricting the lattice points on the L* axis in the L*a*b* color space as described above, it is possible to enhance accuracy in interpolating computation around the gray axis, which is performed when the color correction LUTs 610 and 620 are created with the use of the base LUTs 510 and 520 after the smoothing processing. Accordingly, it is possible to create the color correction LUTs 610 and 620 which are excellent in color reproducibility and a gradation feature around the gray axis.

B-3. Processing Procedure for Smoothing Processing (Smoothing and Optimization Processing)

FIG. 13 is a flowchart showing a typical processing procedure of the smoothing processing (Step S300 in FIG. 6). In Step T100, the initial value setting module 120 (FIG. 1) initially sets a plurality of lattice points as targets of the smoothing processing.

Figure 14:
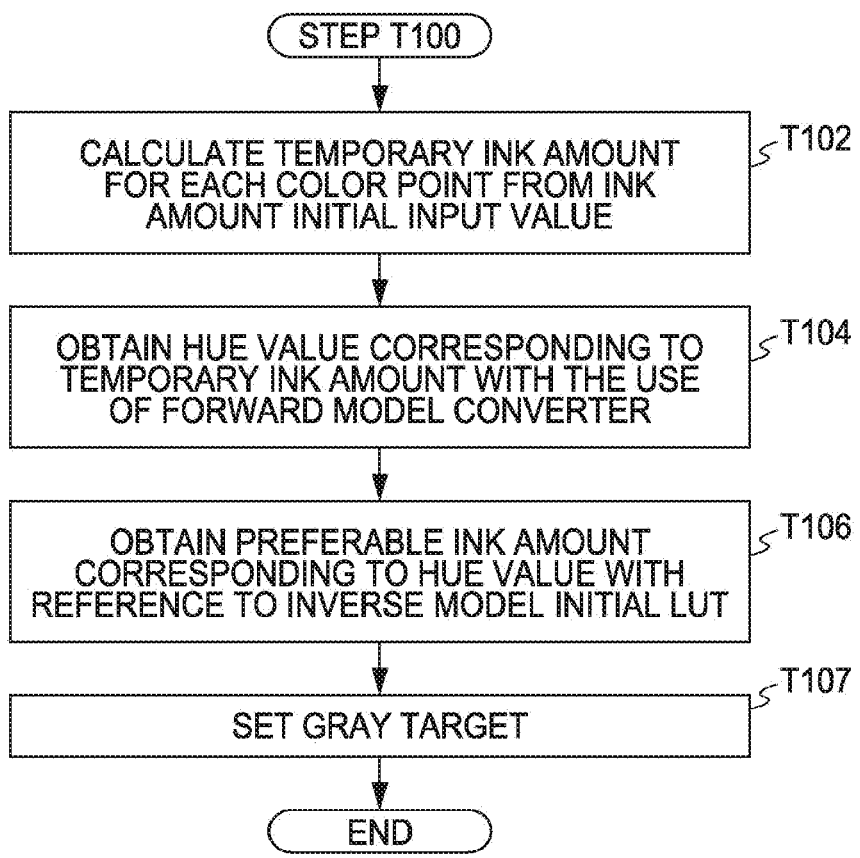
FIG. 14 is a flowchart showing a detailed procedure of Step T100 in FIG. 13.

FIG. 14 is a flowchart showing a detailed procedure of Step T100. In Step T102, a temporary ink amount for each lattice point as a target of the smoothing processing is determined based on the initial input value of the ink amount (FIG. 7B, FIG. 9B). For example, in the smoothing processing for the 3D-LUT, the temporary ink amount $I_{(R, G, B)}$ with respect to each input lattice point is determined based on the following Equations (2) and (3).

$$\begin{aligned} I_{j(R,G,B)} = & \quad (2) \\ & (1-r_R)(1-r_G)(1-r_B)I_{j(0,0,0)} + (1-r_R)(1-r_G)r_B I_{j(0,0,255)} + \\ & (1-r_R)r_G(1-r_B)I_{j(0,255,0)} + r_R(1-r_G)(1-r_B)I_{j(255,0,0)} + \\ & (1-r_R)r_G r_B I_{j(0,255,255)} + r_R(1-r_G)r_B I_{j(255,0,255)} + \\ & r_R r_G(1-r_B)I_{j(255,255,0)} + r_R r_G r_B I_{j(255,255,255)} \end{aligned}$$

$$r_R = \frac{R}{255}, r_G = \frac{G}{255}, r_B = \frac{B}{255} \qquad (3)$$

Here, $I_{(R, G, B)}$ represents the entire ink amount $I_j$ of the ink set (a combination of amounts of a plurality of kinds of ink) with respect to an RGB values at an input lattice point (an ink amount $I_j$ of four kinds of ink in the example shown in FIGS. 7A to 7C). An ink amount (temporary ink amount) with respect to an input lattice point in which an RGB value is 0 or 255 is the initial input value input in advance by the user in Step S200 in FIG. 6. According to the above Equations (2) and (3), it is possible to obtain a temporary ink amount $I_{(R, G, B)}$ at an arbitrary RGB value.

In the smoothing processing for the 4D-LUT, a temporary ink amount $I_{(C, M, Y, K)}$ with respect to each input lattice point is determined based on the following Equations (4) and (5).

$$I_{j(C,M,Y,K)} = (1-r_C)(1-r_M)(1-r_Y)(1-r_K)I_{j(0,0,0,0)} + \quad (4)$$
$$(1-r_C)(1-r_M)(1-r_Y)r_K I_{j(0,0,0,255)} +$$
$$(1-r_C)(1-r_M)r_Y(1-r_K)I_{j(0,0,255,0)} +$$
$$(1-r_C)r_M(1-r_Y)(1-r_K)I_{j(0,255,0,0)} +$$
$$r_C(1-r_M)(1-r_Y)(1-r_K)I_{j(255,0,0,0)} +$$
$$(1-r_C)(1-r_M)r_Y r_K I_{j(0,0,255,255)} +$$
$$(1-r_C)r_M(1-r_Y)r_K I_{j(0,255,0,255)} +$$
$$r_C(1-r_M)(1-r_Y)r_K I_{j(255,0,0,255)} +$$
$$(1-r_C)r_M r_Y(1-r_K)I_{j(0,255,255,0)} +$$
$$r_C(1-r_M)r_Y(1-r_K)I_{j(255,0,255,0)} +$$
$$r_C r_M(1-r_Y)(1-r_K)I_{j(255,255,0,0)} + (1-r_C)r_M r_Y r_K I_{j(0,255,255,255)} +$$
$$r_C r_M(1-r_Y)r_K I_{j(255,255,0,255)} + r_C r_M r_Y(1-r_K)I_{j(255,255,255,0)} +$$
$$r_C(1-r_M)r_Y r_K I_{j(255,0,255,255)} + r_C r_M r_Y r_K I_{j(255,255,255,255)}$$

$$r_C = \frac{C}{255}, r_M = \frac{M}{255}, r_Y = \frac{Y}{255}, r_K = \frac{K}{255} \quad (5)$$

Since there are sixteen initial input values of the ink amounts for the 4D-LUT as can be understood from Equation (4), setting of the initial input values are complicated. Thus, a configuration is also applicable in which eight vertexes with K=0, that is eight vertexes including (C, M, Y, K)=(0, 0, 0, 0), (0, 0, 255, 0), (0, 255, 0, 0), (0, 255, 255, 0), (255, 0, 0, 0), (255, 0, 255, 0), (255, 255, 0, 0), and (255, 255, 255, 0), and one vertex with k=255, for example a vertex of (C, M, Y, K)=(0, 0, 0, 255) are regarded as input lattice points for which initial input values of ink amounts are set and the ink amounts of the lattice point with K=255 are determined based on the following Equations (6) and (7).

$$I_{(C,M,Y,255)} = f_{D1}(I_{(C,M,Y,0)}) + I_{(0,0,0,255)} \quad (6)$$

$$I_{(C,M,Y,255)} = f_{D2}(I_{(C,M,Y,0)} + I_{(0,0,0,255)}) \quad (7)$$

Here, $I_{(C, M, Y, K)}$ is an ink amount calculated based on the same Equation as Equation (2) from the initial input values of the ink amount at eight vertexes with K=0. A function $f_{D1}$ in Equation (6) is a function with which ink amount is made to be within the duty limit value $D_{IS}$ by reducing the entirety of the sum $(I_{(C, M, Y, 0)} + I_{(0, 0, 0, 255)})$ when the sum of the value $I_{(C, M, Y, 0)}$ and the value $I_{(0, 0, 0, 255)}$ exceeds the duty limit value $D_{IS}$. In addition, a function $f_{D2}$ in Equation (7) is a function with which ink amount is made to be within the duty limit value $D_{IS}$ by reducing the entirety of the sum $(I_{(C, M, Y, 0)} + I_{(0, 0, 0, 255)})$ when the sum of the value $I_{(C, M, Y, 0)}$ and the value $I_{(0, 0, 0, 255)}$ exceeds the duty limit value $D_{IS}$.

In Step T104 in FIG. 14, the hue values L*a*b* corresponding to the temporary ink amounts are obtained with the use of the forward model converter 300. The computation can be expressed with the following Equations (8) and (9).

$$L*_{(R,G,B)} = f_{L*FM}(I_{(R,G,B)})$$
$$a*_{(R,G,B)} = f_{a*FM}(I_{(R,G,B)})$$
$$b*_{(R,G,B)} = f_{b*FM}(I_{(R,G,B)}) \quad (8)$$
$$L*_{(C,M,Y,K)} = f_{L*FM}(I_{(C,M,Y,K)})$$
$$a*_{(C,M,Y,K)} = f_{a*FM}(I_{(C,M,Y,K)})$$
$$b*_{(C,M,Y,K)} = f_{b*FM}(I_{(C,M,Y,K)}) \quad (9)$$

Here, $L*_{(R, G, B)}$, $a*_{(R, G, B)}$, $b*_{(R, G, B)}$, $L*_{(C, M, Y, K)}$, $a*_{(C, M, Y, K)}$, and $b*_{(C, M, Y, K)}$ represent hue values L*a*b* after the conversion by the forward model by the forward model converter 300, and the functions $f_{L*FM}$, $f_{a*FM}$, and $f_{b*FM}$ means conversion by the forward model converter 300. As can be understood from the equations, the hue values L*a*b* after the conversion are associated with the RGB values or the CMYU values as input values of the base LUT.

In Step T106 in FIG. 14, the hue values L*a*b* obtained in Step T104 are converted again into the ink amounts with the use of the inverse model initial LUT 410. Here, the conversion into the ink amounts is performed again with the use of the inverse model initial LUT 410 because the initial input values of the ink amounts $I_j$ and the temporary ink amounts determined in Step T102 are not always preferable ink amounts $I_j$ as ink mounts for reproducing the L*a*b* values. On the other hand, since preferable ink amounts in consideration of image quality and the like are registered in the inverse model initial LUT 410, it is possible to obtain preferable ink amount $I_j$ for realizing the L*a*b* values as initial values by converting the L*a*b* values again into the ink amounts $I_j$ with the use of the inverse model initial LUT 410. However, Step T106 may be omitted. In Step T107, the aforementioned gray target on the L* axis is set.

As a result of the aforementioned processing in Step T100, the following initial values are determined for the hue values as targets of the smoothing processing.
(1) a value of an input lattice point in the base LUT: (R, G, B) or (C, M, Y, K)
(2) an initial coordinate value of a lattice point in the L*a*b* space corresponding to each input lattice point: $(L*_{(R, G, B)}, a*_{(R, G, B)}, b*_{(R, G, B)})$ or $(L*_{(C, M, Y, K)}, a*_{(C, M, Y, K)}, b*_{(C, M, Y, K)})$
(3) an initial ink amount corresponding to each input lattice point: $I_{(R, G, B)}$ or $I_{(C, M, Y, K)}$ As can be understood from the above description, the initial value setting module 120 has a function of setting initial values for the other input lattice points based on the input initial values for the representative input lattice points. In addition, the initial value setting module 120 may be included in the smoothing processing module 130.

In Step T120 in FIG. 13, the color point displacement module 132 displaces the hue values in the L*a*b* space based on the aforementioned dynamic model.

FIGS. 15A to 15D are explanatory diagrams showing processing contents in Steps T120 to T150 in FIG. 13. As shown in FIG. 15A, the distribution of the lattice points is significantly one-sided before the smoothing processing. FIG. 15B shows a position of each lattice point after the elapse of a short time. The L*a*b* value of each hue value after the displacement will be described as a "target value $(L*_t a*_t b*_t$ or $LAB_t)$". The modifying word "target" is used because the $L*_t a*_t b*_t$ is used as a target value of an ink amount optimal value search processing which will be described later.

In Step T130, the ink amount optimization module 134 searches for an optimal value for the ink amount $I_j$ with respect to the target value $LAB_t$ with the use of a preset object function E (see FIG. 15C). That is, the ink amount is optimized (an optimal ink amount is searched for) with the use of the object function E for evaluating image quality when the amount $I_j$ of ink designated as an amount with which the target value $LAB_t$ is substantially reproduced is made to adhere to the medium designated in Step S01, and the ink amount is determined. In the optimization with the use of the object function E, the ink amounts with which the L*a*b* value close to the coordinate values $LAB_t$ of the hue values after the displacement by small amounts by the dynamic model are designated, and an ink amount with smaller sum of square errors of a plurality of parameters $\Delta L^*$, $\Delta a^*$, $\Delta GI$, $\Delta CII$, $\Delta TI$ ... is determined as an optimal ink amount $I_j$ from among the designated ink amounts $I_j$. In addition, the search for the optimal ink amount $I_j$ is started from the initial ink amount of each input lattice point set in Step T100. Accordingly, the ink amount $I_j$ obtained in the search is a value obtained by correcting the initial ink amount. The object function E given in Equation (EQ1) can also be represented as a function in a quadratic form in relation to the ink amount vector I as Equation (EQ2), as will be described later. The optimization of the ink amount $I_j$ is executed with the use of such an object function E in the quadratic form based on a quadratic programming method. In addition, the detailed procedure of Step T130 and the content of the object function E will be described later.

In Step T140 in FIG. 13, the L*a*b* value corresponding to the ink amount $I_j$ (which has been determined to be an optimal value in previous Step T130) searched for in Step T130 is calculated again by the forward model converter 300 (see FIG. 15D). Here, the L*a*b* value is calculated again because the L*a*b* value reproduced by the searched ink amount $I_j$, which is an ink amount for minimizing the object function E, is slightly deviated from the target value $LAB_t$ of the optimization processing. The L*a*b* value calculated again as described above is employed as a coordinate value of each lattice point after the displacement.

In Step T150, it is determined whether or not an average value $(\Delta Lab)_{ave}$ of the displacement amounts of the hue values of the lattice points are a preset threshold value $\epsilon$. The $(\Delta Lab)_{ave}$ is an average value of the difference between the value before the displacement in Step T120 and the value after the calculation again in Step T140 for the hue value L*a*b* of each lattice point. When the average value $(\Delta Lab)_{ave}$ is greater than the threshold value $\epsilon$, the processing returns to Step T120, and the smoothing processing in Steps T120 to T150 is continued. On the other hand, the average value $(\Delta Lab)_{ave}$ is equal to or less than the threshold value $\epsilon$, the distribution of the hue values have been smoothed, and therefore, the smoothing processing is completed. In addition, an appropriate value is experimentally determined as the threshold value $\epsilon$.

As described above, in the typical smoothing processing (smoothing and optimization processing) according to the embodiment, each lattice point is displaced by the dynamic model per short time, and an optimal ink amount $I_j$ corresponding to the color point after the displacement is searched for by the optimization method. Then, such processing is continued until the displacement amount of the color point becomes sufficiently small. As a result, it is possible to obtain a smooth lattice point distribution by the smoothing processing as shown in FIG. 7C or FIG. 9C.

B-4. Content of Optimization Processing

The object function E (see FIG. 15C) of the optimization processing can be expressed with the use of the hue value (L*a*b* value) as a function of an ink amount and a Jacobian matrix J in relation to an image quality evaluation index. Each image quality evaluation index is calculated by the image quality evaluation index converter 136. Each image quality evaluation index is an index for evaluating image quality when each amount of ink is made to adhere to the basic medium, as will be described later. The Jacobian matrix J is expressed by the following Equation (10), for example.

$$J = \begin{pmatrix} \frac{\partial L^*}{\partial I_1} & \frac{\partial L^*}{\partial I_2} & \cdots & \frac{\partial L^*}{\partial I_4} \\ \frac{\partial a^*}{\partial I_1} & \frac{\partial a^*}{\partial I_2} & \cdots & \frac{\partial a^*}{\partial I_4} \\ \frac{\partial b^*}{\partial I_1} & \frac{\partial b^*}{\partial I_2} & \cdots & \frac{\partial b^*}{\partial I_4} \\ \frac{\partial GI}{\partial I_1} & \frac{\partial GI}{\partial I_2} & \cdots & \frac{\partial GI}{\partial I_4} \\ \frac{\partial CII_A}{\partial I_1} & \frac{\partial CII_A}{\partial I_2} & \cdots & \frac{\partial CII_A}{\partial I_4} \\ \vdots & \vdots & & \vdots \\ \frac{\partial CII_{F12}}{\partial I_1} & \frac{\partial CII_{F12}}{\partial I_2} & \cdots & \frac{\partial CII_{F12}}{\partial I_4} \\ \frac{\partial GMI}{\partial I_1} & \frac{\partial GMI}{\partial I_2} & \ddots & \frac{\partial GMI}{\partial I_4} \\ \frac{\partial TI}{\partial I_1} & \frac{\partial TI}{\partial I_2} & \cdots & \frac{\partial TI}{\partial I_4} \end{pmatrix} \quad (10)$$

The first to third rows in the right-hand side in Equation (10) represent values obtained by partially differentiating the hue value L*a*b* with individual ink amounts $I_j$. The rows from the fourth row represent values obtained by partially differentiating an image quality evaluation index (graininess index GI (Graininess Indexes), a color inconstancy index CII (Color Inconstancy Index), a gamut evaluation index GMI, and a total ink amount TI) representing image quality of a color patch printed by a pair of ink amounts $I_j$ (j=1 to 8), with individual ink amounts $I_j$. In addition, the image quality evaluation indexes GI, CII, GMI, TI are indexes which represent that the image quality of the color patch reproduced by the ink amount $I_j$ tends to be better when the indexes are smaller.

The hue value L*a*b* is converted from the ink amount $I_j$ with the use of the forward model converter 300 based on the following Equation (11).

$$L^* = f_{L^*FM}(I)$$

$$a^* = f_{a^*FM}(I)$$

$$b^* = f_{b^*FM}(I) \quad (11)$$

The image quality evaluation indexes GI, CII, TI, and GMI can also be represented as functions of ink amounts $I_j$ (j=1 to 4) of a primary color in general.

$$GI = f_{GI}(I) \quad (12)$$

$$CII_{ill} = f_{CII(ill)}(I) \quad (13)$$

$$TI = \sum I_j \quad (14)$$

-continued $$GMI = \sqrt{\begin{array}{l}\{L^*_{GM} - f_{L*FM}(I)\}^2 + \\ (a^*_{GM} - f_{a*FM}(I))^2 + \\ \{b^*_{GM} - f_{b*FM}(I)\}^2\end{array}} \quad (15)$$

In addition, the subscript "ill" of the color inconstancy index $CII_{ill}$ in Equation (13) represents a type of a light source. In the aforementioned Equation (10), standard light A and standard light F12 are used as types of the light sources. In addition, although an example of a calculation method of the color inconstancy index CII will be described later, it is possible to use a color inconstancy index CII relating to one or a plurality of types of arbitrary standard light sources can be used.

The graininess index GI can be calculated with the use of various graininess prediction model, and for example, it is possible to calculate the index with the following Equation (16).

$$GI = a_L \int \sqrt{WS(u)} VTF(u)du \quad (16)$$

Here, aL represents a luminosity correction coefficient, WS(u) represents a Wiener spectrum of an image indicated by the halftone data used in printing of the color patches, VTF(u) is a visual spatial frequency feature, and u is a spatial frequency. The halftone data is determined by the halftone processing (which is the same as the halftone processing executed by the printer 20) from the ink amounts $I_j$ of the color patches. Although Equation (16) is expressed in a one-dimensional manner, it is easy to calculate a spatial frequency of a two-dimensional image as a function of a spatial frequency. As a method of calculating the graininess index GI, it is possible to use a method described in JP-A-2006-103640 disclosed by the present applicant, for example. According to the method described in JP-A-2006-103640, a graininess index GI in the case of performing printing with an arbitrary ink amount $I_j$ by a neural network learned based on the graininess index GI obtained by measuring a color patch formed by causing a test ink amount $I_j$ of ink is made to adhere. In this embodiment, a neural network is learned based on a measurement result of a color patch formed on a basic medium. Substantially, the graininess index GI in the case of adhering the amount $I_j$ of ink to the basic medium by the image quality evaluation index converter 136 inputting an arbitrary ink amount $I_j$ to the neural network.

The color inconstancy index CII is given by the following Equation (17), for example.

$$CII = \left[\left(\frac{\Delta L^*}{2S_L}\right)^2 + \left(\frac{\Delta C^*_{ab}}{2S_C}\right)^2 + \left(\frac{\Delta H^*_{ab}}{S_H}\right)^2\right] \quad (17)$$

Here, $\Delta L^*$ represents a luminosity difference in color patches under two different observation conditions (under different light sources), $\Delta C^*_{ab}$ represents a chromatic difference, and $\Delta H^*_{ab}$ represents a color phase difference. In the calculation of the color inconstancy index CII, the L*a*b* values under two different observation conditions are converted into values under a standard observation condition (under observation with standard light D65, for example) with the use of chromatic-adaption transform (CAT). In addition, since the L*a*b* values under the observation conditions are calculated by the aforementioned forward model converter 300. Since the forward model converter 300 (spectral printing model converter 310) is prepared for basic media, it is possible to evaluate color inconstancy in the case of causing each amount $I_j$ of ink to adhere the basic medium, with the color inconstancy index CII. In relation to CII, see Billmeyer and Saltzman's Principles of Color Technology, 3rd edition, John Wiley & Sons, Inc., 2000, p. 129, pp. 213-215.

The gamut evaluation index GMI is given by a color difference $\Delta E$ (CIE 1976) between the hue value L*a*b* obtained by the forward model converter 300 and the target hue value $L_{GM}*a_{GM}*b_{GM}*$. The target hue value $L_{GM}*a_{GM}*b_{GM}*$ is an outermost hue value in the L*a*b* color space. It is not necessary to consider gamut evaluation indexes GMI for all lattice points, and only lattice points on the vertexes, the ridge lines, and the outer surfaces of the gamut may be taken into consideration. In addition, a target hue value $L_{GM}*a_{GM}*b_{GM}*$ becomes different depending on each lattice point. For example, if a hue value with the same color phase angle as that of the hue value L*a*b* obtained by the forward model converter 300 and with higher chromaticity (the outermost of the L*a*b* color space) is set to the target hue value $L_{GM}*a_{GM}*b_{GM}*$, for example, it is possible to evaluate whether or not the gamut becomes wide toward the side of high chromaticity. In addition, by setting a hue value on a gray target to the target hue value $L_{GM}*a_{GM}*b_{GM}*$ for the lattice point corresponding to the gray axis lattice point, it is possible to restrict the lattice point to the gray target.

A component relating to the L* value among a plurality of components (also referred to as "elements") of the Jacobian matrix J is given by Equation (18).

$$\frac{\partial L^*}{\partial I_j} = \frac{f_{L*FM}(I+h) - f_{L*FM}(I)}{h_j} \quad (18)$$

Here, $f_{L*FM}$ represents conversion function from the ink amount I to the L* value based on the forward model, $I_r$ represents a current value of the ink amount I, and $h_j$ represents a small variation amount of j-th ink amount $I_j$. Although Equation (17) was shown as an example of the L* value, the same is true for the a*b* value. Since the L*a*b* value is calculated by the aforementioned forward model converter 300 (Equation (11)), the L*a*b* value means a hue value when each amount $I_j$ of ink is made to adhere the basic medium. The other components except for the lowermost raw in the Jacobian matrix J are also represented in the same form. If the element at the lowermost row in the Jacobian matrix J is calculated based on the above Equations (14) and (18), all elements in the Jacobian matrix J become 1. This is because the variation amount of the total ink amount TI when an ink amount $I_j$ of certain ink is varied by a small variation amount $h_j$ also becomes $h_j$.

The object function E of the optimization is given by the following Equation (19), for example.

$$E = w_{L*}(\Delta L^* - \Delta L^*_t)^2 + w_{a*}(\Delta a^* - \Delta a^*_t)^2 + w_{b*}(\Delta b^* - \Delta b^*_t)^2 + \quad (19)$$
$$w_{GI}(\Delta GI - \Delta GI_t)^2 + w_{CII(A)}(\Delta CII_A - \Delta CII_{At})^2 +$$
$$\ldots + w_{CII(F12)}(\Delta CII_{F12} - \Delta CII_{F12t})^2 +$$
$$w_{TI}(\Delta TI - \Delta TI_t)^2 + w_{GMI}(\Delta GMI - \Delta GMI_t)^2$$

Here, $w_{L*}$, $w_{a*}$, and the like described at the top of each term in the right-hand side represents weight of each term. As the weight $w_{L*}$, $w_{a*}$ . . . of each term, the weight $w_{L*}$, $w_{a*}$ . . . designated by the user and stored on the setting table STB in Step S05 is used. Particularly, when the user does not displace the positions of the pointers from the initial positions thereof, the default weight $w_{L*}$, $w_{a*}$ ... is used. Accordingly, items valued by the object function E depend on a medium and user setting.

The first term $w_{L*}(\Delta L^* - \Delta L^*_t)^2$ in the right-hand side of Equation (19) is a square error relating to the variation amounts $\Delta L^*$, $\Delta L^*_t$ of the hue value $L^*$. The variation amounts $\Delta L^*$, $\Delta L^*_t$ are given by the following equation.

$$\Delta L^* = \sum \frac{\partial L^*}{\partial I_j} \Delta I_j = \sum \frac{\partial L^*}{\partial I_j} (I_j - I_{jr}) \quad (20)$$

$$\Delta L^*_t = L^*_t - f_{L*FM}(I_r) \quad (21)$$

The partially differentiated value in the right-hand side of Equation (20) is a value given by the Jacobian matrix (Equation (10)), $I_j$ represents an ink amount obtained as a result of the optimization processing, and $I_{jr}$ represents a current ink amount. The first variation amount $\Delta L^*$ is an amount obtained by performing linear conversion on the variation amount $\Delta I_j$ of the ink amount by the optimization processing with the partially differentiated value as a component of the Jacobian matrix. On the other hand, the second variation amount $\Delta L^*_t$ is a difference between the target value $L^*_t$ obtained by the smoothing processing in Step T120 and the hue value $L^*(I_r)$ given by the current ink amount $I_r$. In addition, it is possible to regard the second variation amount $\Delta L^*_t$ as a difference of the $L^*$ values before and after the smoothing processing.

Each item from the second item on the right-hand side of Equation (19) is also given by the similar equation as Equations (20) and (21). That is, the object functions E are given as sums of square errors between the first variation amounts $\Delta L^*$, $\Delta a^*$, $\Delta b^*$, $\Delta GI$ ... obtained by performing linear conversion on the ink amount variation amount $\Delta I_{j\,by}$ the optimization processing with the components of the Jacobian matrix and the second variation amounts $\Delta L^*_t$, $\Delta a^*_t$, $\Delta b^*_t$, $\Delta GI_t$ ... before and after the smoothing processing in relation to the parameters $L^*$, $a^*$, $b^*$, GI ....

Incidentally, the first variation amounts $\Delta L^*$, $\Delta a^*$, $\Delta b^*$, $\Delta GI$ ... can be expressed in the forms of the following Equations (22) and (23) with the use of a matrix.

$$\begin{pmatrix} \Delta L^* \\ \Delta a^* \\ \Delta b^* \\ \Delta GI \\ \Delta CII_A \\ \vdots \\ \Delta CII_{F12} \\ \Delta GMI \\ \Delta TI \end{pmatrix} = J \cdot \Delta I \quad (22)$$

$$\Delta I = I - I_r = \begin{pmatrix} \Delta I_1 \\ \Delta I_2 \\ \vdots \\ \Delta I_4 \end{pmatrix} \quad (23)$$

In addition, Equation (19) can be described as Equation (24) with the use of a matrix.

$$\begin{aligned} E &= (J(I - I_r) - \Delta M)^T W_M (J(I - I_r) - \Delta M) \\ &= (I^T J^T - (I_r^T J^T + \Delta M^T)) W_M (JI - (JI_r + \Delta M)) \\ &= I^T J^T W_M JI - 2(I_r^T J^T + \Delta M^T) W_M JI + \\ &\quad (I_r^T J^T + \Delta M^T) W_M (JI_r + \Delta M) \end{aligned} \quad (24)$$

Here, T represents transposition of a matrix. The matrix $W_M$ is a diagonal matrix in which weight is arranged at each of the diagonal elements (see Equation (25)), and the matrix $\Delta M$ is a target variation amount vector relating to each parameter (see Equation (26)).

$$W_M = \begin{pmatrix} w_{L*} & 0 & & & & & & 0 \\ & w_{a*} & & & & & & \\ & & w_{b*} & & & & & \\ & & & w_{GI} & & & & \\ \vdots & & & & \ddots & & & \vdots \\ & & & & & w_{CII(F12)} & & \\ & & & & & & w_{GMI} & \\ 0 & & & & \cdots & & 0 & w_{TI} \end{pmatrix} \quad (25)$$

$$\Delta M = \begin{pmatrix} \Delta L^*_t \\ \Delta a^*_t \\ \Delta b^*_t \\ \Delta GI_t \\ \Delta CII_{At} \\ \vdots \\ \Delta CII_{F12_t} \\ \Delta GMI_t \\ \Delta TI_t \end{pmatrix} = \begin{pmatrix} L^*_t - f_{L*FM}(I_r) \\ a^*_t - f_{a*FM}(I_r) \\ b^*_t - f_{b*FM}(I_r) \\ GI_t - GI(I_r) \\ CII_{At} - CII_A(I_r) \\ \vdots \\ CII_{F12_t} - CII_{F12}(I_r) \\ GMI_t - GMI(I_r) \\ TI_t - \sum I_{jr} \end{pmatrix} = const. \quad (26)$$

The right-hand side in Equation (26) is a difference between the target value relating to each of the parameters $L^*$, $a^*$, $b^*$, CII ... (also referred to as "elements") and each parameter value given by the current ink amount $I_r$. Among the target values of the parameters, the hue value $L^*_t$, $a^*_t$, $b^*_t$ is determined by the smoothing processing (Step T120). There are some methods for determining the target variation amounts $\Delta GI_t$, $\Delta CII_t$, $\Delta TI_t$, and $\Delta GMI_t$ obtained from the target value of the image quality evaluation index and the current quality image quality evaluation index. A first method is a method using predetermined constants (for example, $\Delta GI_t = -2$, $\Delta CII_t = -1$, $\Delta TI_t = -1$, $\Delta GMI_t = -1$) are used as the target variation amounts $\Delta GI_t$, $\Delta CII_t$, $\Delta TI_t$, and $\Delta GMI_t$. In addition, negative values are used as constants because the image quality evaluation indexes are indexes which indicate higher image quality the smaller they are. In addition, it is preferable to set the target value $GI_t$ of the graininess index GI to zero. A second method is a method in which the target values $GI_t$, $CII_t$, $TI_t$, and $\Delta GMI_t$ are defined as functions of the target values $L^*_t$, $a^*_t$, $b^*_t$ of the hue values. Since the target value of each parameter is determined before the optimization processing as described above, all the components of the target variation amount vector $\Delta M$ are constants.

The third term $(I_r^T J^T + \Delta M^T) W_M (JI_r + \Delta M)$ among the terms in the right-hand side of Equation (24) is a constant since the third term does not include the ink amount I obtained as a result of the optimization. In general, a constant term is not necessary in the object function E for optimization. Thus, if constant terms are deleted from Equation (24), and the entirety is multiplied by ½, the following Equation (27) is obtained.

$$E = \frac{1}{2} I^T J^T W_M J I - (I_r^T J^T + \Delta M^T) W_M J I \quad (27)$$

Here, if a matrix A and a vector g are defined as the following Equations (28) and (29), Equation (27) can be expresses as Equation (30).

$$A = J^T W_M J \quad (28)$$

$$g = (I_r^T J^T + \Delta M^T) W_M J \quad (29)$$

$$E = \frac{1}{2} I^T A I - g I \quad (30)$$

The object function E given by Equation (30) can be understood to be in a quadratic form relating to the ink amount vector I obtained by the optimization. Equations (EQ1) and (EQ2) shown in FIG. 15C are same as Equations (19) and (30), respectively.

Since the object function E in the secondary form as in Equation (30) is used in the optimization processing of this embodiment, it is possible to use a secondary planning method as an optimization method. Here, the "quadratic programming method" means a narrowly defined quadratic programming method which does not include a sequential quadratic programming method. If a quadratic programming method with the use of an object function in a quadratic form is used, it is possible to noticeably speed up the processing as compared with a case in which another non-linear programming method such as a quasi-Newton method, a sequential quadratic programming method, or the like is used.

Incidentally, the search for the ink amount by the optimization processing according to this embodiment is executed under the following conditions.
(Optimization condition) the object function E is to be minimized.
(Restriction condition) the duty limit value is to be satisfied.

In the case of a basic medium, the hue limit value $D_{Ij}$ stored on the setting table STB in Step S08 is used as it is as the duty limit value. In addition, the image quality evaluation index converter 136 and the forward model converter 300 (spectral printing model converter 310) can predict a hue value, an image quality evaluation index GI, and the like for the ink amount $I_j$ which satisfies the duty limit value $D_{Ij}$.

The restriction condition relating to the duty limit value can be expressed by the following Equation (31).

$$b^T I = (1 \ 0 \ \ldots \ 0) I \le D_I \quad (31)$$

Here, the vector b is a coefficient for identifying an ink type as a target of the duty limit value and is a vector with 0 or 1 as an element. For example, in the case of a duty limit value relating to one type of ink, only one element of the vector b becomes 1. On the other hand, in the case of a duty limit value relating to the total ink amounts for all types of ink, all elements of the vector b become 1. $D_I$ in the right-hand side of Equation (31) is a vector including individual duty limit values $D_{Ij}$ as elements. It is assumed that j=1 to 8 is satisfied both in the right-hand side and in the left-hand side of Equation (31). That is, the total ink amounts $I_5$ to $I_7$ for the secondary color and the total ink amount $I_8$ are also taken into consideration in order to impose the restriction condition in relation to the duty limit values.

There is also restriction that each ink amount $I_j$ (j=1 to 8) is not a negative value. The restriction that the ink amount is not a negative value can be expressed by the following Equation (32).

$$b_{nz}^T I = (1 \ 0 \ \ldots \ 0) I \le 0 \quad (32)$$

If Equations (31) and (32) are combined, the duty limit value can be given by the following Equation (33).

$$BI = \begin{pmatrix} 1 & 0 & \ldots & 0 \\ 0 & 1 & & \vdots \\ \vdots & & \ddots & 0 \\ 0 & \ldots & 0 & 1 \\ -1 & 0 & \ldots & 0 \\ 0 & -1 & & \vdots \\ \vdots & & \ddots & 0 \\ 0 & \ldots & 0 & -1 \end{pmatrix} I \le \begin{pmatrix} D_{I1} \\ \vdots \\ D_{I8} \\ 0 \\ \vdots \\ 0 \end{pmatrix} \quad (33)$$

The restriction expressed by Equation (33) is linear inequality sign restriction. In general, the quadratic programming method can be executed under linear restriction. That is, according to the optimization processing of this embodiment, an optimal ink amount is searched for by executing the quadratic programming method with the use of an object function in a quadratic form given by Equation (30) under the restriction of Equation (33). As a result, it is possible to strictly satisfy the linear restriction and execute the ink amount search at a high speed.

Figure 16:
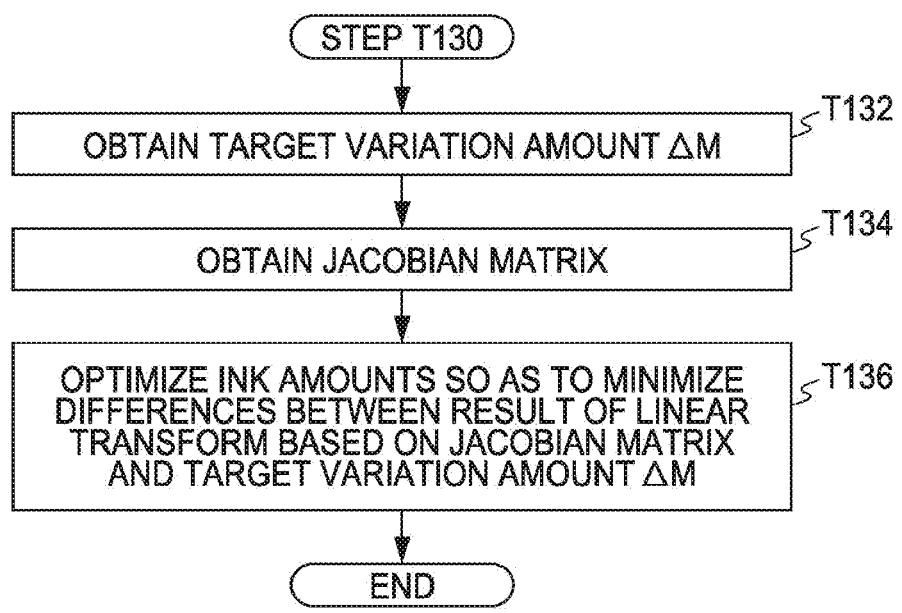
FIG. 16 is a flowchart showing a detailed procedure of optimization processing (Step T130 in FIG. 13).

FIG. 16 is a flowchart showing a detailed procedure of the optimization processing (Step T130 in FIG. 13). In Step T132, a target variation amount ΔM given by Equation (26) is firstly obtained. The target variation amount ΔM is determined based on the target value L*$_t$, a*$_t$, b*$_t$ obtained in Step T120 (smoothing processing), the current ink amount I$_r$, and the like as described above.

In Step T134, a Jacobian matrix J given by Equation (10) is calculated. In addition, each component of the Jacobian matrix J is a value calculated in relation to the current ink amount I$_r$ (a value before the smoothing and the optimization) as expressed by Equation (18) as an example.

In Step T136, optimization of the ink amount I$_j$ is executed so as to minimize a difference between a result ΔL*, Δa*, Δb*, ΔGI . . . of the linear conversion by the Jacobian matrix J and the target variation amount ΔM (ΔL*$_t$, Δa*$_t$, Δb*$_t$, ΔGI$_t$, . . . ) (determine an ink amount set to minimize the object function W among a plurality of ink amount sets (one ink amount set is configured by I$_1$, I$_2$, I$_3$, I$_4$) which reproduces L*, a*, b* around the target value LAB$_t$ and satisfies the duty limit value). This optimization is realized by executing the quadratic programming method with the use of the object function E in the quadratic form given by Equation (30). Since the ink amount I$_j$ is optimized under the restriction by the duty limit value $D_{Ij}$ stored on the setting table STB in Step S08 as described above, optimization results are differently obtained in accordance with the media. In particular, the sizes of the gamut greatly depend on the duty limit value $D_{Ij}$ and become different in accordance with the media. It is a matter of course that the prediction results of the hue values, image quality evaluation indexes GI, and the like by the image quality evaluation index converter 136 and the forward model converter 300 are also different depending on the media, and therefore, optimization results of the ink amount $I_j$ are differently obtained.

As described above with reference to the flowchart in FIG. 13, when it is determined that convergence is insufficient after the optimization processing in Step T130 ("No" in Step T150), the smoothing (Step T120) and the optimization processing (Step T130) are executed again. At this time, as initial values for the smoothing and the optimization processing, values obtained in the previous smoothing and optimization processing are used. In addition, it is not necessary to repeat the processing, and the smoothing and the optimization processing may be performed at least once.

C. Configuration of Printing Apparatus

Figure 17:
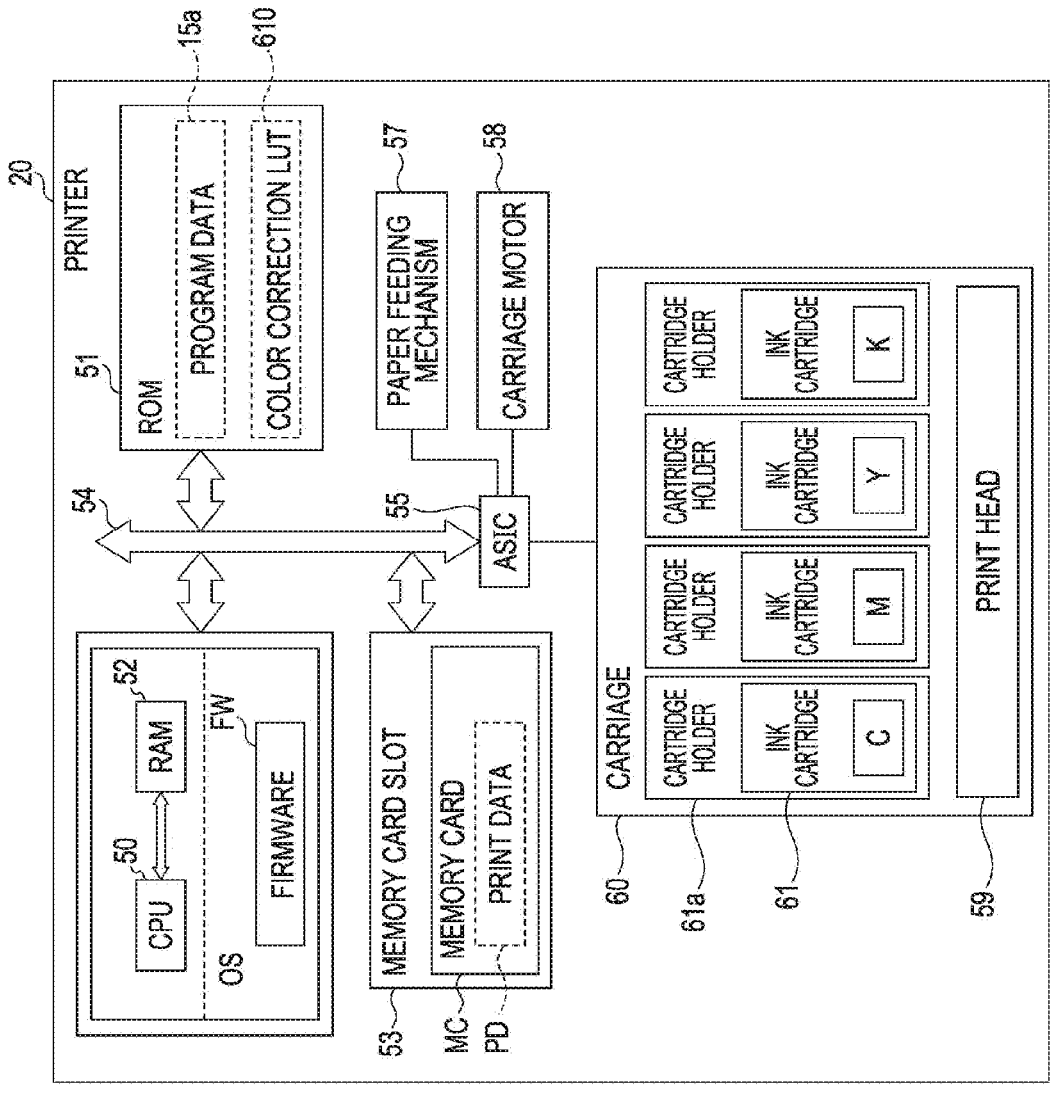
FIG. 17 is a block diagram showing a configuration of a printer according to an embodiment of the invention.

FIG. 17 shows a configuration of the printer 20. In the drawing, the printer 20 is provided with a CPU 50, a RAM 52, a ROM 51, a memory card slot 53, a bus 54, and an ASIC 55. By the CPU 50 developing the program data 15a, which is stored on the ROM 51, on the RAM 52 and performing computation based on the program data 15a, firmware FW for controlling the printer 20 is executed. The firmware FW can create drive data based on print data PD stored on a memory card MC mounted on the memory card slot 53. The ASIC 55 obtains the drive data and generates drive signals for a paper feeding mechanism 57, a carriage motor 58, and a print head 59. On the ROM 51, the color correction 3D-LUT 610 provided from the computer 10 is stored as the color correction LUT. The setting table STB is attached to the color correction 3D-LUT 610, and the color correction 3D-LUT 610 is prepared for each medium described in the setting table STB. The printer 20 is provided with a carriage 60, and the carriage 60 is provided with cartridge holders 61a to which a plurality of ink cartridges 61 can be attached. The carriage 60 is provided with a print head 59 which discharges ink of each color of CMYK respectively provided from the ink cartridges 61.

Figure 18:
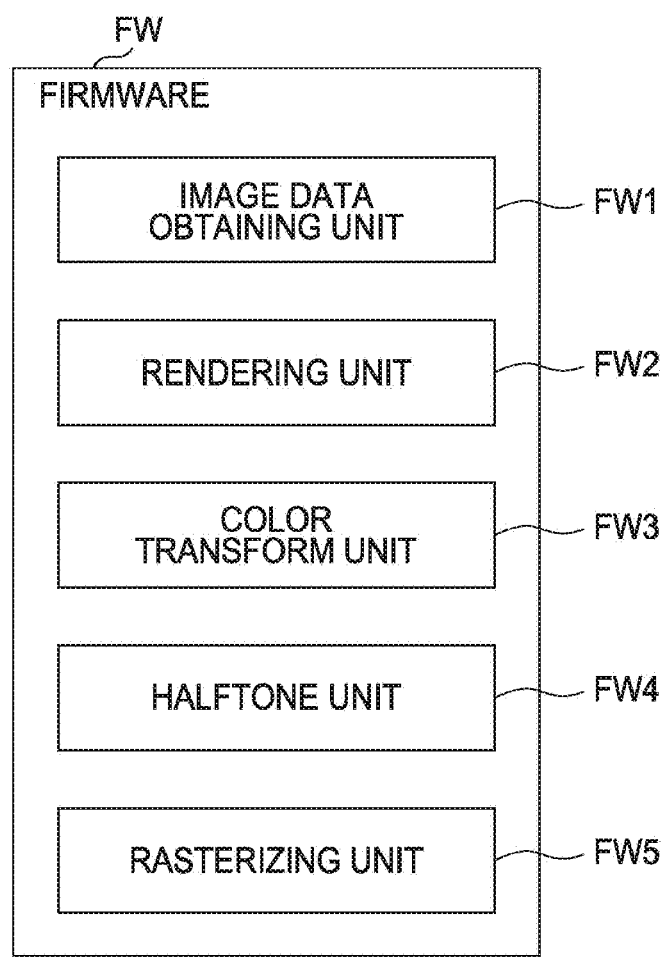
FIG. 18 is a block diagram showing a software configuration of a printer.

FIG. 18 shows a software configuration of the firmware FW. The firmware FW is configured by an image data obtaining unit FW1, a rendering unit FW2, a color conversion unit FW3, a halftone unit FW4, and a rasterizing unit FW5. The image data obtaining unit FW1 obtains the print data PD, which is stored on the memory card MC, as a print target. The print data PD may be document data, graphic data, or a picture image data. The rendering unit FW2 generates input image data ID used for printing based on the print data PD. The input image data ID is configured by pixels, the number of which (printing resolution×actual printing size) corresponds to the printing resolution (2880×2880 dpi, for example), and each pixel is expressed by an RGB value based on the CIE-sRGB color space of eight bits (0 to 255).

The color conversion unit FW3 obtains the input image data ID and performs color conversion on the input image data ID. Specifically, the color conversion unit FW3 converts the RGB value into an ink amount $I_j$ of each kind of ink by executing interpolating computation with reference to the color correction 3D-LUT 610. Although the color correction 3D-LUT 610 is prepared for each medium, it is not possible to execute printing on a medium when the medium for which the corresponding color correction 3D-LUT 610 is not stored is set or designated in the printer 20. The halftone unit FW4 executes halftone processing based on the ink amount $I_j$ of each kind of ink output by the color conversion unit FW3. The rasterizing unit FW5 allots each pixel (discharge availability) of halftone data after the halftone processing to each main scanning and each ink nozzle of the print head 59 to generate drive data. The drive data is output to the ASIC 55, and the ASIC 55 generates drive signals for the paper feeding mechanism 57, the carriage motor 58, and the print head 59.

Although the color conversion processing is performed by the firmware FW on the printer 20 according to this embodiment, the color conversion processing may be performed on a computer to which the printer 20 is connected. That is, the color correction 3D-LUT 610 may be installed in a computer (print control apparatus) which controls the printer 20, as well as in the printer 20.

As described above, it is not possible to execute printing on a medium for which the corresponding color correction 3D-LUT 610 is not stored. This is because the forward model converter 300 and the image quality evaluation index converter 136 used in creating the color correction 3D-LUT 610 are prepared for a certain medium (basic medium) as a target and it is not possible to realize a desired reproduced color and image quality even if the color correction 3D-LUT 610 is used for another medium. Ideally, it is necessary to prepare the color correction 3D-LUTs 610 for all printing media. That is, it is necessary to perform processing for creating the color correction 3D-LUT 610 for all kinds of printing media based on the aforementioned procedure. However, since it is necessary to form multiple color patches on each medium and perform measurement in order to prepare (generate) the forward model converter 300 and the image quality evaluation index converter 136, it is difficult to prepare the forward model converter 300 and the image quality evaluation index converter 136 for all kinds of media. To begin with, it is not possible to prepare the forward model converter 300 and the image quality evaluation index converter 136 for unknown media. Thus, an embodiment of the invention provides a method for creating an LUT for diverting media which are different from the basic media by diverting the forward model converter 300 and the image quality evaluation index converter 136 prepared for limited media (basic media) without preparing the forward model converter 300 and the image quality evaluation index converter 136 for each medium. Hereinafter, description will be given of the procedure.

D. Diverting Media LUT Creation Procedure

In Step S06 in the overall processing in FIG. 2, the computer 10 executes processing from Step S09 when it is determined that a diverting medium has been designated. When the diverting medium LUT is created, a revision value RW which will be described latter is calculated. The revision value RW is a value for determining a duty limit value (a new limit value in the embodiment of the invention) to be satisfied when the ink amount optimization is executed (as will be described later) with the use of the forward model converter 300 and the image quality evaluation index converter 136 prepared for the diverted medium in order to create the base LUT for the medium (diverting medium) for which the forward model converter 300 and the image quality evaluation index converter 136 are not prepared, as will be described later. Therefore, if the duty limit value is inappropriately set, the gradation feature may be deteriorated, or accuracy in the ink amount set in the diverting medium base LUT is lowered.

For example, the revision value RW calculated based on the K ink effectively works when applied to ink with large luminosity variation. However, the revision value RW is not very effective when applied to Y ink or the like with a small variation range in the luminosity direction. Therefore, there is a higher possibility in that it is possible to appropriately create the diverting medium if revision values RW are separately calculated for the ink with high luminosity dependency (K or the like) and the ink with high chromaticity dependency.

For example, yellow ink (Y) and orange ink (Or) as a special color are in an adjacent relationship in terms of color phases, and Or generally has a larger variation range and a greater maximum chromaticity value as compared with Y.

Therefore, when a revision value RW calculated for Y and a revision value RW calculated for Or are greatly different from each other, gradation gap becomes greater between the orange color phase and the yellow color phase, and there is a possibility of deteriorating the gradation feature. Accordingly, when there is a combination in which a color phase angle is equal to or less than a predetermined value (equal to or less than 60°, for example) in the mounted ink, there is a high possibility in that it is possible to appropriately create the diverting medium if ink revision value RW for the combination is commonly used. If an ink color with a wide variation range is compared with an ink color with a narrow variation range, the revision value RW calculated for the ink color with a wide variation range has a higher possibility of high precision. Therefore, there is a higher possibility in that it is possible to more precisely calculate an ink amount to be registered in the diverting medium if the revision value RW for the orange ink (Or) with the wide variation range is used when one of the revision values RW among that of the yellow ink (Y) and that of the orange ink (Or) is employed.

For the above reasons, it can be considered that the ink color for which the revision value RW is calculated in the following 1 to 9 variations in accordance with the combination of ink colors (mounted ink colors) used in printing by the printer 20 which mounts the LUT for the diverting medium.
1. A revision value RW calculated for each kind of ink is applied to every kind of ink.
2. An average value of revision values RW calculated for ink is applied to every kind of ink.
3. An average value of revision values RW calculated for each kind of ink is applied to each kind of ink in combinations in which color phases are adjacent and color phase difference is equal to or less than a predetermined range (equal to or less than 60°, for example), and revision values calculated for each of the other kinds of ink is applied to the each kind of ink.
4. A revision value RW calculated for ink with the largest hue value variation (largest maximum chromaticity) is applied to all the kinds of ink.
5. A revision value RW calculated for special color ink (chromatic special color ink such as orange, green, and the like) is applied to all the kinds of ink.
6. A revision value RW calculated for achromatic ink (K ink and the like) is applied to achromatic ink, and an average value of revision values RW calculated for each kind of chromatic ink is applied to each kind of chromatic ink.
7. A revision value RW calculated for achromatic ink (K ink and the like) is applied to achromatic ink, an average value of revision values RW calculated for each kind of chromatic ink is applied to each kind of chromatic ink in combinations in which color phases are adjacent and color phase difference is equal to or less than a predetermined range (equal to or less than 60°, for example), and revision values calculated for each of the other kinds of chromatic ink is applied to the each kind of chromatic ink.
8. A revision value RW calculated for achromatic ink (K ink and the like) is applied to achromatic ink, and a revision value RW calculated for special color ink (chromatic special color ink such as orange, green, and the like) with the largest hue value variation is applied to all the kinds of chromatic ink.
9. A revision value RW calculated for achromatic ink (K ink and the like) is applied to achromatic ink, and a revision value RW calculated for special color ink (chromatic special color ink such as orange, green, and the like) is applied to all the kinds of chromatic ink.

Hereinafter, description will be given of Case 1 in which a revision value RW is calculated for all the kinds of ink and the revision value RW calculated for each kind of ink is respectively applied to each kind of ink.

First, in Step S09, the LUT creation condition setting module 700 determines a diverted medium. The diverted medium means a basic medium which belongs to the same group as that of the diverting medium designated in Step S01 among the basic media. When the group of the designated diverting medium is unclassified, a basic medium in which each kind of ink has a standard color forming feature is determined to be the diverted medium among the basic media. Information for specifying the diverted medium is registered in the setting table STB by the setting information storage module 730.

In Step S10, the setting information storage module 730 obtains color forming feature data and the duty limit value $D_{Ij}$ of the diverted medium stored on the medium table MTB (hereinafter, the duty limit value $D_{Ij}$ of the diverted medium will be described as a standard duty limit value $D_{SIj}$) and registers the standard duty limit value $D_{SIj}$ in the setting table STB.

In Step S11, the LUT creation condition setting module 700 prints color patches for evaluating the color forming feature (the luminosity feature for the achromatic ink and the chromaticity feature for the chromatic ink) of the medium on the designated diverting medium. Specifically, the LUT creation condition setting module 700 generates patch image data for printing color patches and outputs the patch image data to the halftone unit FW4 of the printer 20. The patch image data is image data, in which each pixel has an ink amount $I_j$ (j=1 to 4) of a primary color, which is for printing color patches based on gradation of the ink amounts $I_j$ (j=1 to 8) of primary colors of ink (C, M, Y, K), secondary colors (R, G, B), and a color obtained by mixing all ink. For example, the individual ink amounts $I_j$ (j=1 to 4) of the primary color in gradation of the secondary colors and all the kinds of ink are equal. A character which represents the ink amount $I_j$ (j=1 to 8) used in printing of a color patch is added to each color patch.

In Step S12, color measurement is performed by a colorimeter on each color patch printed on the diverting medium by the printer 20, and the computer 10 obtains the color measurement value (CIE-L*a*b* color system).

In Step S13, the UI module 720 causes a display apparatus to display a medium feature designation UI image for designating a color forming feature of the diverting medium.

As described above, Steps S11 to S13 corresponds to the secondly obtaining step in the embodiment.

Figure 19:
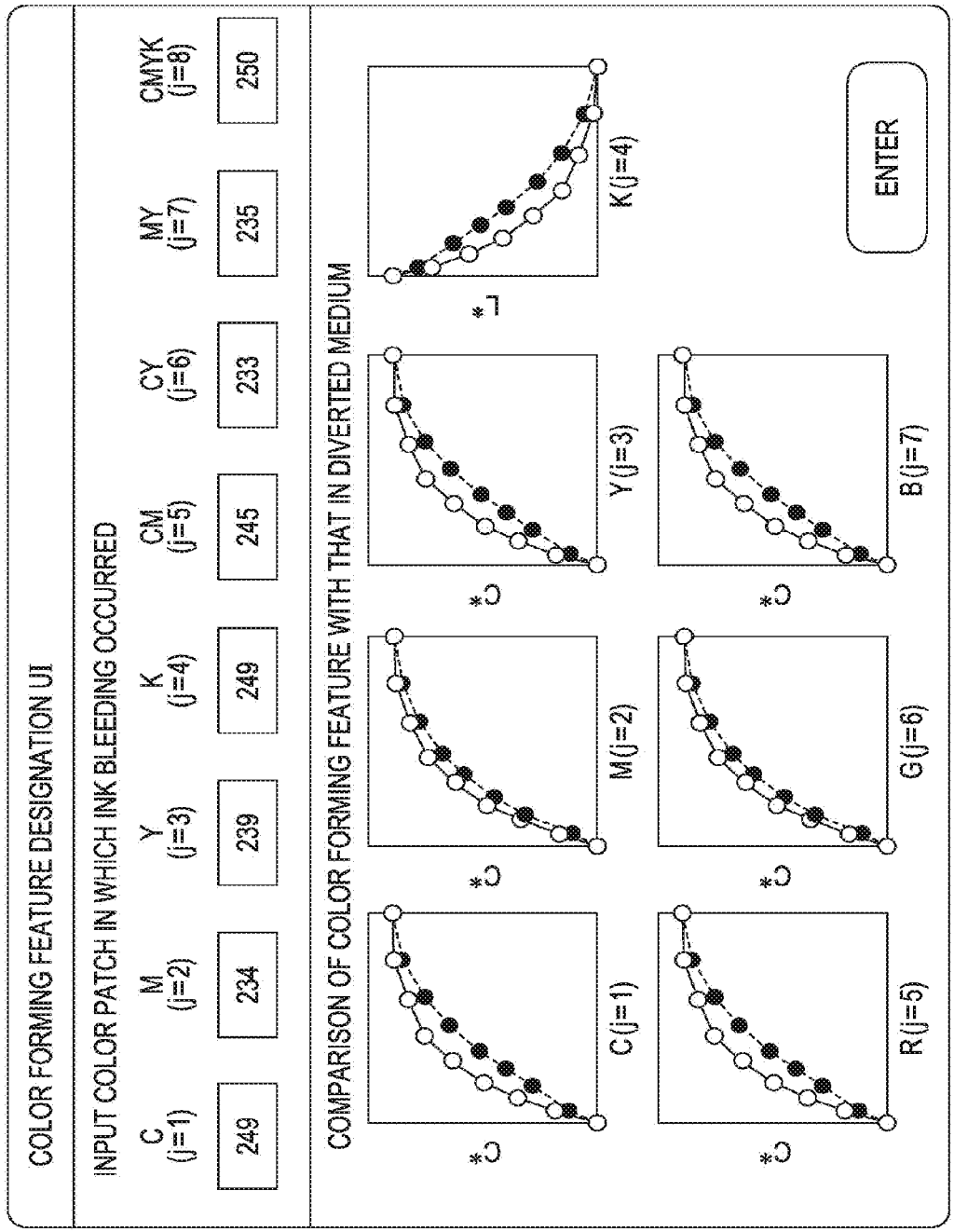
FIG. 19 is a diagram showing a medium feature designation UI image.

FIG. 19 is a diagram showing an example of the medium feature designation UI image. In the drawing, color measurement values (hue values) obtained by performing color measurement on the color patches (C, M, Y, K, R (secondary color of M and Y), G (secondary color of C and Y), and B (secondary color of C and M)) of gradation are shown by graphs as examples. In the graphs for the chromatic color patches (C, M, Y, R, G, and B), the vertical axis represents chromaticity C*. In the graph for the achromatic color patch (K), the vertical axis represents luminosity L*. The horizontal axis represents an ink amount $I_j$ (j=1 to 8). In each graph, the chromatic ness or the brightness based on the measurement value of each color patch printed in Step S11 is plotted (white circles) corresponding to a plurality of reference points (ink amounts of each color patch). That is, the color forming features in accordance with the ink amounts $I_j$ (j=1 to 8) in the diverting medium are represented in the graphs. In addition, the color forming feature of the diverted medium obtained from the medium table MTB is also plotted (black circles) so as to be comparable in each graph. That is, the same color patches are printed and subjected to color measurement in advance even for the diverted medium (basic medium), and the color measurement result corresponding to the ink amount of each color patch is stored on the medium table MTB as color forming feature data. That is, a step in which printing and color measurement of the color patch for the diverted medium (basic medium) displayed on the medium feature designation UI image in Step S13 corresponds to the first obtaining step in the embodiment.

In the medium feature designation UI image, text boxes are provided into which the user inputs as duty limit values $D_{Ij}$ the ink amounts $I_j$ (j=1 to 8) described in the color patches where ink bleeding starts to occur as a result of user's observation on the color patches of the primary colors of ink (C, M, Y, K), the secondary colors (R, G, B), and all kinds of ink. It is matter of course that the LUT creation condition setting module 700 may determine the ink amounts $I_j$ (j=1 to 8) from which the color measurement values become unstable due to ink bleeding or the like and automatically input the ink amounts as the duty limit values $D_{Ij}$ without depending on the user's observation.

Figure 20:
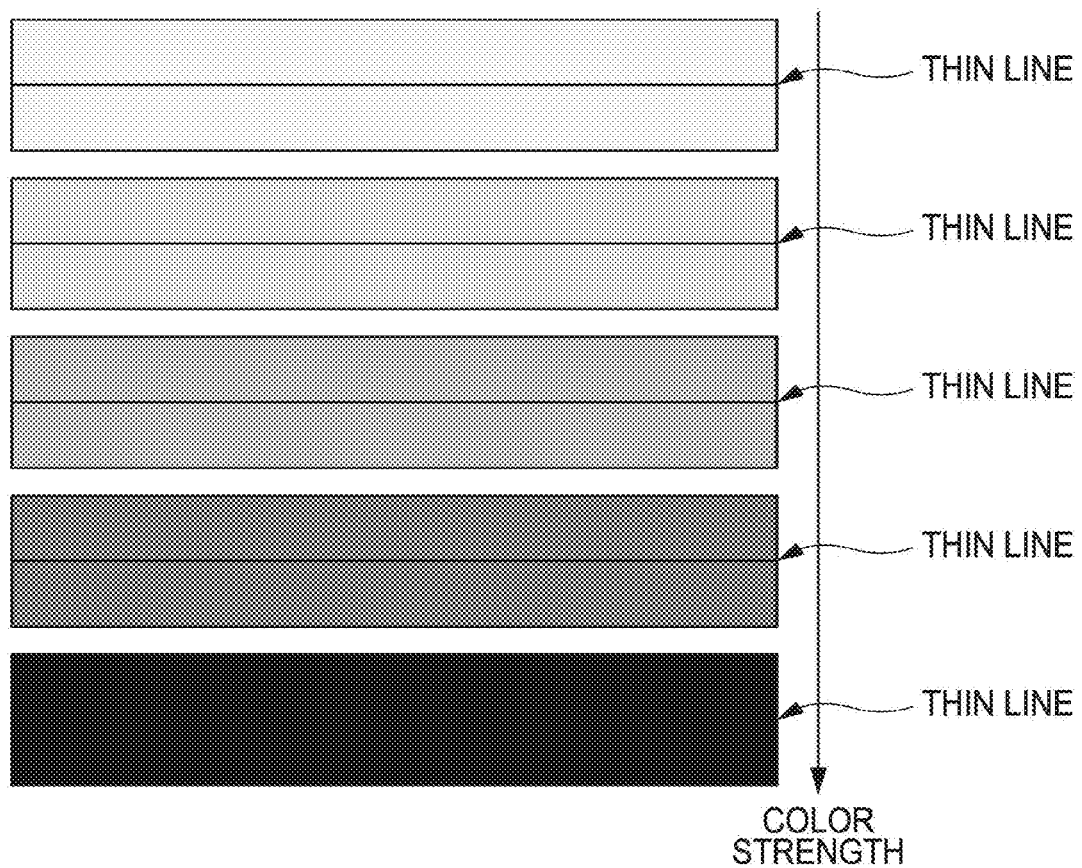
FIG. 20 is a diagram showing an example of a color patch for automatically inputting a duty limit value.

FIG. 20 shows an example of a color patch for automatically inputting a duty limit value $D_{Ij}$. The LUT creation condition setting module 700 can print an image in which thin lines are depicted on a solid image by uniformly printing the same color as shown in FIG. 20, for example, and automatically determine the duty limit value $D_{Ij}$ based on a degree of deviation (a degree of smoothness) at an edge of the thin line. Specifically, an image obtained by overlapping thin lines on a solid image in which ink amounts are variously changed is printed for each ink color (each primary color, secondary color, and a color obtained by mixing all the kinds of ink), edge detection is performed to detect an edge of the solid line in the print result, and a degree of deviation at the edge is detected. Then, an ink amount at which the degree of deviation exceeds a certain allowable value is regarded as the duty limit value $D_{Ij}$. The allowable value relating to the degree of deviation is experimentally determined in advance for each ink color. When the duty limit value $D_{Ij}$ is automatically detected as described above, the duty limit value $D_{Ij}$ is automatically displayed on the text box in FIG. 19. Since it is matter of course that there is also a demand of further applying ink even after ink bleeding occurs, the user can change the duty limit value $D_{Ij}$ while checking the automatically displayed duty limit value $D_{Ij}$ as a reference.

In the medium feature designation UI image, a duty limit value enter button is provided, and the setting information storage module 730 obtains the input duty limit value $D_{Ij}$ (Step S14) when the button is clicked, and stores the duty limit value $D_{Ij}$ on the setting table STB (Step S15). As described above, the duty limit value $D_{Ij}$ can be set for the diverting medium, the duty limit value $D_{Ij}$ of which has not been known. In addition, in the following description of "D. Diverting media LUT creation procedure", $D_{Ij}$ indicates the duty limit value $D_{Ij}$ for the diverting medium designated in Step S01 as long as there is no particular mention.

In Step S16, the LUT creation condition setting module 700 normalizes a hue value feature (first hue value feature) indicating a variation of the hue value in the diverted medium corresponding to the variation in ink amounts up to the standard duty limit value $D_{SIj}$ for the diverted medium and a hue value feature (second hue value feature) indicating a variation of a hue value in the diverting medium corresponding to a variation in ink amounts up to the duty limit value $D_{Ij}$ for the diverting medium. In addition, in this specification, the first hue value feature relating to the brightness, the first hue value feature relating to the chromaticity, the second hue value feature relating to the brightness, and the second hue value feature relating to the chromaticity are referred to as a first brightness feature, a first chromaticity feature, a second brightness feature, and a second chromaticity feature, respectively. Further, hereinafter, the first brightness feature and the second brightness feature will be described by applying the feature of the brightness L* for K ink (ink amounts $I_4$), and the first chromaticity feature and the second chromaticity feature will be described by applying the feature of the chromaticity C* for C ink (ink amounts $I_4$).

Figure 21A:
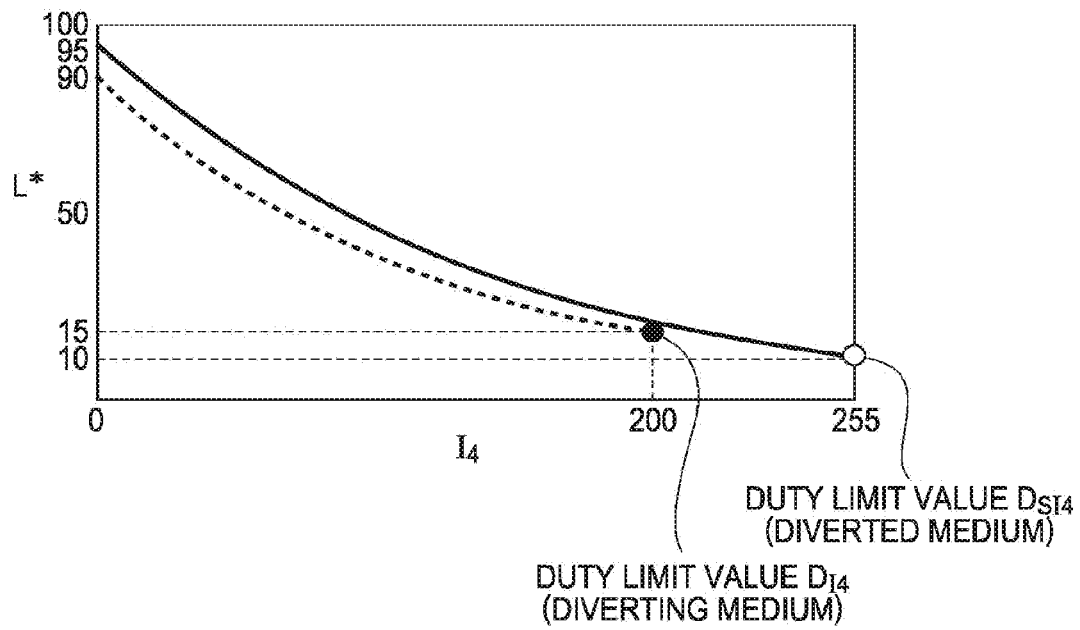
FIGS. 21A and 21B are diagrams showing another example of a state in which a first luminosity feature and a second luminosity feature are normalized.
Figure 21B:
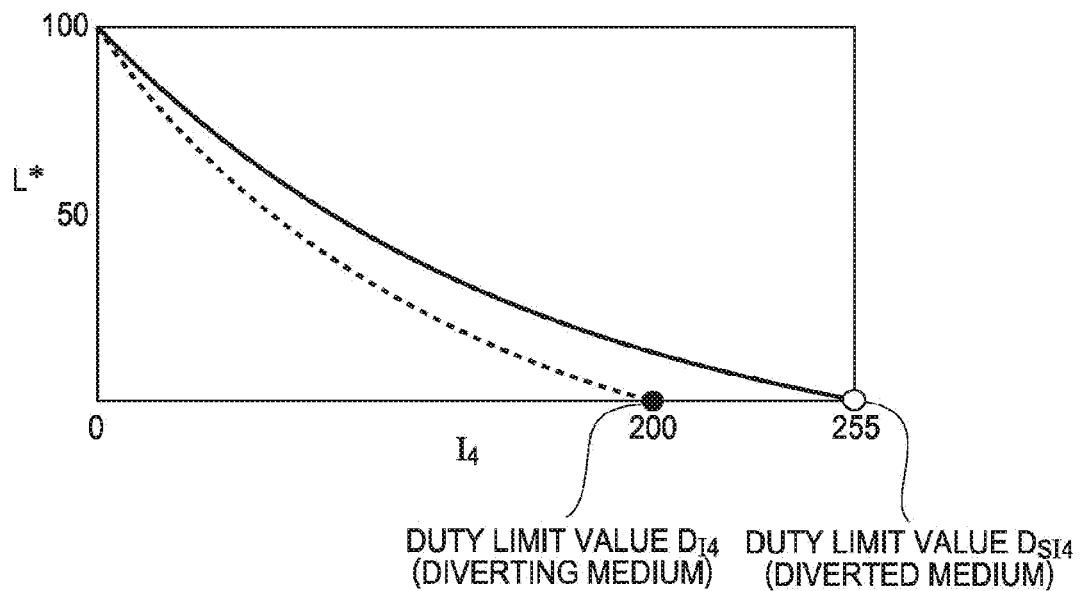

FIG. 21A shows an example of the first luminosity feature and the second luminosity feature before normalization, and FIG. 21B shows an example of the two luminosity features after normalization. In the drawings, the first luminosity feature is represented by solid lines, and the second luminosity feature is represented by chain lines. Although a luminosity range (L*=10 to 95) of the first luminosity feature does not coincide with a luminosity range (L*=15 to 90) of the second luminosity feature before normalization as shown in FIG. 21A, the luminosity ranges of the first luminosity feature and the second luminosity feature coincide with each other at L*=0 to 100 after normalization as shown in FIG. 21B. It is matter of course that a specific method for normalization is not limited to a specific method, and a method can be applicable as long as it is possible to normalize the luminosity range of the first luminosity feature and the luminosity range of the second luminosity feature within predetermined numerical value ranges, respectively.

Figure 22A:
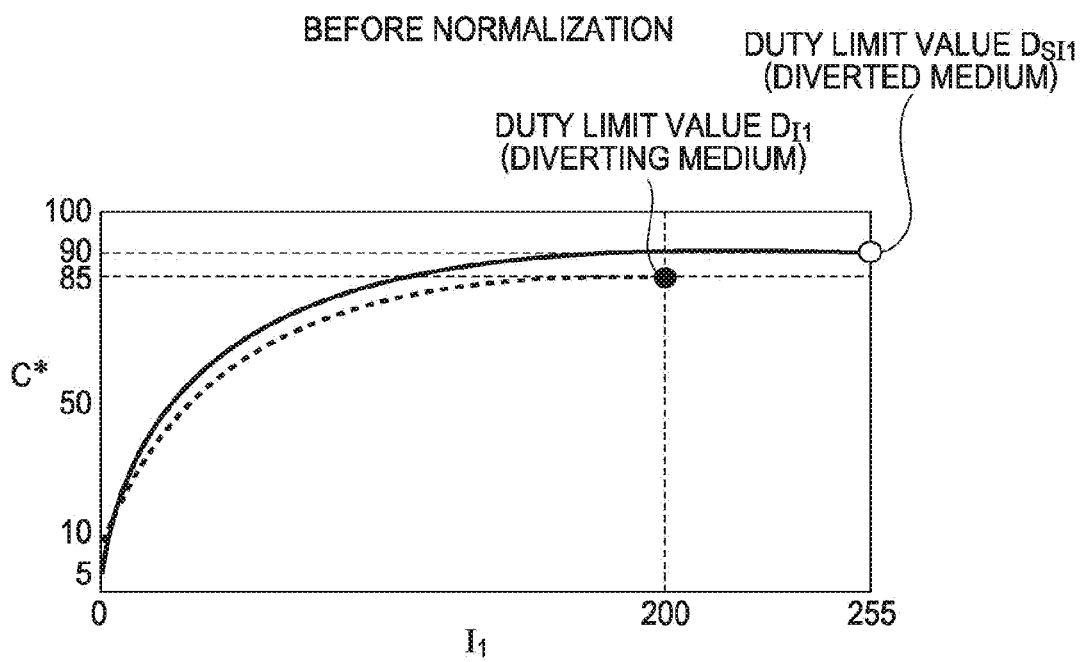
FIGS. 22A and 22B are diagrams showing an example of a state in which a first chromaticity feature and a second chromaticity feature are normalized.
Figure 22B:
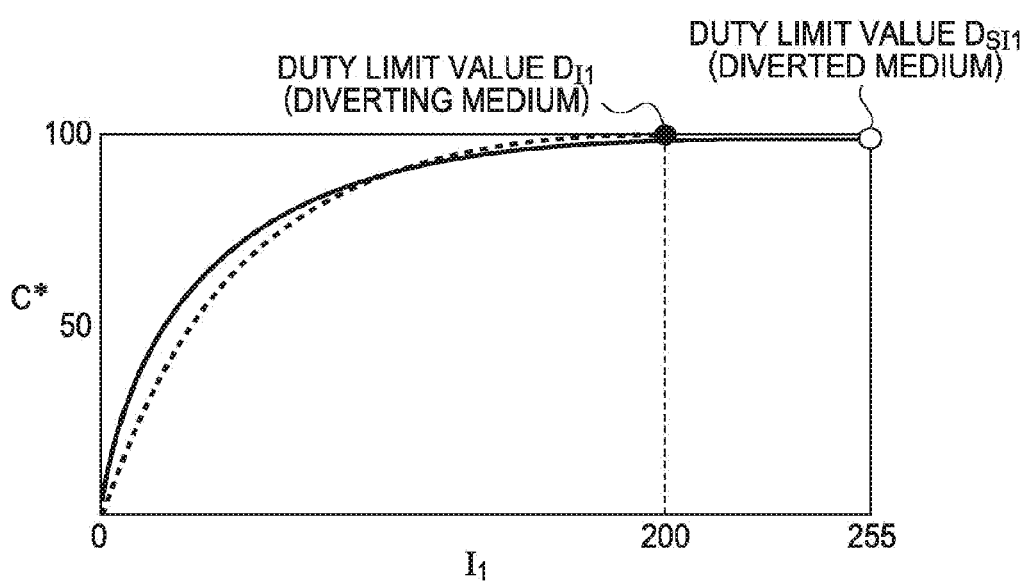

FIG. 22A shows an example of the first chromaticity feature and the second chromaticity feature before normalization, and FIG. 22B shows an example of the two chromaticity features after normalization. In the drawings, the first chromaticity feature is represented by solid lines, and the second chromaticity feature is represented by chain lines. Although a chromaticity range (C*=10 to 95) of the first chromaticity feature does not coincide with a chromaticity range (C*=15 to 90) of the second chromaticity feature before normalization as shown in FIG. 22A, the chromaticity ranges of the first chromaticity feature and the second chromaticity feature coincide with each other at C*=0 to 100 after normalization as shown in FIG. 22B. It is matter of course that a specific method for normalization is not particularly limited, and a method is applicable as long as it is possible to normalize the chromaticity range of the first chromaticity feature and the chromaticity range of the second chromaticity feature within predetermined numerical value ranges, respectively.

In Step S17, the LUT creation condition setting module 700 performs processing for approximating the second hue value feature to the first hue value feature.

Figure 23A:
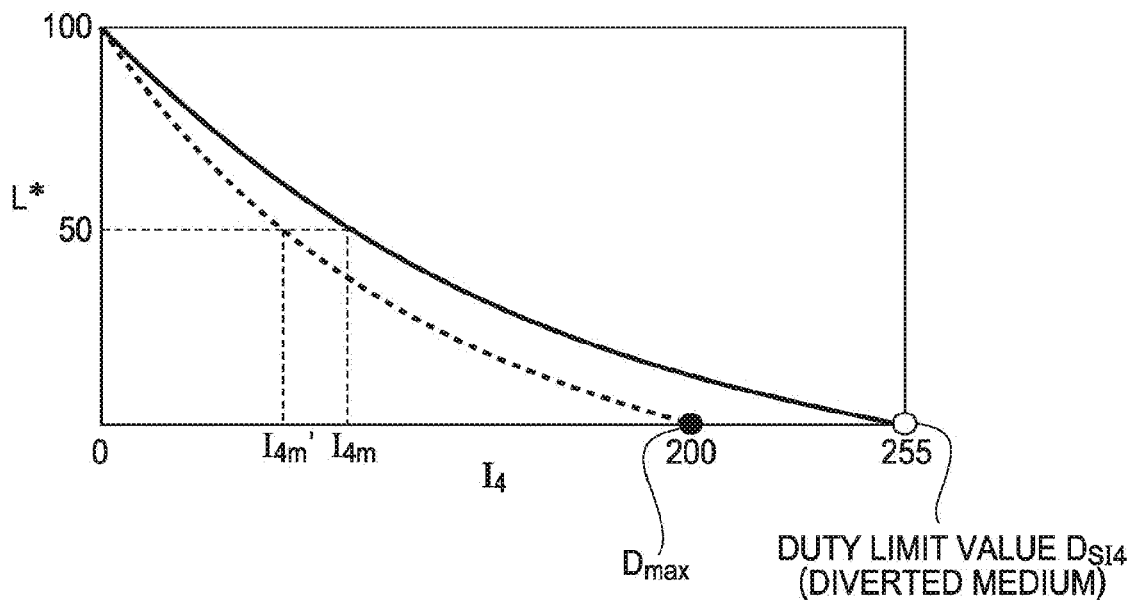
FIGS. 23A and 23B are diagrams showing an example of a state in which a first luminosity feature and a second luminosity feature are approximated.
Figure 23B:
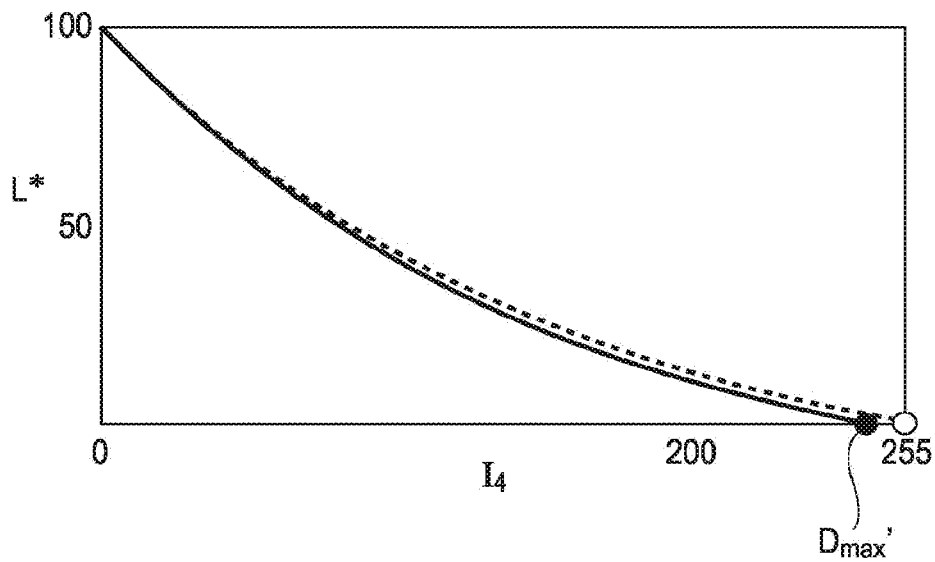

FIGS. 23A and 23B are diagrams for illustrating correction processing for approximating the second luminosity feature to the first luminosity feature. FIG. 23A shows the first luminosity feature and the second luminosity feature before correction (in a state after normalizing the luminosity range as in FIG. 21B), and FIG. 23B shows the first luminosity feature and the second luminosity feature after the correction. FIGS. 23A and 23B show an example of a state in which the normalized second luminosity feature is corrected so as to approximate to the normalized first luminosity feature. As specific processing, the LUT creation condition setting module 700 displaces a position of a maximum value $D_{max}$ of the ink amount in the normalized second luminosity feature along the horizontal axis and displaces positions of the other reference points in the normalized second luminosity feature along the horizontal axis with the displacement of the maximum value $D_{max}$. When the second luminosity feature is a feature of defining lower luminosity as a whole than the first luminosity feature as shown in FIG. 23A, the maximum value $D_{max}$ is displaced in a direction in which the value is increased (ink amount direction). On the other hand, when the second chromaticity feature is a feature of defining higher luminosity as a whole than the first luminosity feature, the maximum value $D_{max}$ is displaced in a direction in which the value is decreased (ink amount direction). In addition, displacement directions and positional variation rates before and after the displacement are common both in the maximum value $D_{max}$ and in the other reference points.

Figure 24A:
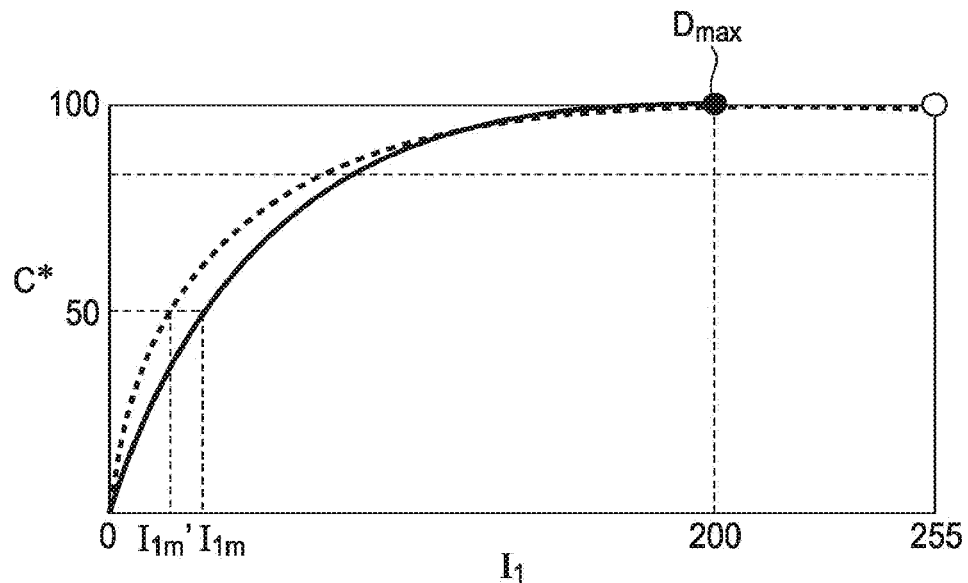
FIGS. 24A and 24B are diagrams showing an example of a state in which a first chromaticity feature and a second chromaticity feature are approximated.
Figure 24B:
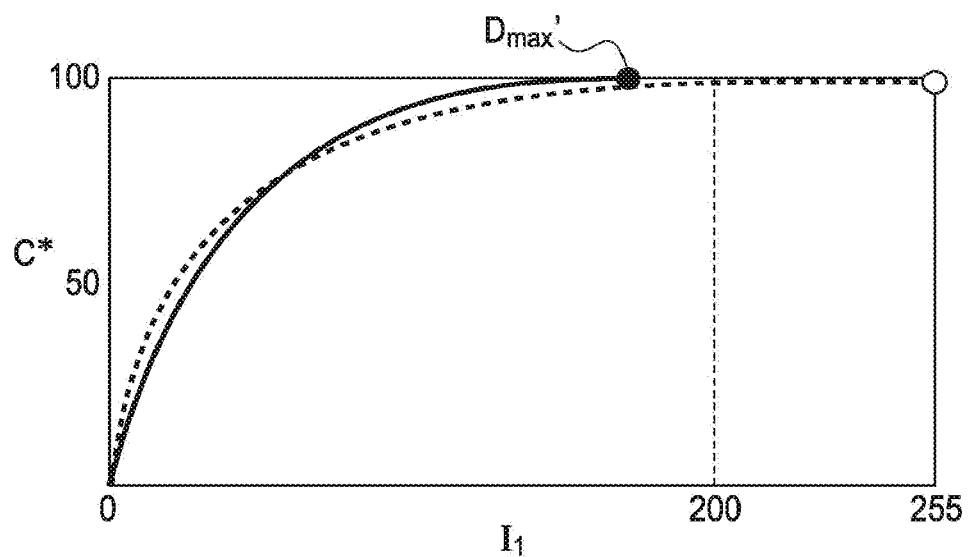

FIGS. 24A and 24B are diagrams for illustrating correction processing for approximating the second chromaticity feature to the first chromaticity feature. FIG. 24A shows the first chromaticity feature and the second chromaticity feature before correction (in the state after normalizing the chromaticity range as in FIG. 22B), and FIG. 24B shows the first chromaticity feature and the second chromaticity feature after the correction. FIGS. 24A and 24B show an example of a state in which the normalized second chromaticity feature is corrected so as to approximate to the normalized first chromaticity feature. As specific processing, the LUT creation condition setting module 700 displaces a position of a maximum value $D_{max}$ of an ink amount in the normalized second chromaticity feature along the horizontal axis and displaces positions of the other reference point in the normalized second chromaticity feature in the horizontal axis with the displacement of the maximum value $D_{max}$. When the second chromaticity feature is a feature of defining lower chromaticity as a whole than the first chromaticity feature as shown in FIG. 24A, the maximum value $D_{max}$ is displaced in a direction in which the value is decreased (ink amount direction). On the other hand, when the second chromaticity feature is a feature of defining higher chromaticity as a whole than the first chromaticity feature, the maximum value $D_{max}$ is displaced in a direction in which the value is increased (ink amount direction). In addition, displacement directions and positional variation rates before and after the displacement are common both in the maximum value $D_{max}$ and in the other reference points.

The LUT creation condition setting module 700 calculates approximate curves based on the maximum $D_{max}$ and the other reference points after the displacement as described above by a minimum square method or the like and regards the calculated approximate curves as candidates of the second luminosity feature and the second chromaticity feature after the correction. The LUT creation condition setting module 700 evaluates degrees of approximation between the approximate curves thus generated as candidates and the first luminosity feature and the first chromaticity feature after normalization. Such generation of the approximate curves and the evaluation of the degrees of approximation between the approximate curve and the first luminosity feature and the first chromaticity feature are repeated a plurality of times while the displacement amounts of the maximum value $D_{max}$ (and other reference points) are changed, and an approximate curve with the highest degree of approximation is fixed as the second luminosity feature (FIG. 23B) and the second chromaticity feature (FIG. 24B) after the correction. Although there are various methods for evaluation the degrees of approximation, an approximate curve which minimize a square error between a predetermined reference point on the first hue value feature and a predetermined reference point on the approximate curve is evaluated as an approximate curve with the highest degree of approximation, for example.

In addition, the LUT creation condition setting module 700 may evaluate the degree of the approximation between the approximate curve and the first hue value feature while giving more weight on evaluation to reference points belonging to a specific hue value range among a plurality of reference points on the approximate curve than the other reference points at the time of the evaluation of the degree of the approximation. More specifically, evaluation is performed after giving more weight on reference points belonging to a specific intermediate luminosity region (for example, a region including luminosity L*=30 to 70) from among a plurality of reference points on the approximate curve than the other reference points.

In Step S18, the LUT creation condition setting module 700 regards as a revision value RW with respect to the duty limit value of the K ink a ratio of the maximum value $D_{max}'$ in the fixed second luminosity feature after the correction with respect to the maximum value $D_{max}$ before the correction and regards as a revision value RW with respect to the duty limit value of the C ink a ratio of the maximum value $D_{max}'$ in the fixed second chromaticity feature before the correction with respect to the maximum value $D_{max}$ before the correction.

In the example of FIGS. 23A and 23B, since the second luminosity feature is approximated to the first luminosity feature by displacing the maximum value $D_{max}$ in the direction in which the value is increased, the maximum value $D_{max}'$ is a value which is greater than the maximum value Dmax, and the revision value RW is a value which is greater than 100. The revision value RW represents a ratio with respect to the maximum value (standard duty limit value $D_{SIj}$) of the ink amount in the first luminosity feature. The revision value RW with respect to the duty limit value here is a value for determining a duty limit value (a new limit value in an embodiment of the invention) to be satisfied when optimization of the ink amount is executed (as will be described later) with the use of the forward model converter 300 and the image quality evaluation index converter 136 prepared for the diverted medium in order to create a base LUT for medium (diverting medium) for which the forward model converter 300 and the image quality evaluation index converter 136 are not prepared. The LUT creation condition setting module 700 stores the obtained revision value RW on the setting table STB.

On the other hand, since the second luminosity feature is approximated to the first luminosity feature by displacing the maximum value $D_{max}$ in the direction in which the value is decreased when the second luminosity feature is a feature of defining higher luminosity as a whole than the first luminosity feature, the maximum value $D_{max}'$ is a value which is smaller than the maximum value $D_{max}$, and the revision value RW is a value which is smaller than 1.0.

Since the second chromaticity feature is approximated to the first chromaticity feature by displacing the maximum value $D_{max}$ in the direction in which the value is decreased in the example of FIGS. 24A and 24B, the maximum value $D_{max}'$ is a value which is smaller than the maximum value $D_{max}$, and the revision value RW is a value which is smaller than 1.0. The revision value RW represents a ratio with respect to the maximum value (standard duty limit value $D_{SIj}$) of the ink amount in the first chromaticity feature. The LUT creation condition setting module 700 stores the obtained revision value RW on the setting table STB.

On the other hand, since the second chromaticity feature is approximated to the first chromaticity feature by displacing the maximum value $D_{max}$ in the direction in which the value is increased when the second chromaticity feature is a feature of defining higher chromaticity as a whole than the first chromaticity feature, the maximum value $D_{max}'$ is a value which is greater than the maximum value $D_{max}$, and the revision value RW is a value which is greater than 1.0.

As described above, in relation to the revision value RW calculated for each of the primary colors and the secondary colors, only necessary revision values RW may be calculated depending on which one of the aforementioned variations 1 to 9, and the revision value RW in accordance with each of the aforementioned variations 1 to 9 is set for each of the primary colors and the secondary colors of each ink with the use of the revision value RW calculated for each kind of ink.

In Step S19, the LUT creation condition setting module 700 defines a conversion relationship of an amount of the K ink based on the first luminosity feature and the second luminosity feature and defines a conversion relationship of an amount of the C ink based on the first chromaticity feature and the second chromaticity feature. The conversion relationship here is a conversion relationship for converting the ink amount determined by executing the ink amount optimization with the use of the forward model converter 300 and the image quality evaluation index converter 136 prepared for the diverted medium into an ink amount which can adapt to the feature of the diverting medium in order to generate the base LUTs 510 and 520 for the diverting medium. That is, the ink amount determined by the optimization with the use of the forward model converter 300 and the image quality evaluation index converter 136 prepared for the diverted medium is an optimal ink amount for reproducing a certain hue value on the diverted medium, and therefore, it is necessary to convert the ink amount into an ink amount which can reproduce the same hue value on the diverting medium, and a conversion relationship therefor is defined.

In such a case, the LUT creation condition setting module 700 calculates a nonlinear conversion function (for example, a γ curve) so as to convert the ink amounts $I_j$ corresponding to (a single or a plurality of) kinds of luminosity in the first luminosity feature into ink amounts $I_{Sj}$ corresponding to the same or approximate hue values in the second hue value feature, as an example of the conversion relationship relating to the luminosity. For example, as shown in FIG. 23A as an example, a nonlinear function $f_{CLVj}$ (not shown) so as to convert the ink amount $I_{4m}$ which reproduces certain luminosity L*=50 on the diverted medium (the first luminosity feature) into the ink amount $I_{4m}'$ which reproduces the luminosity L*=50 in the diverting medium (second luminosity feature) is calculated. In addition, the nonlinear function $f_{LCVj}$ may have a conversion feature of converting the ink amount $I_4$ corresponding at least to the standard duty limit value $D_{SI4} \times$ RW into the ink amount $I_4$ reproducing the luminosity L, which is reproduced when the amount of ink is made to adhere onto the diverted medium (first luminosity feature), on the diverting medium (second luminosity feature).

Alternatively, the LUT creation condition setting module 700 may generate an LUT in which the ink amounts of the first luminosity feature and the ink amount in the second luminosity feature with common luminosity are associated with each other and regards the LUT as the conversion relationship instead of the nonlinear function $f_{LCVj}$. According to such a LUT, it is possible to convert an ink amount $I_j$ corresponding to luminosity in the first luminosity feature into an ink amount $I_j$ corresponding to the same luminosity in the second luminosity feature.

In addition, the LUT creation condition setting module 700 calculates a nonlinear conversion function (for example, a γ curve) so as to convert the ink amounts $I_j$ corresponding to (a single or a plurality of) kinds of chromaticity in the first chromaticity feature into the ink amount $I_{Sj}$ corresponding to the same or approximate chromaticity in the second chromaticity feature, as an example of the conversion relationship relating to the chromaticity. For example, as shown in FIG. 24A, a nonlinear function $f_{CCVj}$ (not shown) so as to convert the ink amount $I_{1m}$ which reproduces certain chromaticity C*=50 on the diverting medium (the first chromaticity feature) into the ink amount $I_{1m}'$ which reproduces the chromaticity C*=50 on the diverting medium (second chromaticity feature) is calculated. In addition, the nonlinear function $f_{CCVj}$ may have a conversion feature of converting the ink amount $I_1$ corresponding at least to the standard duty limit amount $D_{SI1} \times$ RW into the ink amount $I_1$ reproducing the chromaticity C*, which is reproduced when the amount of ink is made to adhere onto the diverted medium (first chromaticity feature), on the diverting medium (second luminosity feature).

Alternatively, the LUT creation condition setting module 700 may generate a LUT in which the ink amounts of the first chromaticity feature and the ink amounts in the second chromaticity feature with common chromaticity are associated with each other and regards the LUT as the conversion relationship instead of the nonlinear function $f_{CCVj}$. According to such a LUT, it is possible to convert an ink amount $I_j$ corresponding to chromaticity in the first chromaticity feature into an ink amount $I_j$ corresponding to the same chromaticity in the second chromaticity feature. Although the description was given of examples of the C ink with reference to FIGS. 22A to 23B, a nonlinear function $f_{CCVj}$ or an LUT with a feature of converting the ink amount $I_j$ which reproduces predetermined chromaticity C* on the diverted medium (first chromaticity feature) into the ink amount $I_j$ which reproduces the chromaticity C* on the diverting medium (second hue value feature) is generated for each of the other chromatic ink (C, M, Y) and the secondary colors (R, G, B) as well as a conversion relationship for the chromatic ink.

Moreover, when so-called special color ink such as orange ink (Or), green ink (Gr), and the like is provided, a nonlinear function $f_{CCVj}$ or a LUT with a feature of converting the ink amount $I_j$ reproducing predetermined chromaticity C* on the diverted medium (first chromaticity feature) into the ink amount $I_j$ reproducing the chromaticity C* on the diverting medium (second chromaticity feature) is generated as the conversion relationship of white ink even for the special color ink. In addition, when white ink (W) is provided, a nonlinear function $f_{LGVj}$ or a LUT for the white ink, which has a feature of converting the ink amount $I_j$ reproducing predetermined luminosity L* in the diverted medium (first luminosity feature) into the ink amount $I_j$ reproducing the luminosity L* in the diverting medium (second luminosity feature), is created as a conversion relationship for the white ink.

When the revision value RW of the second luminosity feature, the conversion relationship between the first luminosity feature and the second luminosity feature, the revision value RW of the second chromaticity feature, and the ink amount conversion relationship between the first chromaticity feature and the second chromaticity feature are obtained as described above, a configuration is also applicable in which the ink amount range is also normalized after the aforementioned normalization of the luminosity range and the chromaticity range shown in FIGS. 21A to 22B and the conversion relationships shown in FIGS. 23A to 24B are created. Hereinafter, description will be given of normalization while the K ink is exemplified.

Figure 25A:
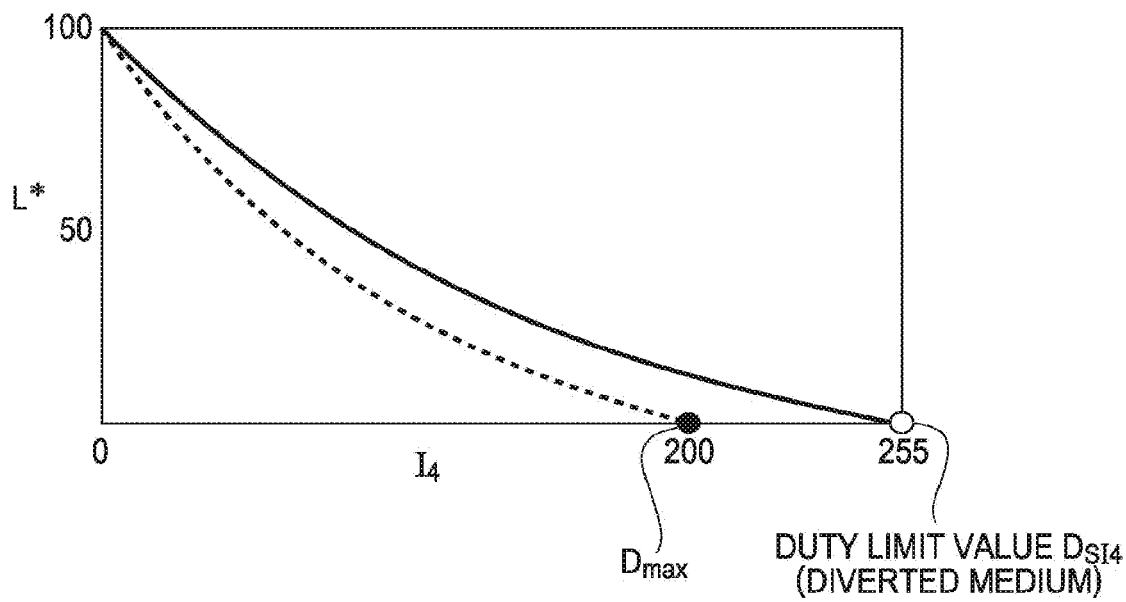
FIGS. 25A and 25B are diagrams showing an example of a state in which an ink amount range is normalized.
Figure 25B:
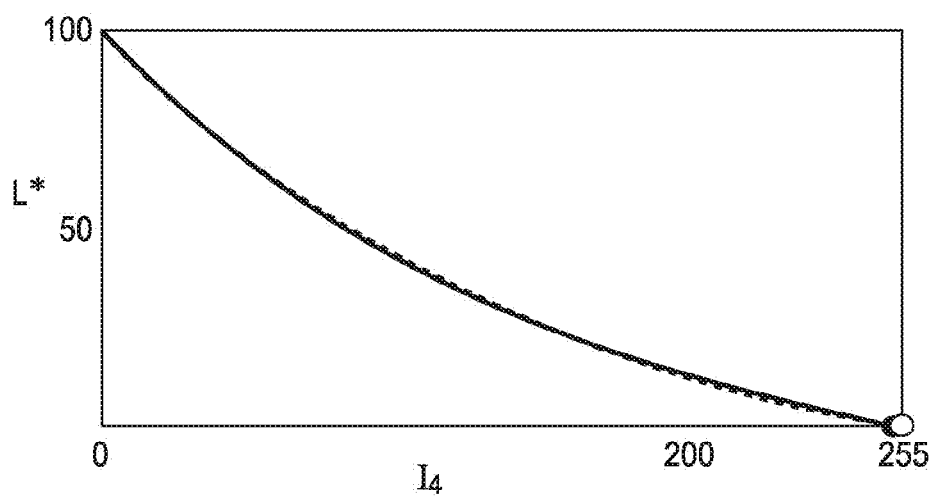

FIG. 25A shows an example of the two luminosity features before normalization, and FIG. 25B shows an example of the two luminosity features after normalization. A specific method for normalization is not particularly limited, and an ink amount range (0 to $D_{I4}$) may be normalized on the basis of the first luminosity feature by multiplying the ink amount $I_j$ of the second luminosity feature by a ratio ($D_{SI4}/D_{I4}$) of the standard duty limit value $D_{SIj}$ with respect to the duty limit value $D_{Ij}$, for example. Alternatively, the ink amount range (0 to $D_{SI4}$) of the first luminosity feature and the ink amount range (0 to $D_{I4}$) of the second luminosity feature may be normalized to predetermined numerical value ranges (0 to 1.0, for example), respectively. In FIG. 25B, normalization was performed by the latter method.

That is, in FIG. 25B, the ink amount rage of the first luminosity feature is normalized to 0 to 1.0 by multiplying the ink amount $I_4$ indicating a position of plotting the color measurement value of the color patch (K) printed on the diverted medium in the horizontal axis direction by a normalization ratio $1/D_{SI4}$ for the first luminosity feature, and the ink amount range of the second luminosity feature is normalized to 0 to 1.0 by multiplying the ink amount $I_4$ indicating the position of plotting the color measurement value of the color patch (K) printed on the diverting medium by the normalization ratio $1/D_{SI4}$ for the second luminosity feature. In FIGS. 25A and 25B, the luminosity L* in the vertical axis is shown in a state normalized to 0 to 100.

There is a possibility in that the variation in the ink amount is decreased when the ink amount is converted by the ink amount converter, which will be described later, with the use of the aforementioned conversion relationship, and there is a possibility in that accuracy in prediction of the diverting LUT is enhanced, by normalizing the ink amount range.

In Step S20, the conversion relationship for each primary color ink defined in Step S19 is set in the ink amount converter 710. In so doing, the ink amount converter 710 can convert the ink amount $I_j$ (j=1 to 4) based on the conversion relationship.

In Step S21, the tone of the diverting medium and the tone of the diverted medium are respectively analyzed. Specifically, a*, b* values when the CMY ink is made to separately adhere to the diverting medium up to the duty limit value $D_{Ij}$ (j=1 to 3) (hereinafter, described as diverting medium tone ($a_{Cj}^*$, $b_{Cj}^*$) (j=1 to 3)) and a*, b* values when the CMY ink is made to separately adhere to the diverted medium up to the standard duty limit value $D_{SIj}$ (j=1 to 3) (hereinafter, described as diverted medium tone ($a_{Sj}^*$, $b_{Sj}^*$) (j=1 to 3)) are obtained and analyzed.

Such hue values are obtained as color measurement values obtained from the color patches corresponding to the duty limit value $D_{Ij}$ (j=1 to 3) and the standard duty limit value $D_{SIj}$ (j=1 to 3) in Steps S10 and S12. It is matter of course that the diverting medium tone ($a_{Cj}^*$, $b_{Cj}^*$) and the diverted medium tone ($a_{Sj}^*$, $b_{Sj}^*$) may be obtained from color patches in which predetermined luminosity L* and chromaticity C* are reproduced or may be obtained from color patches based on a predetermined ink amount $I_j$ (for example, 15% or the like with respect to the duty limit value $D_{Ij}$, $D_{SIj}$) other than the duty limit value $D_{Ij}$, $D_{SIj}$. In addition, the diverting medium tone ($a_{Cj}^*$, $b_{Cj}^*$) and the diverted medium tone ($a_{Sj}^*$, $b_{Sj}^*$) may be obtained from color patches of composite gray formed by causing the amount $I_j$ (j=1 to 3) of ink to adhere to each medium by an equal amount. In any case, not the hue values of each medium itself but the hue values of each medium in a state in which ink adheres to some extent are obtained, and therefore, it is possible to evaluate the tone of an intermediate luminosity region.

Figure 26:
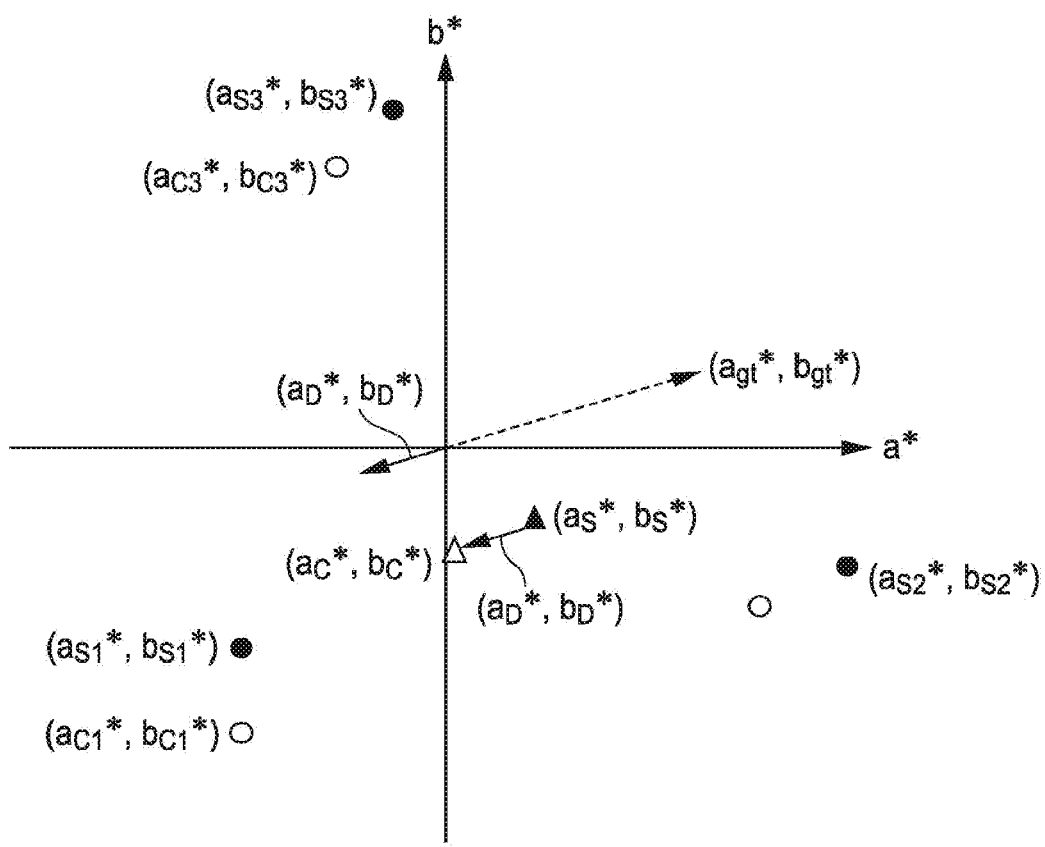
FIG. 26 is a graph in which diverting medium tone and diverted medium tone are plotted on an a*b* plane.

FIG. 26 is a graph obtained by plotting diverting medium tone ($a_{Cj}^*$, $b_{Cj}^*$) (j=1 to 3) (white circles) and diverted medium tone ($a_{Sj}^*$, $b_{Sj}^*$) (j=1 to 3) (black circles) in an a*b* plane. Since the diverting medium and a diverted medium have mutually different tone, the diverting medium tone ($a_{Cj}^*$, $b_{Cj}^*$) and the diverted medium tone ($a_{Sj}^*$, $b_{Sj}^*$) do not completely coincide with each other. In Step S22, the diverting medium tone ($a_C^*$, $b_C^*$) (white triangle) is calculated by summing up the diverting medium tone ($a_{Cj}^*$, $b_{Cj}^*$) (j=1 to 3) while the diverting medium tone ($a_{Cj}^*$, $b_{Cj}^*$) (j=1 to 3) is regarded as a position vector from the origin a*, b*=0 as in Equation (34). Similarly, by summing up the diverted medium tone ($a_{Sj}^*$, $b_{Sj}^*$), the diverted medium tone ($a_S^*$, $b_S^*$) (black triangle) is calculated.

$$(a_C^*, b_C^*) = \left(\sum_{j=1}^{3} a_{Cj}^*, \sum_{j=1}^{3} b_{Cj}^*\right) \quad (34)$$

$$(a_S^*, b_S^*) = \left(\sum_{j=1}^{3} a_{Sj}^*, \sum_{j=1}^{3} b_{Sj}^*\right)$$

Moreover, difference tone ($a_{D^*}$, $b_{D^*}$) is calculated by subtracting the diverted medium tone ($a_S^*$, $b_S^*$) (black triangle) from the diverting medium tone ($a_C^*$, $b_C^*$) (white triangle) as in Equation (35).

$$(a_D^*, b_D^*) = (a_C^* - a_S^*, b_C^* - b_S^*) \quad (35)$$

If the difference tone $a_D^*$, $b_D^*$ can be calculated as described above, a color phase direction shown by a vector ($-a_D^*$, $-b_D^*$) with signs which are opposite to those of the difference tone ($a_D^*$, $b_D^*$) as a color phase direction of the gray target tone ($a_{gt}^*$, $b_{gt}^*$) (Step S22). That is, the gray target tone ($a_{gt}^*$, $b_{gt}^*$) is a vector obtained by multiplying the vector ($-a_D^*$, $-b_D^*$) by a positive coefficient k. The size of the coefficient k is set by the user, for example. In Step S23, the setting information storage module 730 stores the gray target tone ($a_{gt}^*$, $b_{gt}^*$) on the setting table STB. Moreover, in Step S24, the setting information storage module 730 causes the setting table STB to store a valid flag indicating that the ink amount converter 710 is valid. By the above processing, the setting table STB shown in FIG. 5 stores necessary setting information. Thereafter, the procedure proceeds to processing for creating a base LUT for the diverting medium with reference to the setting table STB. Here, description will be given of a part which is different from the processing for creating the base LUT for the basic medium in turn.

First, in Step S100 in FIG. 6, each of the converters 300, 310, 410, and 136 and the like the like is prepared (activated) based on the information stored on the setting table STB. In the case of a diverting medium, each of the converters 300, 310, 410, and 136 and the like for the diverted medium stored on the setting table STB is prepared (activated). That is, since each of the converters 300, 310, 410, and 136 and the like is not prepared for the diverting medium, each of the converters 300, 310, 410, and 136 and the like for the diverted medium as a basic medium is diverted. In addition, since a valid flag is added, the ink amount converter 710 is activated, and the conversion of the ink amount $I_j$ with the use of the aforementioned conversion relationship becomes possible.

In the initial setting processing (Step T107 in FIG. 14) in Step T100 in FIG. 13, the gray target tone ($a_{gt}^*$, $b_{gt}^*$)=k×($-a_D^*$, $-b_D^*$) stored on the setting table STB in Step S23 of FIG. 2 is set. That is, while the gray target is always set on the L* axis when the base LUT for the basic medium is created, the gray target is shifted in the opposite color phase direction of relative tone of the diverting medium when the base LUT for the diverting medium is created.

Figure 27:
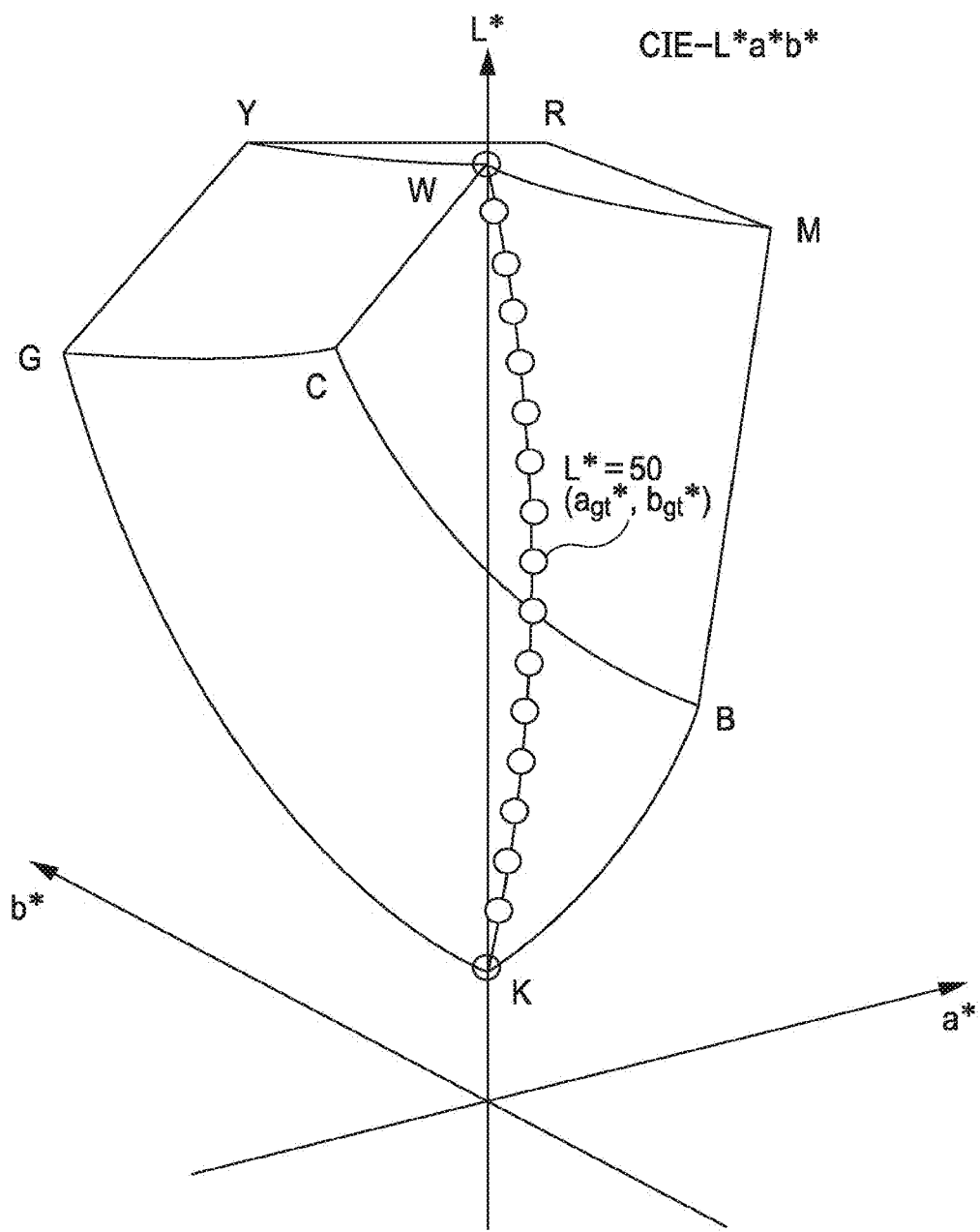
FIG. 27 is a diagram showing a gray target when a diverting medium LUT is created.

FIG. 27 is a diagram showing a gray target when the LUT for the diverting medium is created. As shown in the drawing, lattice points (white circles) corresponding to the gray axis lattice points are restricted so as to indicate positions which equally divides indo sixteen parts a line segment connecting a paper black point and a paper white point on the L* axis in the L*a*b*color space and curved in the phase color direction of the gray target tone ($a_{gt}^*$, $b_{gt}^*$). In so doing, positions of the lattice points corresponding to the gray axis lattice points after the smoothing processing become positions deviated from the L* axis. The amount of curve becomes a maximum in the intermediate luminosity region, and a maximum value at L*=50 becomes the gray target tone ($a_{gr}^*$, $b_{gr}^*$) in this embodiment. In addition, a single or a plurality of control points which can be dragged and dropped by the user may be provided on the gray target, and a coefficient k which defines the amount of curve which passes through the dragged and dropped control points may be determined.

Moreover, in the optimization processing in Step T130 in FIG. 13, the standard duty limit value $D_{SIj}$ (j=1 to 8) of each kind of ink for the diverted medium stored on the setting table STB is multiplied by the revision value RW and converted into a new control value (=temporary duty limit value $D_{PIj}$; j=1 to 8). That is, the standard duty limit value $D_{SIj}$ (j=1 to 8) of each kind of ink for the diverted medium stored on the setting table STB is not used as it is as the duty limit value for the optimization processing but is used after the conversion into the temporary duty limit value $D_{PIj}$. Accordingly, the optimization of the ink amount $I_j$ is executed under a restriction condition of the temporary duty limit value $D_{PIj}$.

Therefore, the processing in Step T130 executed after the diverting medium is designated corresponds to the ink amount determining step in which image quality by the designated ink amount is evaluated with a prediction result of the hue value by the color prediction model with which it is possible to predict the hue value when the designated amount of ink is made to adhere to the diverted medium and an ink amount below the new limit value is designated to execute prediction of the hue value by the color prediction model when the ink amount which reproduces the hue value shown by the lattice point is determined in the optimization of the ink amount based on the evaluation. In addition, Steps S17 and S18 and Step T130 also correspond to the limit value determining step in which the second hue value feature is corrected and approximated to the first hue feature and a new limit value for the ink amount is determined based on the second hue value feature after the approximation.

Here, the revision value RW is a value which is 1.0 or less or more as described above. When the revision value is equal to or less than 1.0, the temporary duty limit value $D_{PIj}$ becomes equal to or less than the standard duty limit value $D_{SIj}$. Therefore, it is possible to optimize the ink amount $I_j$ within a range of the ink amount $I_j$ in which each of the converters 300, 310, 410, and 136 and the like for the diverted medium can predict the hue value and the like.

On the other hand, when the revision value RW is greater than 1.0, the temporary duty limit value $D_{PIj}$ becomes a value which is greater than the standard duty limit value $D_{SIj}$. In such a case, there may be ink amounts $I_j$ which exceed a range (within the standard duty limit value $D_{SIj}$) of the ink amount $I_j$ (j=1 to 8), in which it is possible to predict the hue value and the like by the converter, among the ink amounts $I_j$ input to the forward model converter 300 and the image quality evaluation index converter 136 for the diverted medium. If an ink amount $I_j$ which exceeds the range of the ink amount $I_j$ (j=1 to 8), in which the converters can predict the hue value and the like, is input to the forward model converter 300 and the image quality evaluation index converter 136 for the diverted medium as described above, prediction results for the hue values and the like are ruined, and optimization of the ink amount $I_j$ cannot substantially be executed, in some cases.

According to this embodiment, the ink amount optimization module 134 thus reduces the ink amount $I_j$ (j=1 to 8) based on the designated ink amount $I_j$ to the standard duty limit value $D_{SIj}$ when the ink amount $I_j$ (j=1 to 8) based on the designated ink amount $I_j$ (j=1 to 4) exceeds the standard duty limit value $D_{SIj}$ and executes optimization processing of the ink amount including prediction and the like of the hue value by the forward model converter 300 and the image quality evaluation index converter 136 for the diverted medium based on the reduced ink amount $I_j$, in the optimization processing in Step T130.

Figure 28:
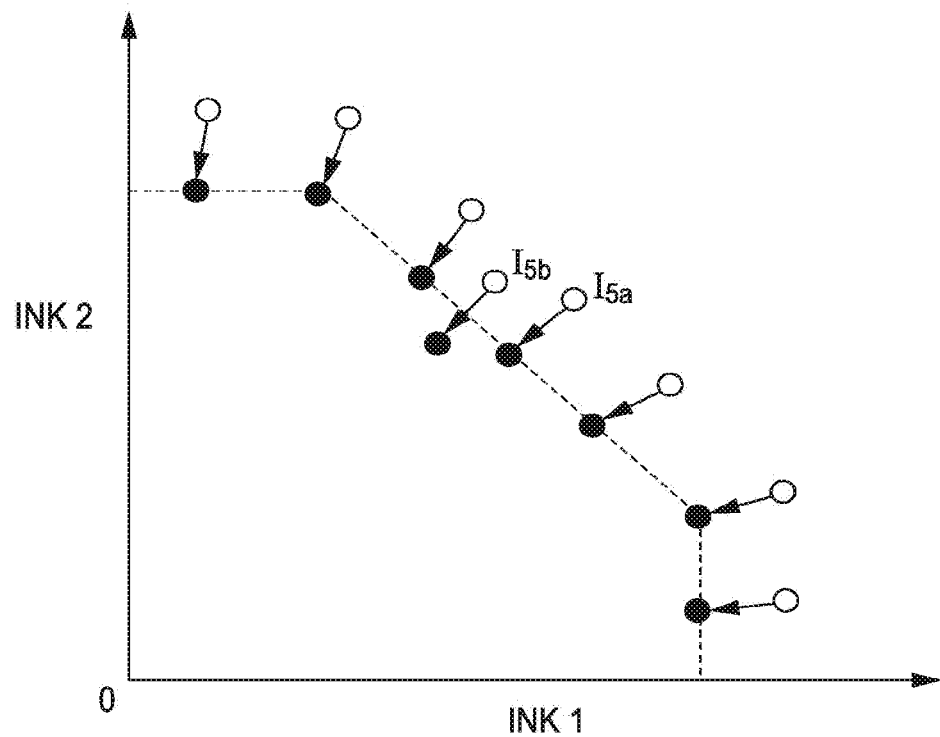
FIG. 28 is a diagram showing an example of a state in which ink amounts are reduced.

FIG. 28 is a diagram showing an example of a state in which the ink amount is reduced. FIG. 28 shows an example of an ink amount space with two axes of two types of primary ink (described as ink 1 and ink 2), where the horizontal axis represents an ink amount of the ink 1, and the vertical direction represents an ink amount of the ink 2. In addition, the inside of a chain line in FIG. 28 represents a region within the standard duty limit value $D_{SIj}$ (j=5) for the secondary ink amount ($I_5$, for example) by the ink 1 and the ink 2. When the ink amount of the secondary color based on the designated ink amount $I_j$ exceeds the standard duty limit value for the secondary color as shown by white circles in FIG. 28, the ink amount optimization module 134 reduces the ink amount of the secondary color to the ink amount (black circles on the chain line in FIG. 28) at positions which are in contact with the standard duty limit value in the ink amount space. By such reduction, the ink amounts of the ink 1 and the ink 2 constituting the secondary color are reduced, and at least a situation in which the ink amounts of the secondary color exceed the standard limit value for the secondary color can be solved. Although the description was given of a certain secondary color in FIG. 28, all ink amounts $I_j$ (j=1 to 8) based on the designated ink amount are compared with the standard duty limit values $D_{SIj}$, and reduction is performed, if necessary, such that all ink amounts $I_j$ (j=1 to 8) do not exceed corresponding reference duty limit values.

When the ink amount is reduced as described above, the reduction direction of the ink amount is a direction toward the origin (a point at which the ink amount is zero) in the ink amount space (see an arrow in FIG. 28). The same is true when the ink amount $I_8$ of the tertiary color is reduced. By performing reduction in such a direction, it is possible to substantially maintain the tone by the ink amount before and after the reduction.

In the optimization processing in Step T130, the ink amount optimization module 134 may not always reduce the ink amount $I_j$ (j=1 to 8) based on the designated ink amount $I_j$ (j=1 to 4) to the standard duty limit value $D_{SIj}$ but may reduce the ink amount $I_j$ (j=1 to 8) based on the designated ink amount $I_j$ (j=1 to 4) to an ink amount which is smaller than the standard duty limit value $D_{SIj}$ in accordance with the difference with the standard duty limit value $D_{SIj}$, when the ink amount $I_j$ (j=1 to 8) based on the designated ink amount $I_j$ (j=1 to 4) exceeds the standard duty limit value $D_{SIj}$.

As an example of this case, a case is assumed in which both the ink amount $I_{5a}$ of the secondary color based on a certain designated ink amount $I_j$ and the ink amount $I_{5b}$ of the secondary color based on another designated ink mount $I_j$ exceed the standard duty limit value $D_{SI5}$, as shown in FIG. 28. Since the distance from the ink amount $I_{5a}$ to the standard duty limit value $D_{SI5}$ is equal to or longer than a predetermined distance, the ink amount $I_{5a}$ is reduced to (sticks to) the standard duty limit value $D_{SI5}$ as described above. On the other hand, the ink amount which departs from the standard duty limit value $D_{SI5}$ by a distance which is less than the predetermined distance is reduced to an ink amount which is smaller than the standard duty limit value $D_{SI5}$ (a black circle further inside than the chain line in FIG. 28). In such a case, the ink amount is converted (reduced) to an ink amount at a position further from the standard duty limit value $D_{SI5}$ (closer to the origin zero) when the distance to the standard duty limit value $D_{SI5}$ is shorter. With such a configuration, it is possible to prevent lack or failure of the gradation feature in the base LUT generated after the ink amount optimization processing, which is caused by reducing all ink amounts exceeding the reference duty limit value $D_{SIj}$ to the same ink amounts.

Furthermore, in the creation of the base LUT in Step S400 in FIG. 6, the ink amount $I_j$ (j=1 to 4) corresponding to each lattice point finally obtained by the smoothing and optimization processing is not registered as it is as the output value of the base LUTs 510 and 520 but converted based on the conversion relationship set in the ink amount converter 710 for each type of primary color and then registered as the output value of the base LUTs 510 and 520 after the conversion. Each of the converters 300, 310, 410, and 136 and the like for the diverted medium is for outputting a prediction result corresponding to a hue value feature of each ink on the diverted medium. For example, it is assumed that an ink amount $I_{4m}$ of the K ink shown in FIG. 23A is determined as an optimal ink amount and optimized for a certain lattice point, for example. At this time, it is possible to understand that the ink amount $I_{4m}$ is optimal and the color formation by the ink amount $I_{4m}$, namely the luminosity L*=50 which is reproduced by the amount $I_{4m}$ of K ink is optimal, for the lattice point.

Although the optimal amount of K ink which can reproduce the luminosity L* on the diverted medium is $I_{4m}$, the optimal amount of K ink which can reproduce the same optimal luminosity L* on the diverting medium is not $I_{4m}$. That is, the optimal amount of K ink which can reproduce the luminosity L* on the diverting medium is not $I_{4m}$ but can be obtained by converting the optimal ink amount $I_{4m}$ of K ink which can reproduce the luminosity L* on the diverted medium with the conversion relationship. Accordingly, by registering as the output value of the base LUTs 510 and 520 the optimal ink amount $I_j$ obtained by converting the ink amount $I_j$ of each lattice point which is finally obtained by the smoothing and the optimization processing, it is possible to obtain the base LUTs 510 and 520 in which the optimal ink amount $I_j$ is defined for the diverting medium. That is, Step S400 corresponds to a profile creation step of creating a profile for the second print medium for which the converted ink amount has been defined, by converting the ink amount determined by the optimization based on the conversion relationship based on the first hue value feature and the second hue value feature.

By displaying the weight designation UI image shown in FIG. 3, the weight $w_{L*}$, $w_{a*}$ . . . of the object function E for optimizing the ink amount $I_j$ is set to the default weight $w_{L*}$, $w_{a*}$ . . . which is suitable for the group of the diverting medium as long as the user does not change the setting. Therefore, it is possible to create the base LUTs 510 and 520 which place values on the image quality suitable for the group of the diverting medium. By displaying the weight designation UI image after the medium designation, it is possible to set the weight $w_{L*}$, $w_{a*}$ . . . in accordance with the properties and use purpose of the medium.

Incidentally, since the diverting medium and the diverted medium have a different tone, a deviation occurs in the prediction result by the forward model converter 300 (spectral printing model converter 310). It is a matter of course that a deviation also occurs in the prediction result of the hue values around the L* axis in accordance with the tone of the diverting medium and the diverted medium. On the other hand, since the gray target tone ($a_{gt}*$, $b_{gt}*$) is intentionally deviated in an opposite color phase direction to the difference tone ($a_D*$, $b_D*$) between the diverting medium and the diverted medium in this embodiment, it is possible to allow true hue values (not the hue values predicted by the forward model converter 300 but the hue values reproduced when the amounts $I_j$ of ink corresponding to the lattice points are made to adhere to the diverting medium) of the lattice points corresponding to the gray axis lattice points restricted to the gray target to be positioned on the L* axis. According to such a base LUT, it is possible to perform interpolating computation with the use of the ink amount $I_j$ which can truly reproduce achromatic color (gray). Therefore, according to the color correction LUTs 610 and 620 created with the use of interpolating computation based on the base LUTs 510 and 520, it is possible to achieve a printing result which is particularly excellent in color reproducibility of an achromatic color (gray) and a gradation feature. By causing the ROM 51 of the printer 20 to store the correction LUTs 610 and 620, color conversion for the diverting medium become possible, and it is possible to execute printing on the diverting medium.

As described above, according to the embodiment, the chromaticity feature on the diverting medium with respect to the ink amount up to the duty limit value for the diverting medium is corrected and approximated to the chromaticity feature on the diverted medium with respect to the ink amount up to the duty limit value for the diverted medium, and a new limit value (temporary duty limit value) of the ink amount is determined based on the revision value RW indicated by the maximum ink amount in the chromaticity feature after the correction. Then, when optimization of the ink amount to be adhered onto the diverted medium is executed with the use of the prediction result of the hue value by the forward model converter 300 and the like prepared corresponding to the diverted medium, the ink amount is optimized within the temporary duty limit value (optimal ink amount is determined). Therefore, the base LUT for the diverting medium generated by converting the thus determined ink amount based on the conversion relationship defines an optimal ink amount for reproducing the same hue value as the hue value reproduced with the optimal ink amount in the diverted medium (with high evaluation by the object function E), and each hue value reproduced by the ink amount is less one-sided in the color space (for example, there is no inconvenience in that only the ink amounts which reproduce relatively dark colors on the diverting medium are defined by the base LUT). In so doing, it is possible to appropriately execute color management and further profile creation with the use of the created base LUT for the diverting medium.

Furthermore, according to the embodiment, if the designated ink amount exceeds the temporary duty limit value when the optimization of the ink amount to be made to adhere to the diverted medium is executed with the use of the hue value prediction result and the like by the forward model converter 300 and the like prepared corresponding to the diverted medium, the designated ink amount is reduced to the standard duty limit value for the diverted medium, and hue value prediction and the like is performed on the ink amount after the reduction to search for an optimal ink amount. That is, since ink amount search within an ink amount range, in which the forward model converter 300 and the image quality evaluation index converter 136 can perform hue value prediction and image quality evaluation, and with the use of the entire ink amount range is performed, appropriate evaluation of the ink amount is performed without deteriorating the color prediction result and the image quality evaluation, and optimal ink amount is determined. Therefore, evaluation of the ink amount is appropriately performed without deteriorating the color prediction result or the image quality evaluation. This results in creation of an optimal base LUT for the diverting medium.

E. Modified Examples

The invention is not limited to the above examples and embodiments and can be performed in various modes within the scope of the gist, and the following modifications can also be made, for example. The above embodiments and the modified examples can appropriately be combined.

E-1. Modified Example 1

In the above description, the ink amount $I_j$ (j=1 to 4) determined by the optimization of the ink amount on the assumption of the feature of the diverted medium is converted based on the conversion relationship for compensating for the feature difference between the first hue value feature and the second hue value feature and then registered as an output value of the base LUTs 510 and 520 when the base LUTs 510 and 520 for the diverting medium is created. However, a value converted by multiplying the ink amount $I_j$ (j=1 to 4) determined by the optimization as described above by the ratio ($D_{Ij}/D_{PIj}$; j=1 to 4) between the duty limit value for the diverting medium and the temporary duty limit value may be registered as an output value of the base LUTs 510 and 520. In so doing, it is possible to convert the ink amount optimized under the temporary duty limit value into the ink amount within a range available for the ink amount on the diverting medium. However, since the ink amount is substantially determined by the optimization up to the standard duty limit value when the temporary duty limit value>standard duty limit value for the diverted medium is satisfied, a value converted by multiplying the ink amount $I_j$ determined as described above by the ratio ($D_{Ij}/D_{SIj}$; j=1 to 4) between the duty limit value for the diverting medium and the standard duty limit value may be registered as an output value of the base LUTs 510 and 520.

E-2. Modified Example 2

Figure 29:
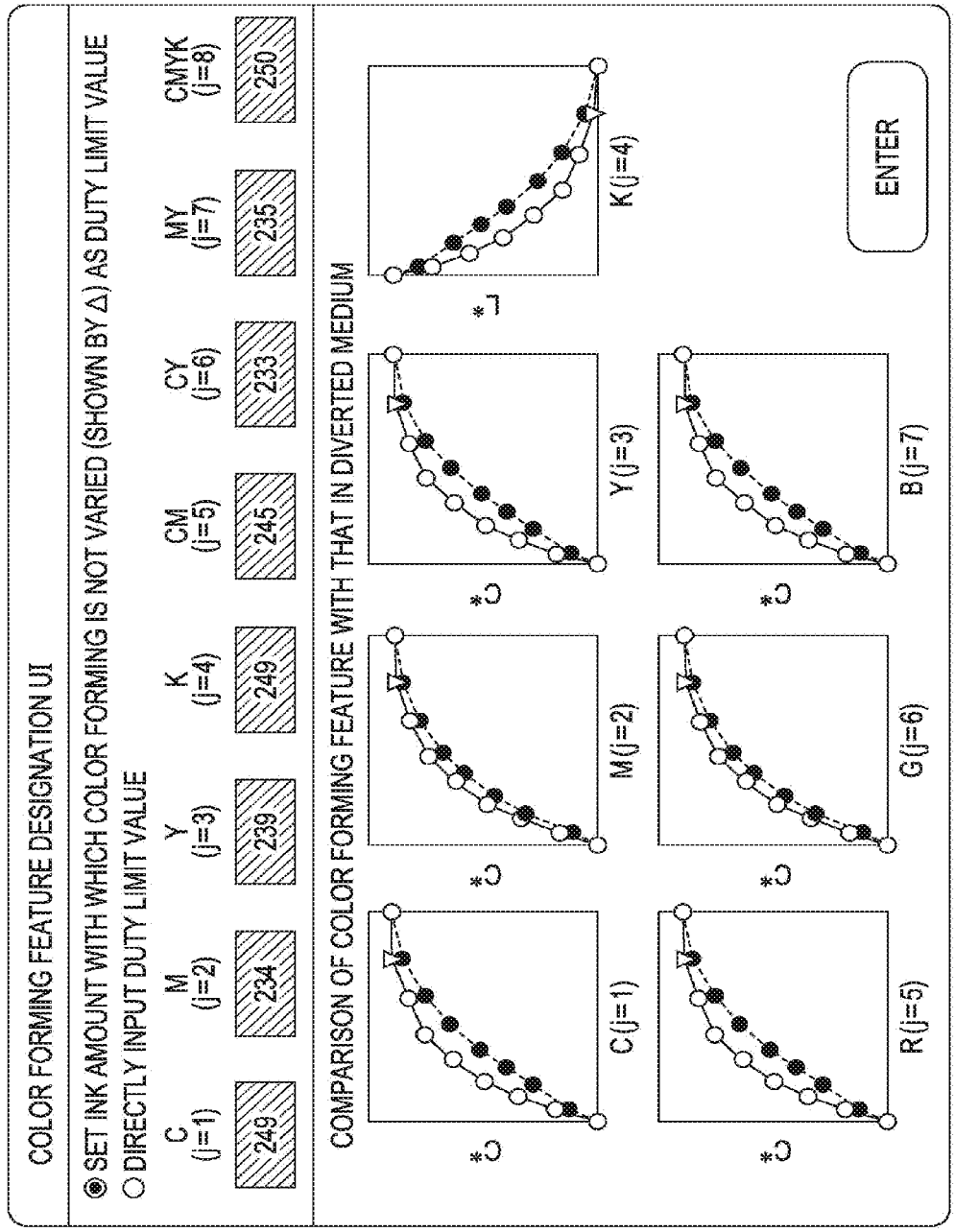
FIG. 29 is a diagram showing a medium feature designation UI image according to a modified example.

FIG. 29 is a diagram showing a medium feature designation UI image. The drawing shows hue value features (C*, L*) of the diverted medium and the diverting medium. In general, when ink of about the duty limit value $D_{Ij}$ is made to adhere to each medium, there is no variation in color formation if more ink is made to adhere. Therefore, an ink amount $I_j$ at which absolute values of inclination of the C* value and the L* value become equal to a predetermined reference value (≈0) may be set as the duty limit value $D_{Ij}$. In the example in FIG. 29, a marker (white triangle) is displayed at the ink amount $I_j$ at which the absolute value of the inclination becomes equal to the reference value in the graph of the hue value feature. In so doing, the user can recognize to which ink amount $I_j$ the duty limit value $D_{Ij}$ is set. In the example in FIG. 29, it is possible for the user to directly designate the duty limit value $D_{Ij}$ by selection of a radio button. In so doing, it is possible to handle a case in which a marker position is obviously different from the ink amount $I_j$ of the color patch in which the user observes the ink bleeding.

E-3. Modified Example 3

Although the CIE-Lab color system is used as a device-independent color system in the above embodiment, it is possible to use another arbitrary device-independent color system such as a CIE-XYZ color system, a CIE-L*u*v* color system, or the like. However, it is preferable to use a device-independent color system such as a CIE-Lab color system, a CIE-L*u*v* color system, or the like, which is a uniform color system, from a viewpoint of realizing smooth color reproduction.

E-4. Modified Example 4

Although the processing with the use of the dynamic model is employed as the smoothing, another kind of smoothing may also be employed. For example, it is possible to employ smoothing in which intervals between adjacent hue values are measured and individual intervals are adjusted so as to be close to the average value thereof, for example.

E-5. Modified Example 5

The "ink" in this specification is not limited to liquid ink used in an ink jet printer, an offset printing, or the like and is used with a wide meaning including a toner used in a laser printer. As another term including such a wide meaning of "ink", it is possible to use the term "color material", "coloring material", or "coloring agent".

E-6. Modified Example 6

In the above embodiment, the description was given of a method and an apparatus for creating a color conversion profile as a look-up table, but the embodiment of the invention can also be applied to a printing apparatus manufacturing system provided with an installing unit which installs the thus obtained color conversion profile on a printing apparatus. The color conversion profile creating apparatus for creating the color conversion profile may be included in the printing apparatus manufacturing system or may be included in another system or apparatus. In addition, the installing unit of the manufacturing system can be realized as an installer (install program) of a printer driver, for example.

The entire disclosure of Japanese Patent Application No. 2011-063343, filed Mar. 22, 2011 is expressly incorporated by reference herein.

What is claimed is:

1. A profile creation method according to which a profile of defining an ink amount is created by determining an ink amount for reproducing a hue value indicated by a lattice point in a device-independent color system, the method comprising:

firstly obtaining for each kind of chromatic ink in a plurality of chromatic inks a first chromaticity feature representing a variation in a chromaticity on a first print medium corresponding to a variation in an ink amount up to a limit value of an ink amount which can adhere to the first print medium;

secondly obtaining for each kind of chromatic ink in the plurality of chromatic inks a second chromaticity feature representing a variation in chromaticity on a second print medium, which is different from the first print medium, corresponding to a variation in an ink amount up to a limit value of an ink amount which can adhere to the second print medium;

determining a new limit value of the ink amount based on the second chromaticity feature after approximation for each kind of chromatic ink in the plurality of chromatic inks by correcting and approximating the second chromaticity feature to the first chromaticity feature for each kind of chromatic ink;

determining an ink amount which is equal to or less than the determined new limit value to execute optimization when the ink amount for reproducing the hue value indicated by the lattice point is determined by the ink amount optimization with the use of an object function for evaluating image quality when a designated amount of ink is made to adhere to the first print medium; and creating a profile for the second print medium, for which the converted ink amount has been defined, by converting the ink amount determined by the optimization with a conversion relationship based on the first chromaticity feature and the second chromaticity feature for each kind of chromatic ink in the plurality of chromatic inks.

2. The profile creation method according to claim 1, wherein in determining the new limit value, the new limit value is determined based on a maximum value of the ink amount in the second chromaticity feature after the approximation.

3. The profile creation method according to claim 1, wherein in determining the new limit value, curves are generated based on each reference point after displacement, by displacing a plurality of reference points in the second chromaticity feature in an ink amount direction, degrees of approximation between the generated curves and the first chromaticity feature are evaluated, and a curve with the highest degree of approximation is regarded as the second chromaticity feature after the approximation.

4. The profile creation method according to claim 1, wherein in determining the ink amount, a lattice point to be restricted to an achromatic color is restricted to a hue value deviated from the achromatic color in a color phase direction based on a tone difference between the first print medium and the second print medium.

5. The profile creation method according to claim 1, wherein in determining the new limit value, whether the new limit value of the ink amount obtained based on the second chromaticity feature after the approximation for each chromatic ink in the plurality of chromatic inks is determined for each chromatic ink or whether an average value of new limit values obtained based on the second chromaticity feature after the approximation for chromatic ink with adjacent color phases is selected based on a color phase angle between the chromatic ink with adjacent color phases and maximum chromaticity which can be expressed by the chromatic ink with adjacent color phases.

6. The profile creation method according to claim 1, wherein in determining the new limit value, whether the new limit value of the ink amount obtained based on the second chromaticity feature after the approximation for each chromatic ink in the plurality of chromatic inks is determined for each chromatic ink in the plurality of chromatic inks or whether the new limit value obtained for chromatic ink with maximum expressible chromaticity among kinds of chromatic ink is determined to be a new limit value for all the kinds of chromatic ink when a color phase angle between chromatic ink with adjacent color phases is equal to or less than a predetermined value is selected based on the color phase angle between the chromatic ink with adjacent color phases and maximum expressible chromaticity of the chromatic ink with adjacent color phases.

7. A non-transitory recording medium, having a profile creation program which causes a computer to execute a function of creating a profile which defines an ink amount by determining an ink amount for reproducing a hue value indicated by a lattice point in a device-independent color system, comprising:
a first obtaining function of obtaining for each kind of chromatic ink in the plurality of chromatic inks a first chromaticity feature representing a variation in chromaticity on a first print medium corresponding to a variation in an ink amount up to a limit value of an ink amount which can adhere to the first print medium;
a second obtaining function of obtaining for each kind of chromatic ink in the plurality of chromatic inks a second chromaticity feature representing a variation in chromaticity on a second print medium, which is different from the first print medium, corresponding to a variation in an ink amount up to a limit value of an ink amount which can adhere to the second print medium;
a limit value determining function of determining for each kind of chromatic ink in the plurality of chromatic inks a new limit value of the ink amount based on the second chromaticity feature after approximation by correcting and approximating the second chromaticity feature to the first hue value feature for each kind of chromatic ink in the plurality of chromatic inks;
an ink amount determining function of designating an ink amount which is equal to or less than the determined new limit value to execute the optimization when the ink amount for reproducing the hue value indicated by the lattice point is determined by the ink amount optimization with the use of an object function for evaluating image quality when a designated amount of ink is made to adhere to the first print medium; and
a profile creating function of creating a profile for the second print medium, for which the converted ink amount has been defined, by converting the ink amount determined by the optimization with a conversion relationship based on the first chromaticity feature and the second chromaticity feature for each kind of chromatic ink in the plurality of chromatic inks.

8. The recording medium according to claim 7, wherein in determining the new limit value, the new limit value is determined based on a maximum value of the ink amount in the second chromaticity feature after the approximation.

9. The recording medium according to claim 7, wherein in determining the new limit value, curves are generated based on each reference point after displacement, by displacing a plurality of reference points in the second chromaticity feature in an ink amount direction, degrees of approximation between the generated curves and the first chromaticity feature are evaluated, and a curve with the highest degree of approximation is regarded as the second chromaticity feature after the approximation.

10. The recording medium according to claim 7, wherein in determining the ink amount, a lattice point to be restricted to an achromatic color is restricted to a hue value deviated from the achromatic color in a color phase direction based on a tone difference between the first print medium and the second print medium.

11. The recording medium according to claim 7, wherein in determining the new limit value, whether the new limit value of the ink amount obtained based on the second chromaticity feature after the approximation for each chromatic ink in the plurality of chromatic inks is determined for each chromatic ink or whether an average value of new limit values obtained based on the second chromaticity feature after the approximation for chromatic ink with adjacent color phases is selected based on a color phase angle between the chromatic ink with adjacent color phases and maximum chromaticity which can be expressed by the chromatic ink with adjacent color phases.

12. The recording medium according to claim 7, wherein in determining the new limit value, whether the new limit value of the ink amount obtained based on the second chromaticity feature after the approximation for each chromatic ink in the plurality of chromatic inks is determined for each chromatic ink in the plurality of chromatic inks or whether the new limit value obtained for chromatic ink with maximum expressible chromaticity among kinds of chromatic ink is determined to be a new limit value for all the kinds of chromatic ink when a color phase angle between chromatic ink with adjacent color phases is equal to or less than a predetermined value is selected based on the color phase angle between the chromatic ink with adjacent color phases and maximum expressible chromaticity of the chromatic ink with adjacent color phases.

13. A printing apparatus which causes an amount of ink, which has been obtained by performing color conversion with reference to a profile, to adhere to a print medium,
wherein the profile is a profile which is created by determining an ink amount for reproducing a hue value indicated by a lattice point in a device-independent color system to define an ink amount, which is a profile for a second print medium created by obtaining for each kind of chromatic ink in the plurality of chromatic inks a first chromaticity feature representing a variation in chromaticity on a first print medium corresponding to a variation in an ink amount up to a limit value of an ink amount which can adhere to the first print medium, obtaining for each kind of chromatic ink in the plurality of chromatic inks a second chromaticity feature representing a variation in chromaticity in a second print medium, which is different from the first print medium, corresponding to a variation in an ink amount up to a limit value of an ink amount which can adhere to the second print medium, determining for each kind of chromatic ink in the plurality of chromatic inks a new limit value of the ink amount based on the second chromaticity feature after approximation by correcting and approximating the second chromaticity feature to the first chromaticity feature for each kind of chromatic ink in the plurality of chromatic inks, determining an ink amount which is equal to or less than the determined new limit value to execute the optimization when the ink amount for reproducing the hue value indicated by the lattice point is determined by the ink amount optimization with the use of an object function for evaluating image quality when a designated amount of ink is made to adhere to the first print medium, and defining the converted ink by converting for each kind of chromatic ink in the plurality of chromatic inks the ink amount determined by the optimization with a conversion relationship based on the first chromaticity feature and the second chromaticity feature.

14. The printing apparatus according to claim 13, wherein in determining the new limit value, the new limit value is determined based on a maximum value of the ink amount in the second chromaticity feature after the approximation.

15. The printing apparatus according to claim 13, wherein in determining the new limit value, curves are generated based on each reference point after displacement, by displacing a plurality of reference points in the second chromaticity feature in an ink amount direction, degrees of approximation between the generated curves and the first chromaticity feature are evaluated, and a curve with the highest degree of approximation is regarded as the second chromaticity feature after the approximation.

16. The printing apparatus according to claim 13, wherein in determining the ink amount, a lattice point to be restricted to an achromatic color is restricted to a hue value deviated from the achromatic color in a color phase direction based on a tone difference between the first print medium and the second print medium.

17. The printing apparatus according to claim 13, wherein in determining the new limit value, whether the new limit value of the ink amount obtained based on the second chromaticity feature after the approximation for each chromatic ink in the plurality of chromatic inks is determined for each chromatic ink or whether an average value of new limit values obtained based on the second chromaticity feature after the approximation for chromatic ink with adjacent color phases is selected based on a color phase angle between the chromatic ink with adjacent color phases and maximum chromaticity which can be expressed by the chromatic ink with adjacent color phases.

18. The printing apparatus according to claim 13, wherein in determining the new limit value, whether the new limit value of the ink amount obtained based on the second chromaticity feature after the approximation for each chromatic ink in the plurality of chromatic inks is determined for each chromatic ink in the plurality of chromatic inks or whether the new limit value obtained for chromatic ink with maximum expressible chromaticity among kinds of chromatic ink is determined to be a new limit value for all the kinds of chromatic ink when a color phase angle between chromatic ink with adjacent color phases is equal to or less than a predetermined value is selected based on the color phase angle between the chromatic ink with adjacent color phases and maximum expressible chromaticity of the chromatic ink with adjacent color phases.

* * * * *